(12) United States Patent
Parker et al.

(10) Patent No.: US 9,292,700 B2
(45) Date of Patent: Mar. 22, 2016

(54) METHOD AND SYSTEM FOR SECURING DATA

(71) Applicant: Atomizer Group, LLC, Worthington, OH (US)

(72) Inventors: Eric Parker, Geneva, OH (US); Ralph Youngen, Fairfax Station, VA (US)

(73) Assignee: Atomizer Group, LLC, Worthington, OH (US)

( * ) Notice: Subject to any disclaimer, the term of this patent is extended or adjusted under 35 U.S.C. 154(b) by 0 days.

(21) Appl. No.: 14/683,879

(22) Filed: Apr. 10, 2015

(65) Prior Publication Data

US 2015/0294118 A1    Oct. 15, 2015

Related U.S. Application Data

(60) Provisional application No. 61/977,830, filed on Apr. 10, 2014, provisional application No. 62/102,266, filed on Jan. 12, 2015.

(51) Int. Cl.
| | |
|---|---|
| *G06F 21/60* | (2013.01) |
| *H04L 29/00* | (2006.01) |
| *H04L 29/06* | (2006.01) |
| *G06F 17/30* | (2006.01) |

(52) U.S. Cl.
CPC ............ *G06F 21/606* (2013.01); *G06F 21/602* (2013.01); *H04L 63/0428* (2013.01); *G06F 17/30194* (2013.01)

(58) Field of Classification Search
USPC ................... 713/164–167, 189–194; 707/693
See application file for complete search history.

(56) References Cited

U.S. PATENT DOCUMENTS

| | | | |
|---|---|---|---|
| 5,485,474 | A | 1/1996 | Rabin |
| 6,868,495 | B1 | 3/2005 | Glover |
| 7,171,493 | B2 | 1/2007 | Shu et al. |
| 7,546,427 | B2 | 6/2009 | Gladwin et al. |
| 8,266,438 | B2 | 9/2012 | Orsini et al. |
| 8,468,244 | B2 | 6/2013 | Redlich et al. |
| 8,473,756 | B2 | 6/2013 | Orsini et al. |
| 8,656,187 | B2 | 2/2014 | Leggette et al. |
| 8,677,148 | B2 | 3/2014 | O'Hare et al. |

(Continued)

FOREIGN PATENT DOCUMENTS

| | | |
|---|---|---|
| KR | 10-0737385 B1 | 7/2007 |
| KR | 10-2009-0028122 A | 3/2009 |

(Continued)

OTHER PUBLICATIONS

Jeroen Van De Graaf; Decentralized management of One-Time Pad key material for a group; XIV Simpósio Brasileiro em Segurança da Informação e de Sistemas Computacionais—SBSeg 2014; 2014; (pp. 326-329); Soc. Bras. de Computação; published on Internet (www.lbd.dcc.ufmg.br/colecoes/sbseg/2014/0029.pdf).

(Continued)

*Primary Examiner* — Madhuri Herzog
(74) *Attorney, Agent, or Firm* — Emerson Thomson Bennett; Daniel A. Thomson

(57) ABSTRACT

A method for securing user data includes the steps of: a) setting the user data as input data; b) randomly fragmenting the input data into a plurality of Atoms and randomly distributing the Atoms into an AtomPool and an AtomKey; and c) recording information about the fragmentation and the distribution of step b) into an AtomMap.

25 Claims, 40 Drawing Sheets

(56) References Cited

U.S. PATENT DOCUMENTS

| | | | |
|---|---|---|---|
| 8,677,505 | B2 | 3/2014 | Redlich et al. |
| 8,683,231 | B2 | 3/2014 | Grube et al. |
| 2003/0188153 | A1 | 10/2003 | Demoff et al. |
| 2006/0045270 | A1 | 3/2006 | Cohen |
| 2006/0259587 | A1 | 11/2006 | Ackerman et al. |
| 2008/0046748 | A1* | 2/2008 | Fujimoto ............ G06F 21/6254 713/182 |
| 2008/0060085 | A1* | 3/2008 | Samzelius et al. ............. 726/30 |
| 2008/0201336 | A1* | 8/2008 | Yamato ........................... 707/10 |
| 2009/0271634 | A1 | 10/2009 | Boult et al. |
| 2011/0202755 | A1 | 8/2011 | Orsini et al. |
| 2012/0102316 | A1* | 4/2012 | Resch et al. .................. 713/150 |
| 2013/0110775 | A1 | 5/2013 | Forsythe |

FOREIGN PATENT DOCUMENTS

| | | |
|---|---|---|
| WO | WO99-10859 A2 | 3/1999 |
| WO | 2008/122918 A2 | 10/2008 |
| WO | WO2012-134017 A1 | 10/2012 |
| WO | 2013/156758 A1 | 10/2013 |

OTHER PUBLICATIONS

Wenbin Yao et al.; An Effective Privacy-Preserving Algorithm Based on Logistic Map and Rubik's Cube Transformation; Discrete Dynamics in Nature and Society; Nov. 27, 2014; (pp. 1-11); vol. 2014; Hindawi Publishing Corporation; published on Internet (http://dx.doi.org/10.1155/2014/178585).

Tao Ye et al.; Improving Wireless Security Through Network Diversity; ACM SIGCOMM Computer Communication Review; Jan. 2009; (pp. 35-44); vol. 39, No. 1; Association for Computing Machinery; published on Internet (http://www.sigcomm.org/sites/default/files/ccr/papers/2009/January/1496091-1496096.pdf).

Victor Boyko; On All-or-Nothing Transforms and Password-Authenticated Key Exchange Protocols; Jun. 2000; (pp. 1-155); Massachusetts Institute of Technology; Cambridge, MA, US.

Chen Zhao et al.; ESSA: An Efficient and Secure Splitting Algorithm for Distributed Storage Systems; China Communications; 2010; (pp. 89-95); vol. 7, No. 4; China Communications; published on Internet (http://www.chinacommunications.cn/fileup/PDF/2010-7-4-014.pdf).

Protechnix, (Author Unknown); Cryptology and Data Secrecy: The Vernam Cipher; viewed Mar. 19, 2015 (date of publication unknown); (7 pages); published on Internet (http://www.pro-technix.com/information/crypto/pages/vernam_base.html).

Himel Dev et al.; An Approach to Protect the Privacy of Cloud Data from Data Mining Based Attacks; High Performance Computing, Network, Storage and Analysis (SCC), 2012 SC Companion; Nov. 2012; (10 pages); IEEE; published on Internet (http://www.cse.buffalo.edu/faculty/tkosar/datacloud2012/papers/datacloud2012_paper_8.pdf).

ID Quantique SA, (Author Unknown); What is an encryption key?; viewed Mar. 19, 2015 (date of publication unknown); (3 pages); published on Internet (http://www.idquantique.com/quantum-safe-crypto/encryption-key-generation/).

Mark S. O'Hare et al.; The New Paradigm for Cyber Security; Proceedings Magazine; Mar. 2015; (pp. 82-84); vol. 141/3/1,345; U.S. Naval Institute; Annapolis, MD, US.

Ronen Shaltiel; An introduction to randomness extractors; viewed Mar. 19, 2015 (publication date unknown); (21 pages); published on Internet (http://cs.haifa.ac.il/~ronen/online_papers/ICALPinvited.pdf).

Security First Corp., (Author Unknown); SPxSHARC: Introduction to SPx Technology and Security First Corp's new SPxSHARC Server Product Line; Sep. 2014; (pp. 1-11); published on Internet (https://www.securityfirstcorp.com/documents/sharcproductpaper.pdf).

D. R. Stinson; Something about all or nothing (transforms); Jun. 17, 1999; (pp. 1-6); published on Internet (http://cacr.math.uwaterloo.ca/~dstinson/papers/AON.ps).

Jason K. Resch et al.; AONT-RS: Blending Security and Performance in Dispersed Storage Systems; FAST-2011: 9th USENIX Conference on File and Storage Technologies; Feb. 2011; (13 pages); USENIX; San Jose, CA, US.

Laurent Blain et al.; An intrusion-tolerant security server for an open distributed system; First European Symposium on Research in Computer Security (ESORICS 90); 1990; (17 pages); published on Internet (http://webhost.laas.fr/TSF/deswarte/Publications/90085.pdf).

Mingqiang Li et al.; CDStore: Toward Reliable, Secure, and Cost-Efficient Cloud Storage via Convergent Dispersal; Feb. 19, 2015; (pp. 1-20); published on Internet (http://arxiv.org/pdf/1502.05110v1.pdf).

Dorothy E. Denning; An Intrusion-Detection Model; IEEE Transactions on Software Engineering; Feb. 1986; (pp. 118-131); vol. SE-13, No. 3; IEEE Computer Society; Oakland, CA, US.

Eliseu Castelo Branco et al.; 29th Simpósio Brasileiro de Banco de Dados; A strategy to preserve data confidentiality in cloud storage services; Oct. 2014; (pp. 257-265); published on Internet (http://www.inf.ufpr.br/sbbd-sbsc2014/sbbd/proceedings/artigos/pdfs/12.pdf).

Jean-Michel Fray et al.; Fragmented Data Processing: An Approach to Secure and Reliable Processing in Distributed Computing Systems; Dependable Computing for Critical Applications; 1991; (pp. 323-343); Springer-Verlag; Wien, AT.

Yves Deswarte; Fragmentation-Redundancy-Scattering: a means to tolerate accidental faults and intrusions in distributed systems; viewed Mar. 18, 2015 (publication date unknown); (5 pages); published on Internet (http://homepages.laas.fr/deswarte/Publications/91344.pdf).

Xuesong Zhang et al.; A Study of the Use of IDAs in Cloud Storage; International Journal of Future Computer and Communication; Feb. 2013; (pp. 67-70); vol. 2, No. 1; IJFCC; published on Internet (http://www.ijfcc.org/papers/123-F10005.pdf).

Techtarget, (Author Unknown); Information dispersal algorithms: Data-parsing for network security; viewed Mar. 18, 2015 (publication date unknown); (4 pages); published on Internet (http://searchnetworking.techtarget.com/Information-dispersal-algorithms-Data-parsing-for-network-security).

Chris Christensen; One-time Pad (OTP); viewed Mar. 18, 2015 (publication date unknown); (pp. 1-34); published on Internet (http://www.nku.edu/~christensen/section%2016%20onetime%20pads.pdf).

Michael O. Rabin; Efficient Dispersal of Information for Security, Load Balancing, and Fault Tolerance; Journal of the Association for Computing Machinery; Apr. 1989; (pp. 335-348); vol. 36, No. 2; Association for Computing Machinery; New York, NY, US.

Ronald L. Rivest; All-or-Nothing Encryption and the Package Transform; Fast Software Encryption; 1997; (9 pages); Springer-Verlag; Berlin, DE.

Quantum Corporation, (Author Unknown); The Most Secure Cloud Storage; viewed Mar. 19, 2015 (publication date unknown); (6 pages); published on Internet (http://www.symform.com/how-it-works/security/).

Philippe Beguin et al.; General information dispersal algorithms; Theoretical Computer Science; Dec. 6, 1998; (pp. 87-105); vol. 209, No. 1-2; Elsevier Science B.V.; Essex, UK.

Korean Intellectual Property Office, International Search Report and Written Opinion; Jul. 7, 2015; (8 pages); Daejeon, South Korea.

\* cited by examiner

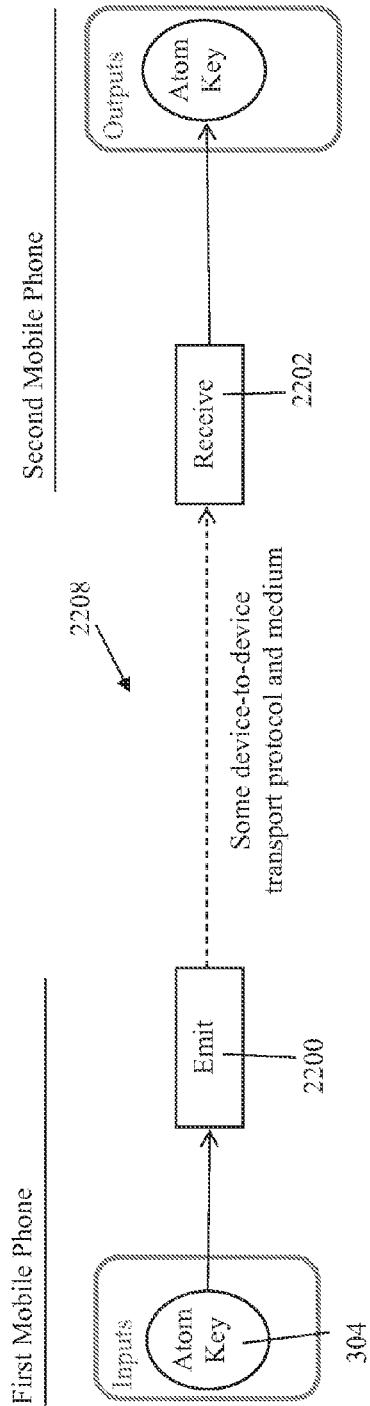
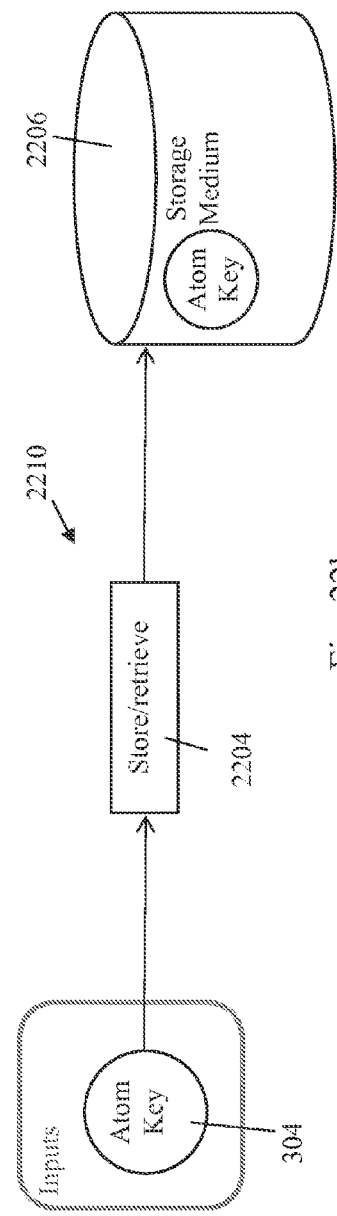
Fig. 22a
Fig. 22b

| Atomizing Process | Transport/Storage Process 2704 | De-Atomizing Process |

METHOD AND SYSTEM FOR SECURING DATA

I. CROSS-REFERENCE TO RELATED APPLICATIONS

This application claims the benefit of, and incorporates by reference, U.S. Provisional Application No. 61/977,830, filed on Apr. 10, 2014, and U.S. Provisional Application No. 62/102,266, filed on Jan. 27, 2015.

II. BACKGROUND

This invention pertains to the art of securely and confidentially storing and retrieving data on many types of storage media, including data stored and retrieved using the public Internet, also known as the "cloud." Portable storage media, such as USB drives, SD cards, and cell phones may store large amounts of data yet typically have no or limited means of protecting the data they contain. Storing data in the cloud puts the data at risk of being compromised—whether by interception during transmission to the cloud service provider or by hacking the service provider when the data is stored. Typical file encryption uses HTTPS during transmission and disk encryption by the cloud service provider when the data is stored; both of these put the keys in control of the service providers and require the user to trust that the encryption access keys are secure—not hacked, taken by disloyal employees, or compelled to be given to the government. And even if the encryption keys are kept safe, once the files are acquired by a hacker, the files are in the hacker's control. At that point, large computational resources can be applied to decrypt the files, or the files may be kept until decryption technologies improve.

Current private and public key encryption methods use a small amount of random data (an initialization vector and a key) in conjunction with a deterministic algorithm to disorder the information into secure data. The weakness is the deterministic algorithm and the size of the randomness to start the encryption process.

Information Dispersal Algorithms (IDA) break apart confidential data for transmission and storage to make it harder to reconstitute the confidential data. However, the dispersed packets pass through "pinch points" in the network through which all packets are routed and thus can be collected (for example, by sniffers or by the Internet service provider). These dispersed packets have headers that can be used to reassemble the confidential data. Also, cloud storage services may add their own headers to the dispersed packets of confidential data stored by the services, where the headers may also be used to recollect and reassemble the confidential data.

All-Or-Nothing Transforms (AONT) require the collection of all pieces of a secret in order to decrypt the secret. AONT depends on a bad actor not being able to collect all pieces of a secret (for example, all fragmented pieces of a dispersed confidential data). However, transmitting confidential data protected by AONT to the cloud requires the data to go through the same pinch points as discussed above, which make it likely that all of the pieces can be collected and thus decrypted or cracked.

Users should be able to share and store files securely, including through the Internet, keeping control of the keys and preventing access to their files. To limit the risk of compromise, this method and system are disclosed.

III. SUMMARY

In accordance with one aspect of the present invention, a method for securing user data includes the steps of: a) setting the user data as input data; b) randomly fragmenting the input data into a plurality of Atoms and randomly distributing the Atoms into an AtomPool and an AtomKey; and c) recording information about the fragmentation and the distribution of step b) into an AtomMap.

In accordance with another aspect of the present invention, a non-transitory computer readable medium includes instructions for causing a computer to perform the above method.

In accordance with still another aspect of the present invention, a system for securing user data includes a first computer, and a second computer in communication with the first computer; wherein the first computer is programmed to execute some steps of the above method and communicate the AtomPool, the AtomKey, and the final AtomMap to the second computer; and wherein the second computer is programmed to execute the other steps of the above method.

Still other benefits and advantages of the invention will become apparent to those skilled in the art to which it pertains upon a reading and understanding of the following detailed specification.

IV. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 22a is a schematic of the AtomKey Transport function according to one embodiment.

FIG. 22b is a schematic of the AtomKey Storage function according to one embodiment.

FIG. 27 is a main overview schematic of a process according to another embodiment.

V. GLOSSARY

In this specification, the following defined terms have the following respective meanings:

Atom—at least one bit of data.

Atomize—to fragment and scramble data.

AtomKey—a block of data storage or memory different from but related to the AtomPool.

AtomMap—instructions about the atomizing of data; used to de-atomize atomized data.

AtomPool—a block of data storage or memory different from but related to the AtomKey.

De-atomize—to unscramble and reassemble atomized data.

VI. DETAILED DESCRIPTION

Figure 1:
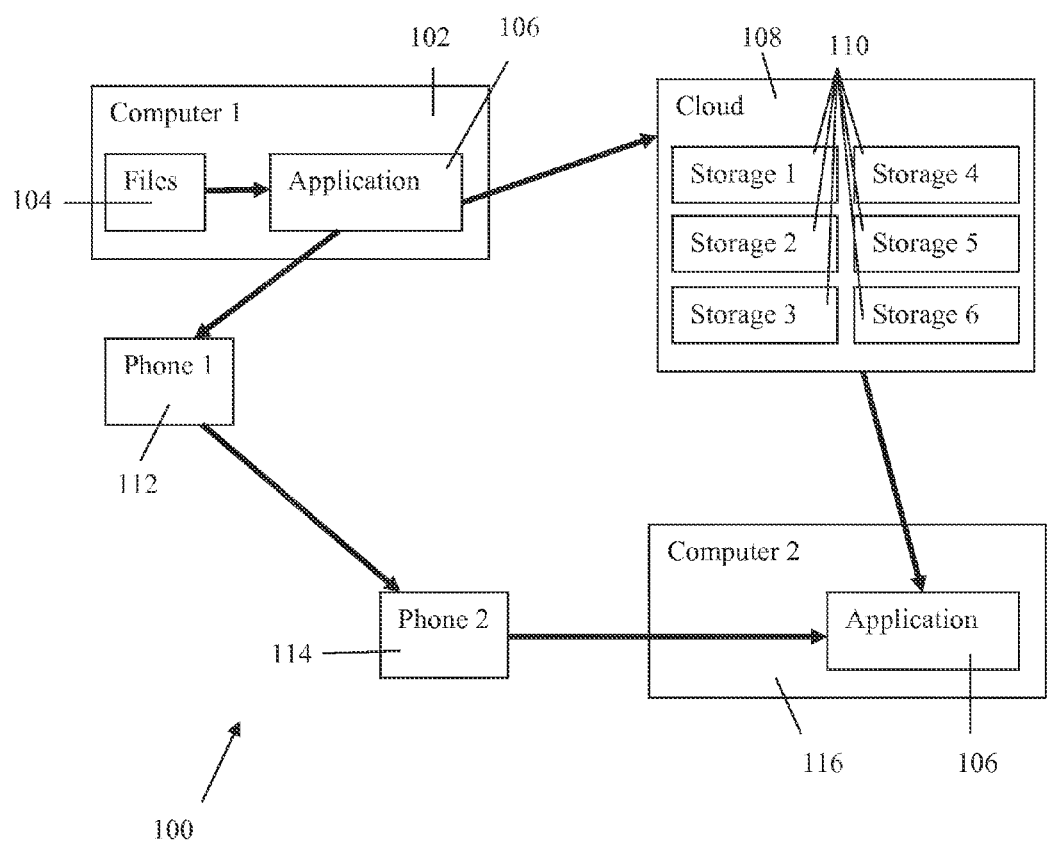
FIG. 1 is a diagram of one embodiment of the system.

Referring now to the drawings wherein the showings are for purposes of illustrating embodiments of the invention only and not for purposes of limiting the same, and wherein like reference numerals are understood to refer to like components, FIG. 1 shows a diagram of one embodiment of the system 100. The system 100 may include a first computer 102, which may be the computer of the user desiring to share data files 104 (or user data 104) with another person. The user may also wish to simply secure and store the user data 104. The first computer 102 may include, but is not limited to, a personal computer, a desktop computer, a laptop computer, a mobile phone, a mobile device, a personal digital assistant, and a tablet. A computer may include a processor (including a CPU) and memory. A computer may include at least one input device (including a keyboard, a keypad, a touchpad, a touchscreen, a mouse, a joystick, and a trackball) and at least one output device (including a display and a printer). A computer may include a communication interface that allows the computer to communicate with other devices, computers, or the cloud 108. A computer may include a storage device and may include a connection port for the connection of external storage devices.

The first computer 102 may include a software application 106 for "atomizing" the data files 104, as will be further described below. The application 106 may be, in alternative embodiments, a native application or may be an Internet browser that executes an Internet-based (or cloud-based) application. The user may use the application 106 to select the data files 104 to be atomized. During atomization, the application 106 may encrypt the data files 104 (which may be AES256 encryption with long random keys), randomly separate the encrypted files at the bit level into disassociated segments (called "Atoms" 1102) of bits (where the Atoms 1102 may be given long random names or identifications), generate atoms (called "chaff Atoms" or false Atoms that are indistinguishable from real Atoms 1102) of random data that is not part of the data files 104, and transmit all of the Atoms 1102 (including chaff Atoms) to the cloud 108 in random order for storage on randomly-selected storage devices, sites, or zones 110. The cloud 108 may house numerous Atoms 1102 from various users with no information on how to reassemble and decrypt them 1102. The transmission to and reception from the cloud 108 may be over a secure connection, such as HTTPS.

In one embodiment, the application 106 may create a key (which may be called the "AtomKey" 304) for how to find the Atoms 1102, reintegrate them 1102, decrypt the data, and restore the data files 104. In one embodiment, the system 100 may also require a pass phrase in conjunction with the key to atomize and de-atomize the data files 104. The user may create a pass phrase and enter it into the application 106 during atomization. The pass phrase may be a PKI private key where the AtomKey 304 may be encrypted with a PKI public key in one embodiment.

In one embodiment, the user may scan or take a photograph of the AtomKey 304 from the screen of the first computer 102 using a first mobile phone 112. After capturing the AtomKey 304 on the first mobile phone 112, the user may send the photograph of the AtomKey 304 to a second mobile phone 114 owned by the intended recipient of the data files 104. The transmission of the AtomKey 304 may be done by sending a text message, including a multimedia text message, MMS, or SMS. In another embodiment, the user may print out the AtomKey 304 and physically mail or deliver it to the recipient. In another embodiment, any of the first mobile phone 112 and the second mobile phone 114 may be a tablet, a computer, a personal digital assistant (PDA), a multimedia player, or another mobile device. In one embodiment, the user may also transfer the pass phrase to the recipient, which may include, but is not limited to, calling and telling the recipient what the pass phrase is, physically mailing the pass phrase to the recipient, electronically transferring the pass phrase to the recipient (for example, by saving the pass phrase on a USB drive, CD, or memory card, or by texting the pass phrase), or personally visiting and telling the recipient what the pass phrase is. An out-of-band process for sending the AtomKey 304 and pass phrase may enhance security.

At least one of the first mobile phone 112 and the second mobile phone 114 may include a software application that is designed for capturing the AtomKey 304, transmitting it to a recipient, and receiving it from the user or sender.

The recipient may use a second computer 116 to also execute the software application 106 for retrieving the atomized data files 104. In one embodiment, the application 106 to atomize the data files 104 and the application 106 to de-atomize the data files 104 are the same; the application 106 includes functionality to do both. In another embodiment, different applications may be used, one to atomize data files 104 and one to de-atomize data files 104.

The recipient may transfer the received AtomKey 304 (for example, from the second mobile phone 114; from a USB drive, memory card, or CD; or however received) to the second computer 116 into the application 106. In one embodiment, the recipient may use a camera of the second computer 116 to capture a photograph of the AtomKey 304 from the second mobile phone 114. In one embodiment, the recipient also enters the received pass phrase into the application 106.

The application 106 may de-atomize the data files 104 by using the AtomKey 304 to gather the Atoms 1102 (including chaff Atoms 1102) from the cloud 108 in random order, discard the chaff Atoms 1102, reassemble the Atoms 1102 into encrypted files, and decrypt the encrypted files into the data files 104 that the user intended to share with the recipient. The recipient may then use the files as intended.

Figure 2:
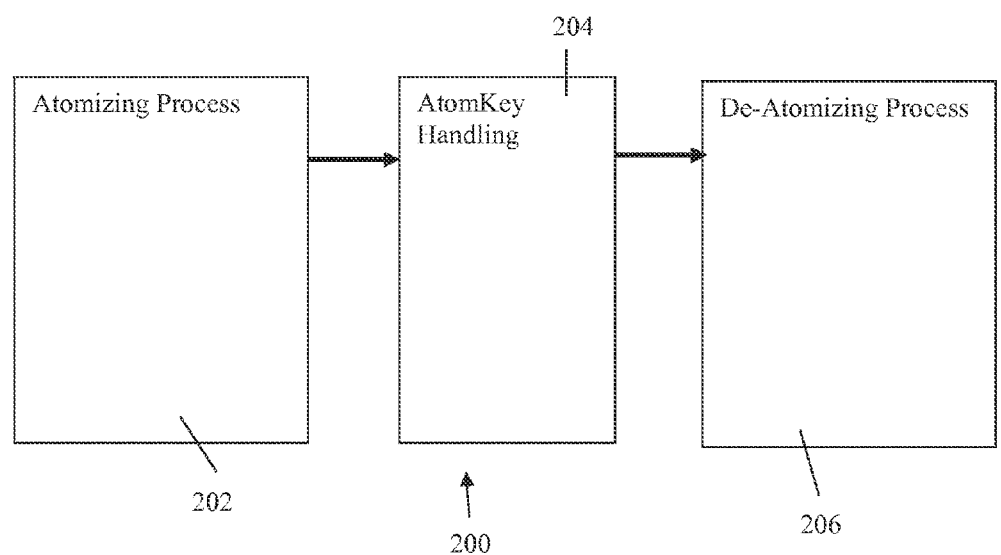
FIG. 2 is a main overview schematic of a process according to one embodiment.

FIG. 2 shows a main overview schematic of a process 200 according to one embodiment. This process may include an atomizing process 202, an AtomKey handling process 204, and a de-atomizing process 206, each of which is further discussed below. The atomizing process 202 may be performed on a first computer 102. The de-atomizing process 206 may be performed on a second computer 116.

Figure 3:
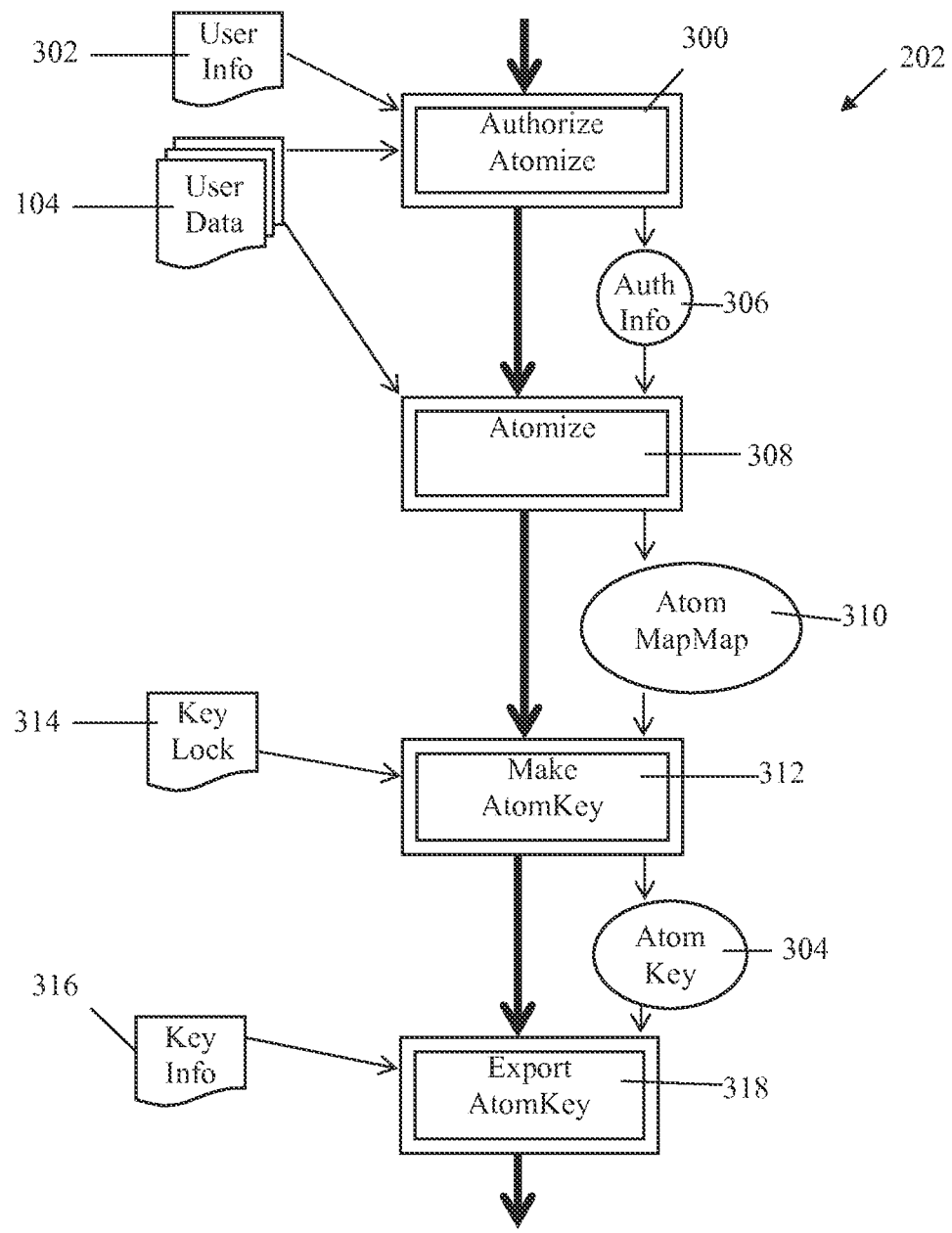
FIG. 3 is an overview schematic of the atomizing process according to one embodiment.

FIG. 3 shows an overview schematic of the atomizing process 202 according to one embodiment. A legend for the objects shown in FIGS. 3-26 is shown in FIG. 6. This process 202 may include an Authorize Atomize function 300, which may check with the web services before allowing atomization and before providing the necessary information to atomize the user's data files or user data 104. This 300 is further discussed with respect to FIG. 7. Inputs to the Authorize Atomize function 300 may include the user data 104 and the user information 302. This user information 302 may be information that uniquely identifies the user to the system 100 and may include a name, an email address, biometric identification, a password, or any other identification means or combination thereof. The user information 302 may allow the system 100 to charge the user for using the system 100, to track the AtomKeys 304 for storage and reassembly, and to kill AtomKeys 304 to prevent reassembly. The Authorize Atomize function 300 may generate authorization information 306, which may be information used to prepare to atomize the user data 104. Authorization information 306 may include AtomKeyID, AtomID, and StoragePool, and also any instructions to delete stored Atoms 1102 in the case of a reply from the Authorize Reassemble function 502. In one embodiment, the authorization information 306 may be not secret.

Figure 8:
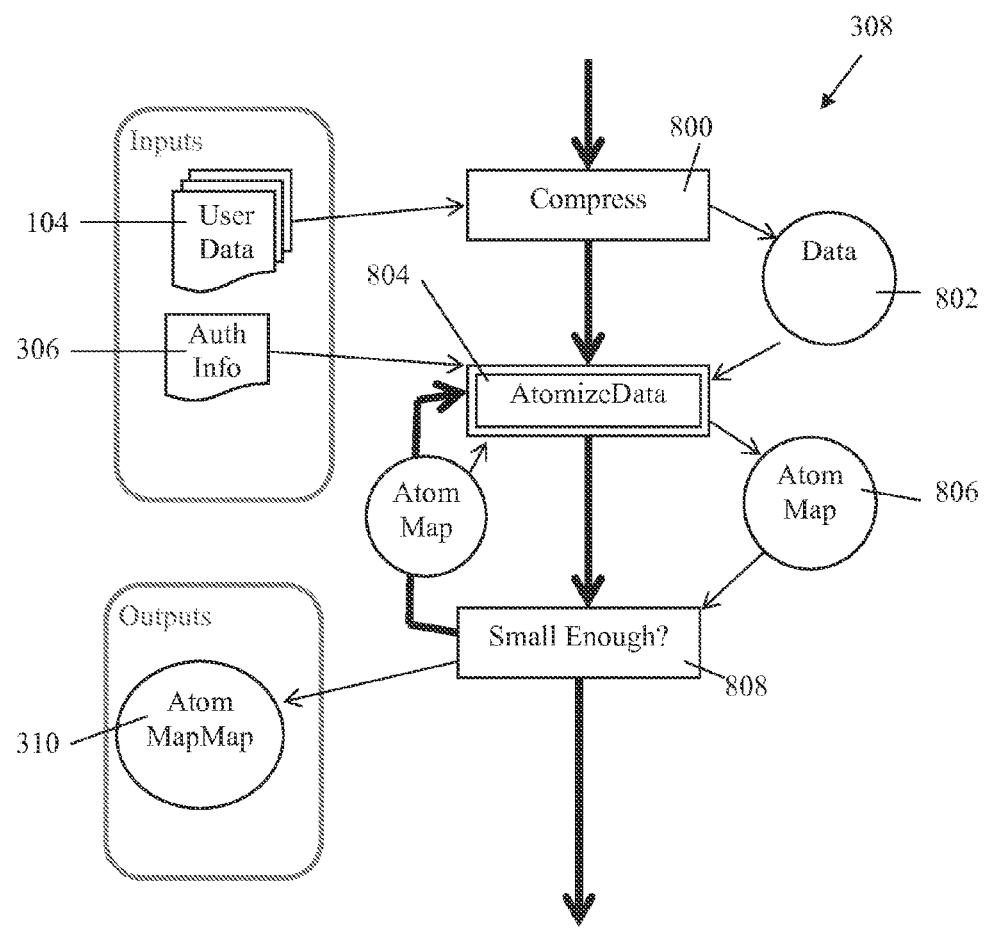
FIG. 8 is a schematic of the Atomize function according to one embodiment.

The atomizing process 202 may next include an Atomize function 308, which is further described with respect to FIG. 8. This function 308 may take user data 104, atomize it, and return an Atom MapMap 310, which is an AtomMap 806 that contains information about an atomized AtomMap 806. The Atom MapMap 310 may be the full and usable map of information for reassembling the user data 104.

Figure 13:
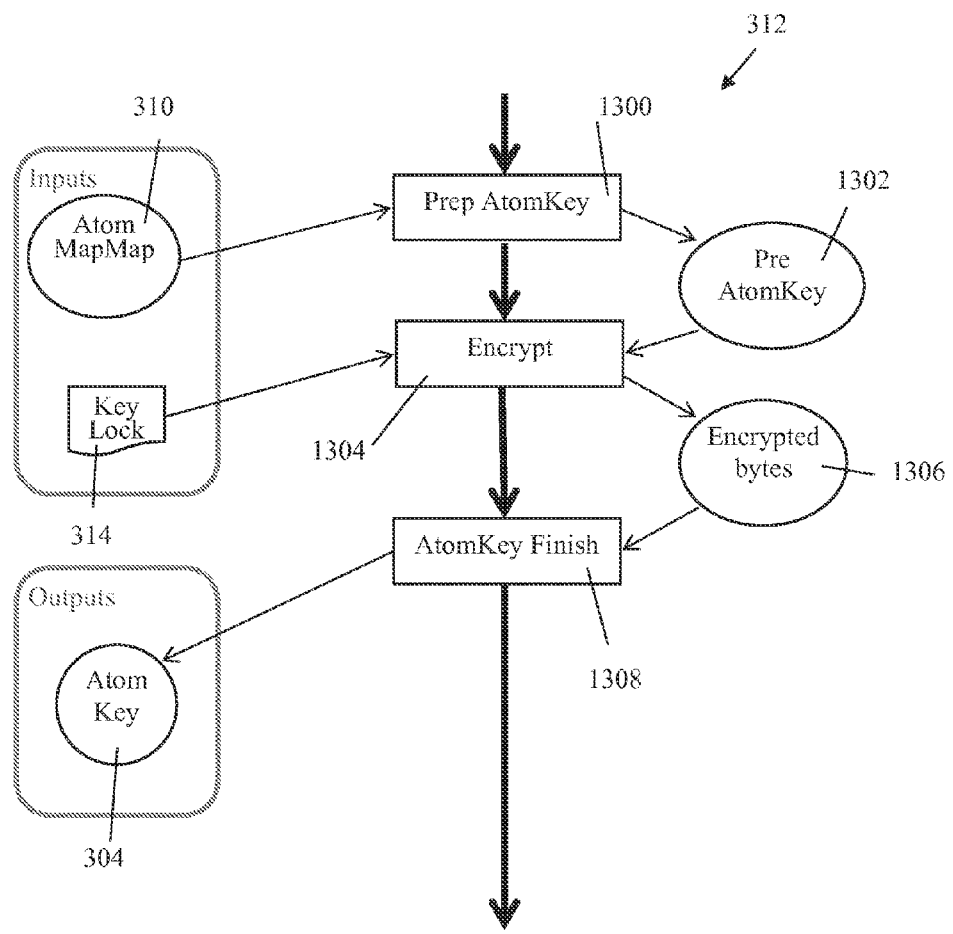
FIG. 13 is a schematic of the Make AtomKey function according to one embodiment.

The atomizing process 202 may next include a Make AtomKey function 312, which is further described with respect to FIG. 13. This function 312 may convert an Atom MapMap 310 into an AtomKey 304, which may be a small, concise, and locked/encrypted set of bytes that may be encoded into easily stored and transmitted forms that may be used to reverse the atomization process and reassemble the user data 104 from network storage devices or media 110. The Make AtomKey function 312 may receive as an input a Key Lock 314, which may be a private key or a public key. The function 312 may also receive as an input Key Information 316, which may be information (which may be public or not secret) that may be included as part of the enhanced exported AtomKey 304; this Key Information 316 may include comments, notes, logos, branding information, and address information (including "From" and "To" fields).

Figure 14:
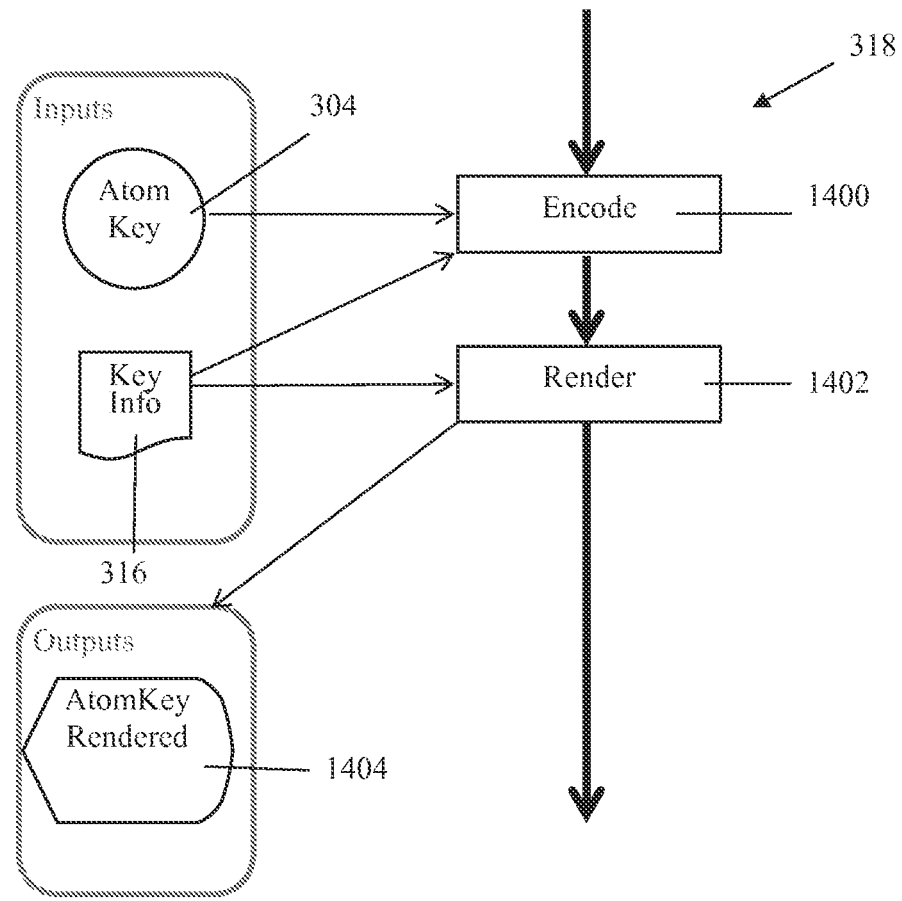
FIG. 14 is a schematic of the Export AtomKey function according to one embodiment.

The atomizing process 202 may next include an Export AtomKey function 318, which is further described with respect to FIG. 14. This function 318 may encode the AtomKey 304 into a usable form for transmission, storage, or transportation.

Figure 4:
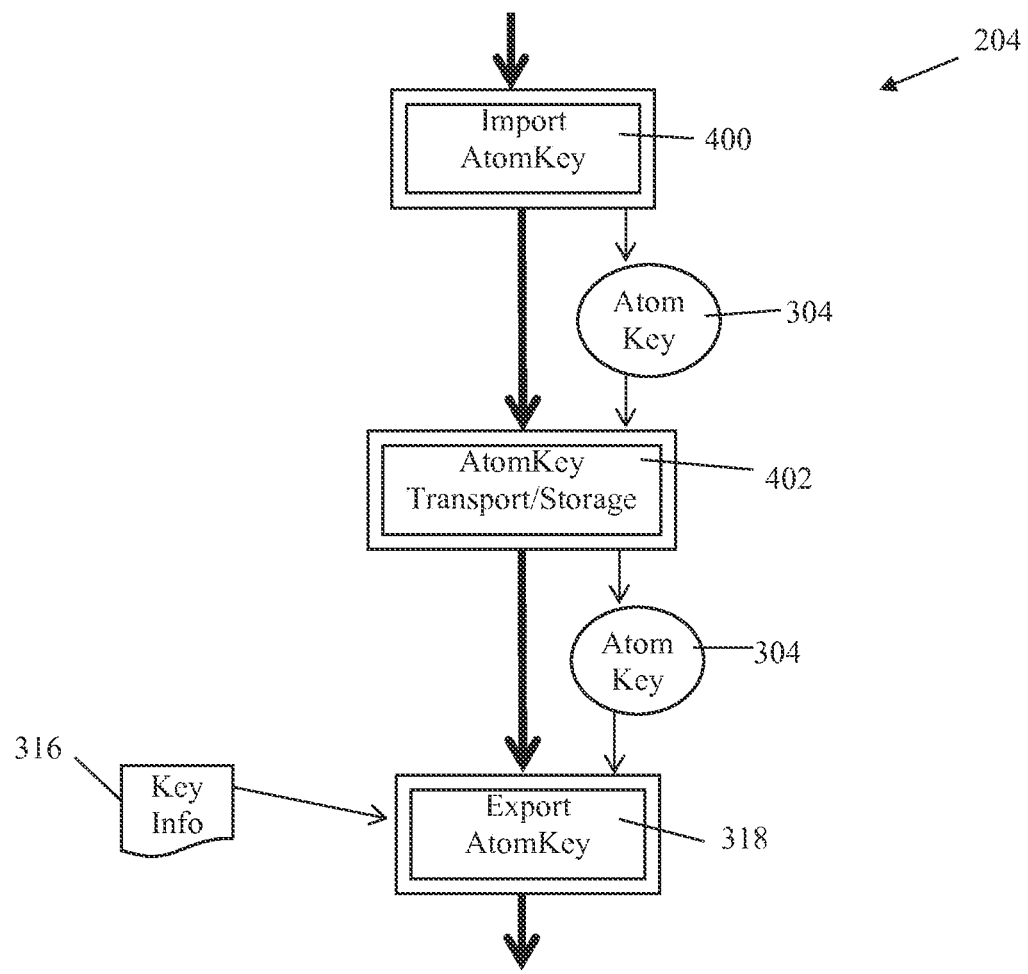
FIG. 4 is an overview schematic of the AtomKey handling process according to one embodiment.

FIG. 4 shows an overview schematic of the AtomKey handling process 204 according to one embodiment. The atomizing process 202 may produce an AtomKey 304 that may be used to reassemble the user data 104. The user may transport this AtomKey 304 to a recipient to share the user data 104, or the user may store the AtomKey 304 to allow future reassembly. This AtomKey handling process 204 may be done on the source or destination devices (for example the first mobile phone 112 and the second mobile phone 114). The atomizing process 202 and creation of the AtomKey 304 may occur on the first computer 102, the AtomKey 304 may be secure because it never entered the cloud 108, and control of when and how to transport the AtomKey 304 may be with the user solely.

Figure 15:
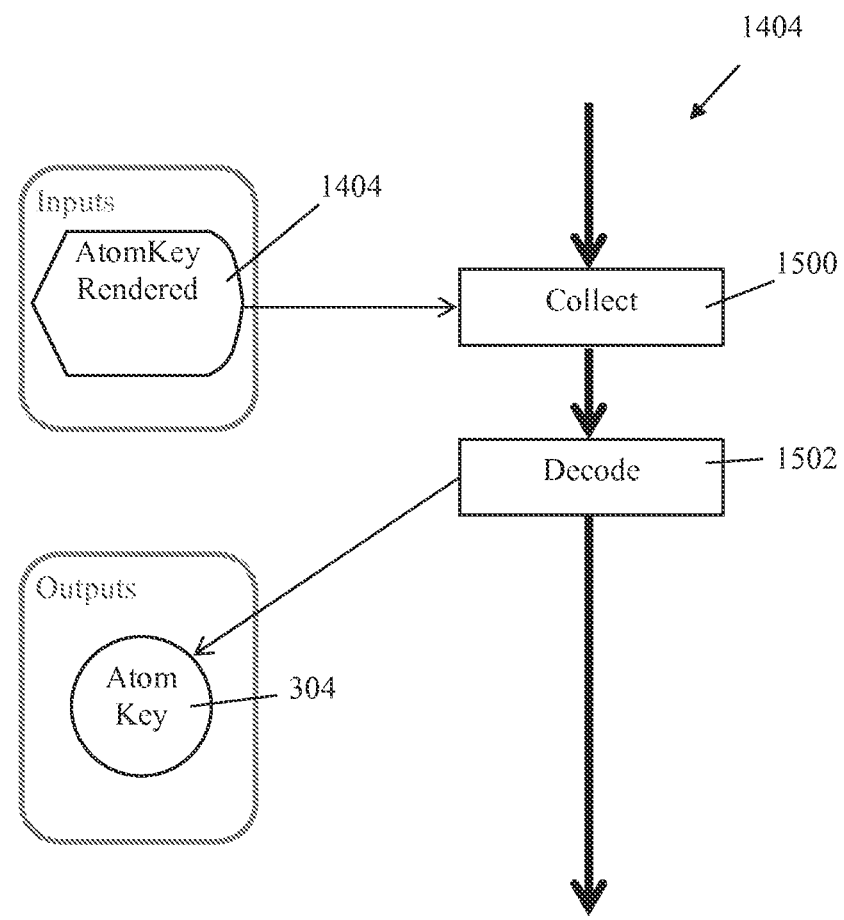
FIG. 15 is a schematic of the Import AtomKey function according to one embodiment.

This AtomKey handling process 204 may include an Import AtomKey function 400, which is further described with respect to FIG. 15. This function 400 may collect and decode an enhanced, encoded AtomKey Rendered 1404, which has been exported for a usable form for transmission, storage, or transportation, to the simple AtomKey 304.

The AtomKey handling process 204 may next include an AtomKey Transport/Storage function 402, which may be two separate functions (AtomKey Transport 2208 and AtomKey Storage 2210) that are further described with respect to FIGS. 22a-b. The atomization of user data 104 may result in a highly compressed, encrypted, and easily shared or stored AtomKey 304. Because of the small size and inherent security of the AtomKey 304, it may be easily and effectively transported on a wide variety of transmission protocols and mediums. These transmission protocols and mediums may provide additional levels of security as they utilize out-of-band (different transport mechanism than atomized data) transport. These protocols and mediums may be nearly out-of-band, like SMS or MMS technologies, or more like fax or other audio modulation mediums, or even couriers or the U.S. Postal Service delivering a physical AtomKey 304 that has been printed. The storage of AtomKeys 304 is efficient (due to a very small size) and secure because the AtomKeys 304 themselves are encrypted, and the actual user data 104 has been atomized. The AtomKey 304 and the Key Lock 314 necessary to unlock the AtomKey 304 may each be transmitted in a different band from each other and out of band with the stored data to enhance security.

The AtomKey handling process 204 may next include an Export AtomKey function 318, which may operate as discussed above with respect to FIG. 3.

Figure 5:
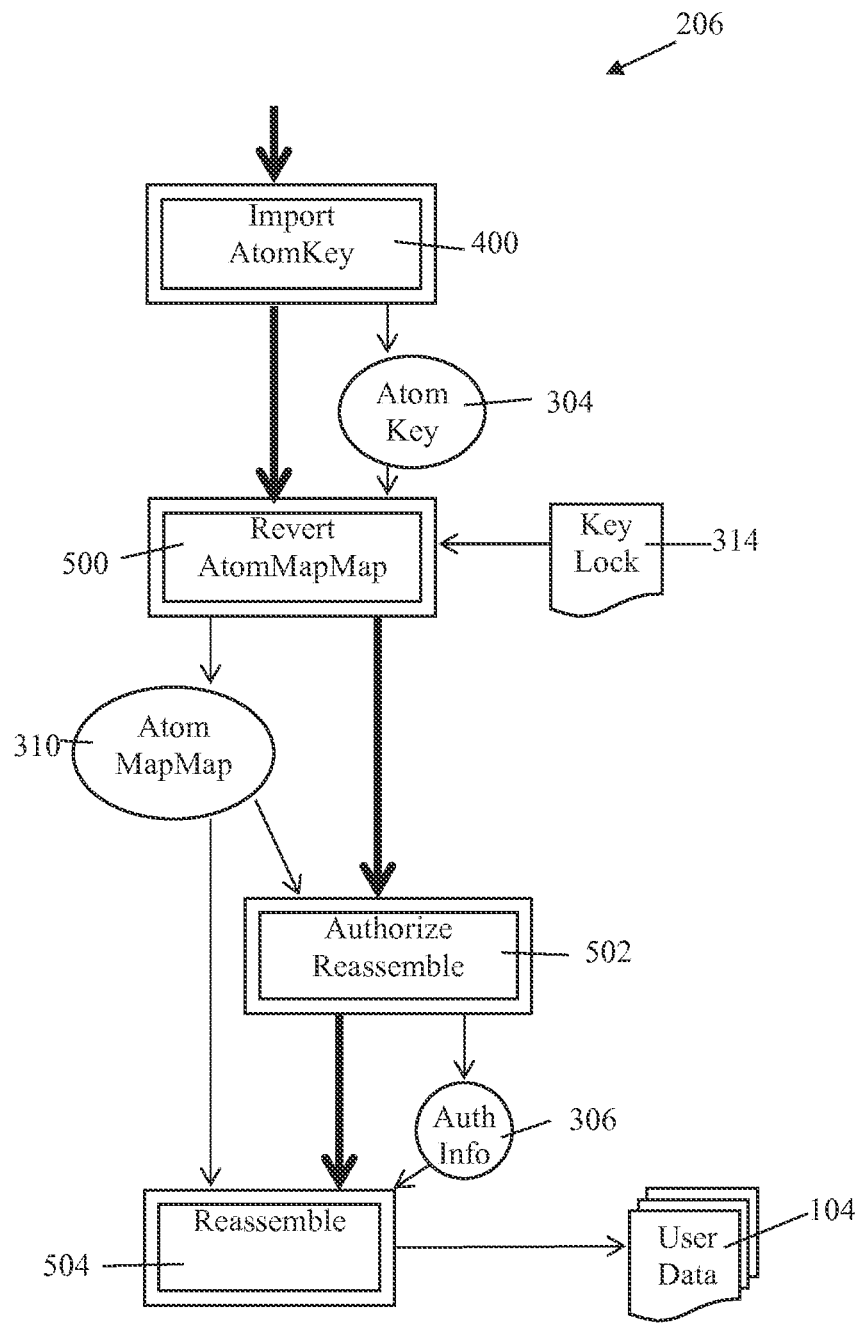
FIG. 5 is an overview schematic of the de-atomizing process according to one embodiment.
Figure 6:
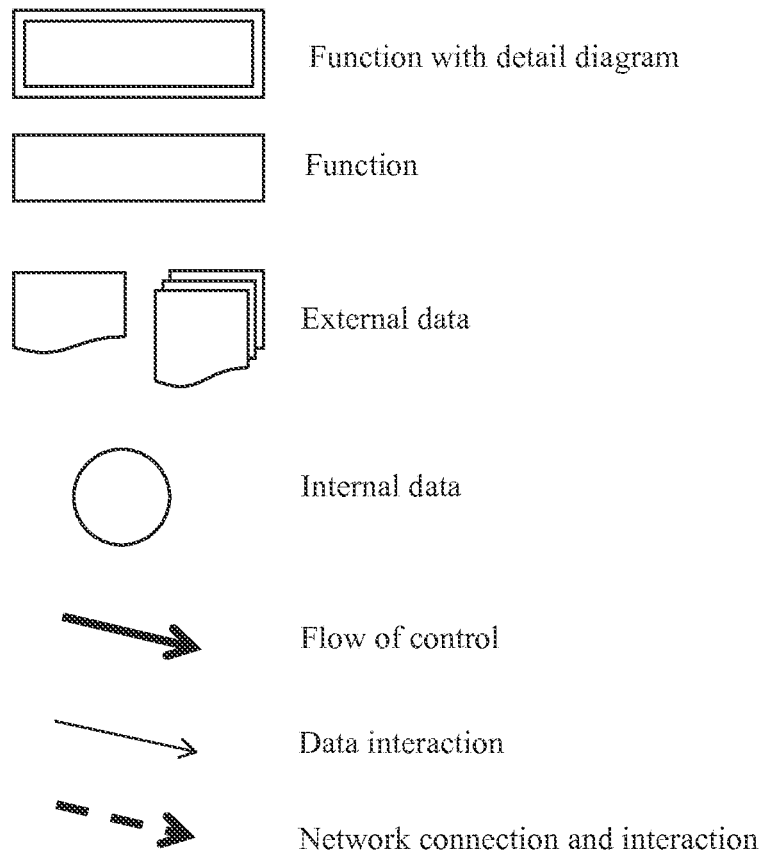
FIG. 6 shows a legend for FIGS. 3-26.

FIG. 5 shows an overview schematic of the de-atomizing process 206 according to one embodiment. This process 206 may include an Import AtomKey function 400, which may operate as discussed above with respect to FIG. 4.

Figure 16:
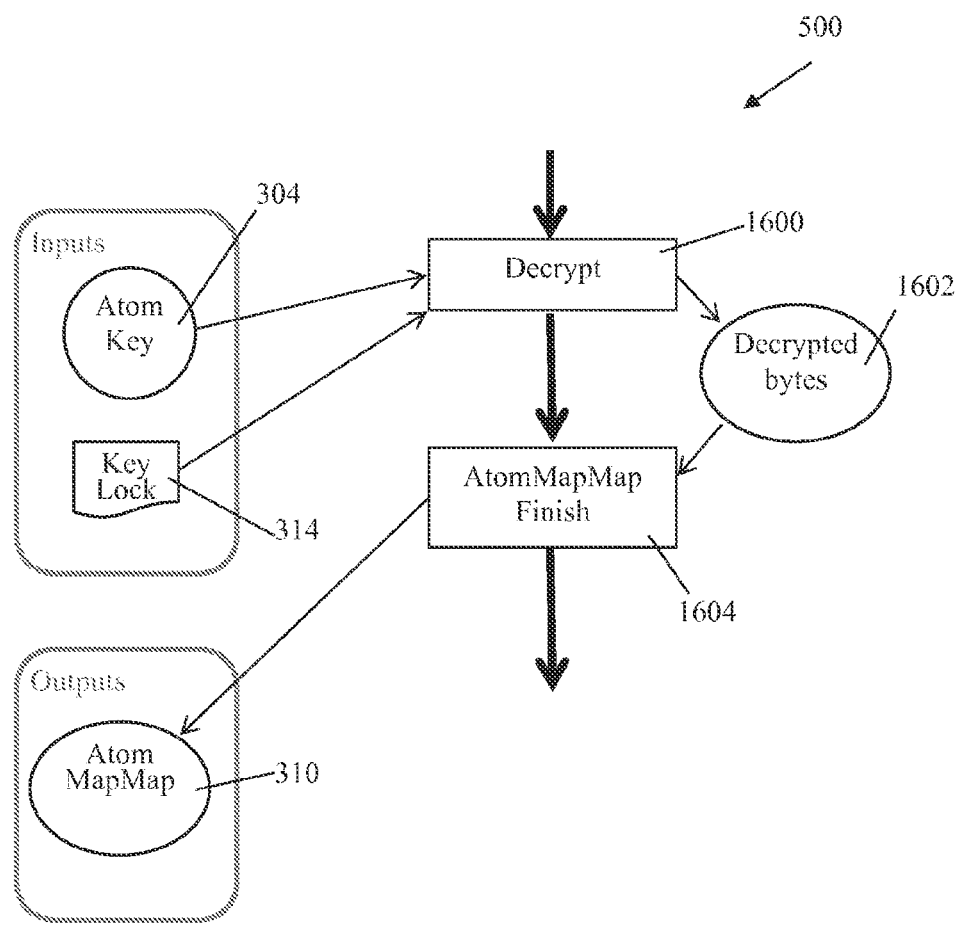
FIG. 16 is a schematic of the Revert AtomMapMap function according to one embodiment.

The de-atomizing process 206 may next include a Revert AtomMapMap function 500, which is further described with respect to FIG. 16. This function 500 may revert an AtomKey 304, which contains minimal concise and encrypted information used to start the reassembly of user data 104, to the full and uniform Atom MapMap 310 by using the Key Lock 314.

Figure 17:
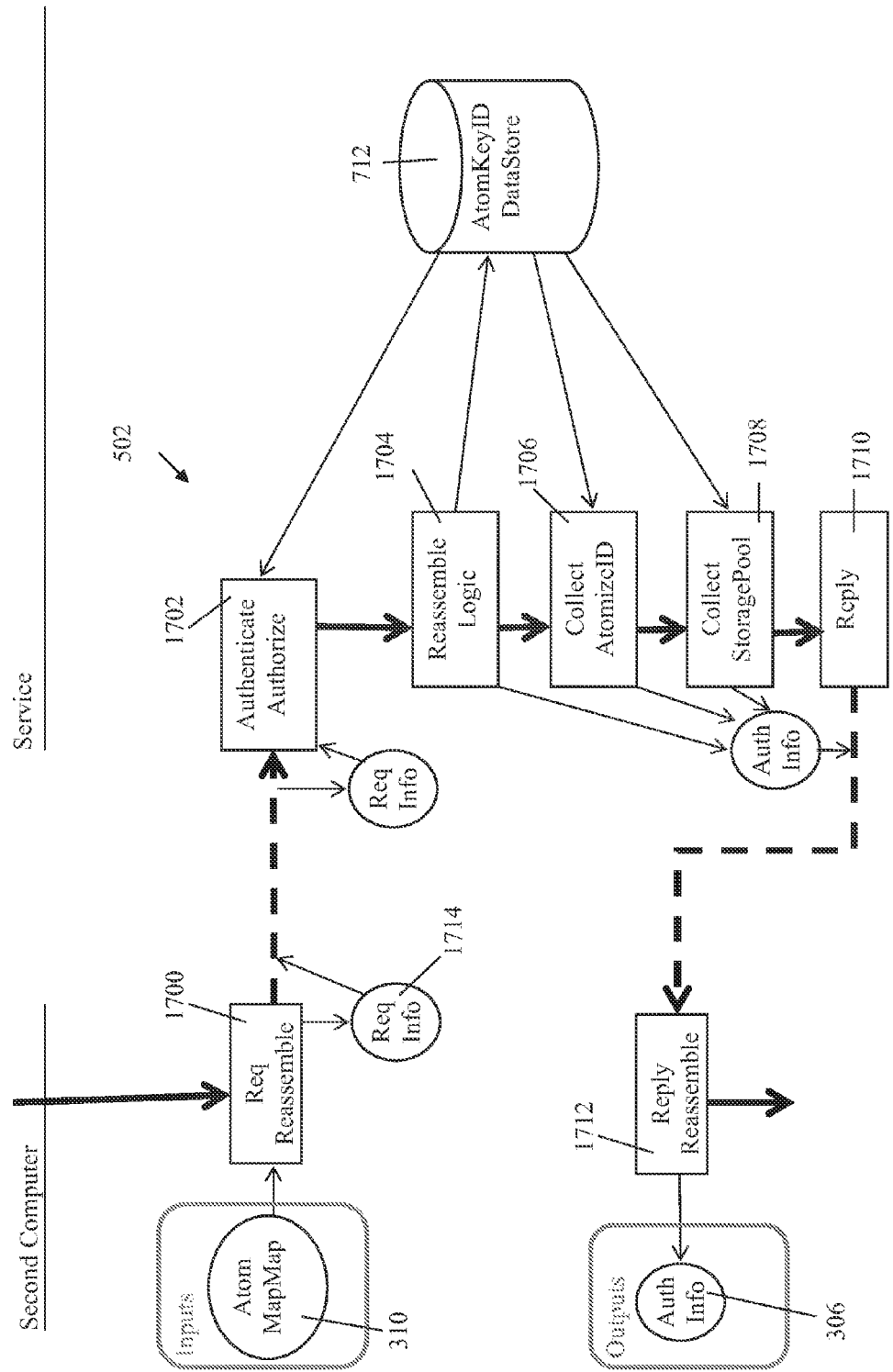
FIG. 17 is a schematic of the Authorize Reassemble function according to one embodiment.

The de-atomizing process 206 may next include an Authorize Reassemble function 502, which is further described with respect to FIG. 17. This function 502 may check with the system 100 before allowing and providing the necessary authorization information 306 to reassemble user data 104.

Figure 18:
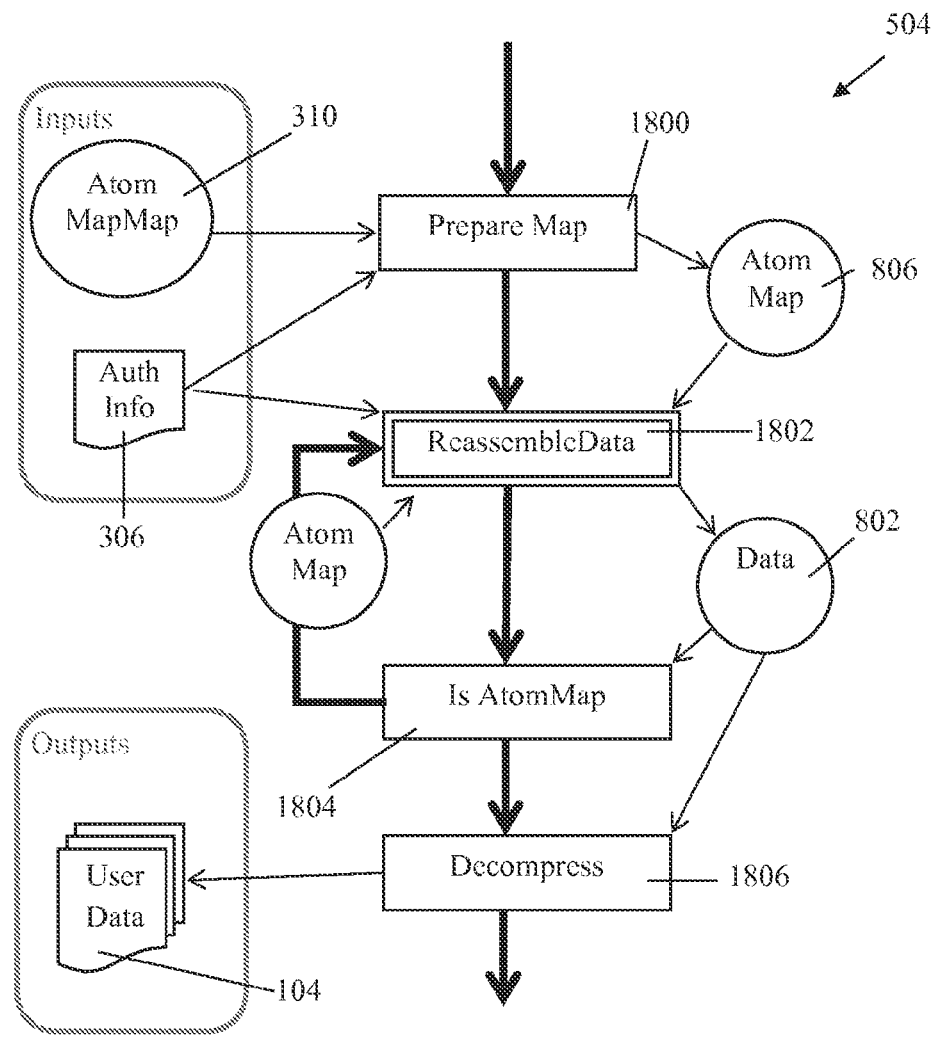
FIG. 18 is a schematic of the Reassemble function according to one embodiment.

The de-atomizing process 206 may next include a Reassemble function 504, which is further described with respect to FIG. 18. This function 504 may use an Atom MapMap 310 to reconstruct the user data 104. The function 504 may reconstitute the reverse AtomMap chain (the Atom MapMap 310 may reconstruct another larger AtomMap 806) until the original stored user data 104 is reassembled.

Figure 7:
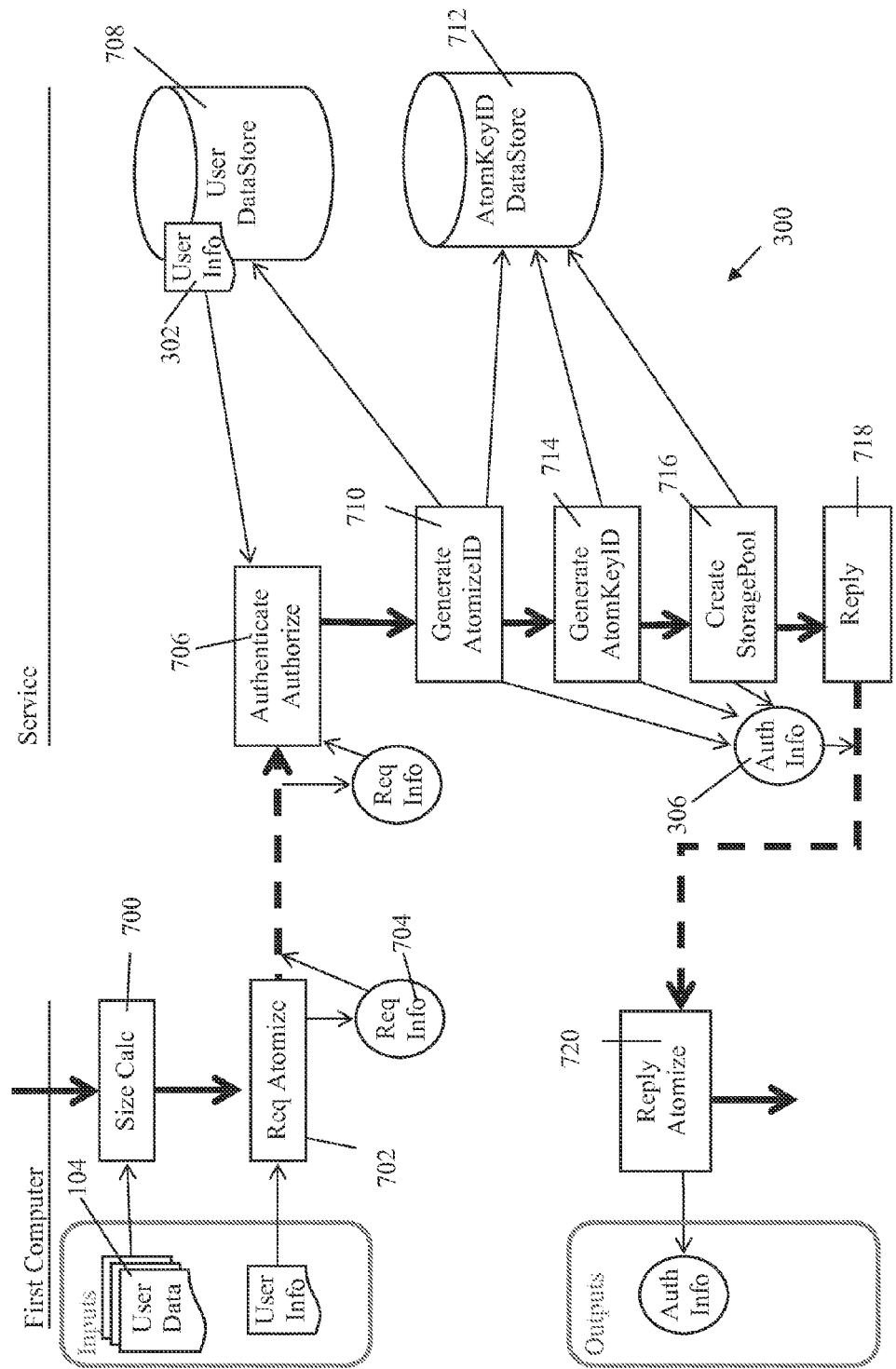
FIG. 7 is a schematic of the Authorize Atomize function according to one embodiment.

FIG. 7 shows a schematic of the Authorize Atomize function 300 according to one embodiment. This function 300 may include a Size Calc function 700, which may determine the size of the user data 104 to be atomized prior to atomization to ensure compliance and cost.

The Authorize Atomize function 300 may next include a Req Atomize function 702, which may prepare and send properly formatted service request information 704 to the service, which may be hosted on the cloud 108, to authorize the specified atomization. This service may provide an AtomKeyID, an AtomizeID, and an AtomStorage List to perform atomizing and de-atomizing; however such a service may have no knowledge of the user data 104, Atoms 1102, AtomMaps 806, or AtomKeys 304. This service may sell atomizing services to others or may offer atomizing services to its employees. This request information 704 may include data defining the size of the user data 104 to be atomized (which may be the aggregate of all selected user data 104) and may include user authentication information. The request information 704 may include cost-related information. This function 702 may, in one embodiment, sent an HTTPS restful service request with post data including the request information 704. In one embodiment, the transmission may be a TLS (HTTPS) transmission for protection. The request information 704 may be information that is not secret where no part of the content of the user data 104 to be atomized is included in the request information 704.

The Authorize Atomize function 300 may next include an Authenticate Authorize function 706, which may be a back-end function on the web services (which may be cloud-based) of the system 100 to verify that the user information 302 shows an existing user (authentication) and that the requested action to atomize data (based on size) is allowed under the user's account (authorization). This function 706 may receive information from the User DataStore 708, which may contain persistent data about users signed up to use the system 100. The User DataStore 708, which may be stored on the cloud 108, may be used for billing and tracking use, and may contain no information about the data, its content, security or location.

The Authorize Atomize function 300 may next include a Generate AtomizeID function 710, which may generate a large random identification (e.g., 128-bit) that may be used in a SHA-256 generation of the final AtomMap AtomID, which may be a long random identification (e.g., 20 bytes) that uniquely identifies an Atom 1102 but has no information about what it is a part of, where it came from, what it contains, how it is organized, or any other meaning. This complete lack of information or relationship between AtomIDs and Atoms 1102, the AtomMap 806, or the AtomKey 304 results in security. The AtomID may be stored in the AtomKeyID DataStore 712, which may be stored on the cloud 108. The AtomKeyID DataStore 712 may contain persistent data about AtomKeyIDs and AtomIDs, and it may be used for billing and tracking atomizations and reassemblies. The DataStore 712 may contain no information about the data, its content, security or location; instead it 712 may contain information on when an AtomKey 304 was made, when it 304 expires, and when it 304 was used to reassemble the user data 104. Atoms 1102 may be retrieved only with an AtomMap 806 using the AtomIDs of the Atoms 1102.

The Authorize Atomize function 300 may next include a Generate AtomKeyID function 714, which may generate a long random unique identification (e.g., 128-bit) that may be used to identify the eventual AtomKey 304 produced by the atomizing process 202. This identification may contain no information about the data 104 being atomized or that could be used to associate the atomized data by location, name, or content. This identification may be stored on the AtomKeyID DataStore 712.

The Authorize Atomize function 300 may next include a Create StoragePool function 716, which may generate a list of possible data storage locations to store the Atoms 1102 produced during the atomizing process 202. During the atomizing process 202, data storage locations may be randomly selected from this list for each Atom 1102. Such random data may also be kept in the AtomMap 806 and not transmitted to the services in the cloud 108. The AtomID, AtomKeyID, and storage pool list (StoragePool) may together comprise the authorization information 306.

The Authorize Atomize function 300 may next include a Reply function 718, which may return data from a request. This function 718 may transport the authorization information 306 back to the first computer 102 that sent the request information 704 in function 702. The Reply function 718 may perform the required data formatting and transmit the data back over the connection between the cloud 108 and the first computer 102. The transmitted data may be the requested information or a refusal to authorize. The Authenticate Authorize function 706, Generate AtomizeID function 710, Generate AtomKeyID function 714, Create StoragePool function 716, and Reply function 718 may be performed by service computers in the cloud 108 in one embodiment. In another embodiment, at least one of such functions may be performed on the first computer 102.

The Authorize Atomize function 300 may next include a Reply Atomize function 720, which may work with the Reply function 718 to receive a reply to the sent request information 704 for further use in the atomizing process 202. This transmission from the service may occur over TLS/HTTPS. This information may contain nothing that is secret or contains any information about the data 104 to be atomized.

FIG. 8 shows a schematic of the Atomize function 308 according to one embodiment. This function 308 may include a Compress function 800, which may compress the user data 104 using industry-standard data compression techniques. The AtomMap 806 may include information on the type of compression used for decompression purposes at the end of the Reassemble function 504. The user data 104 may be converted into an intermediate data state 802 during processing, for example after the Compress function 800.

Figure 9:
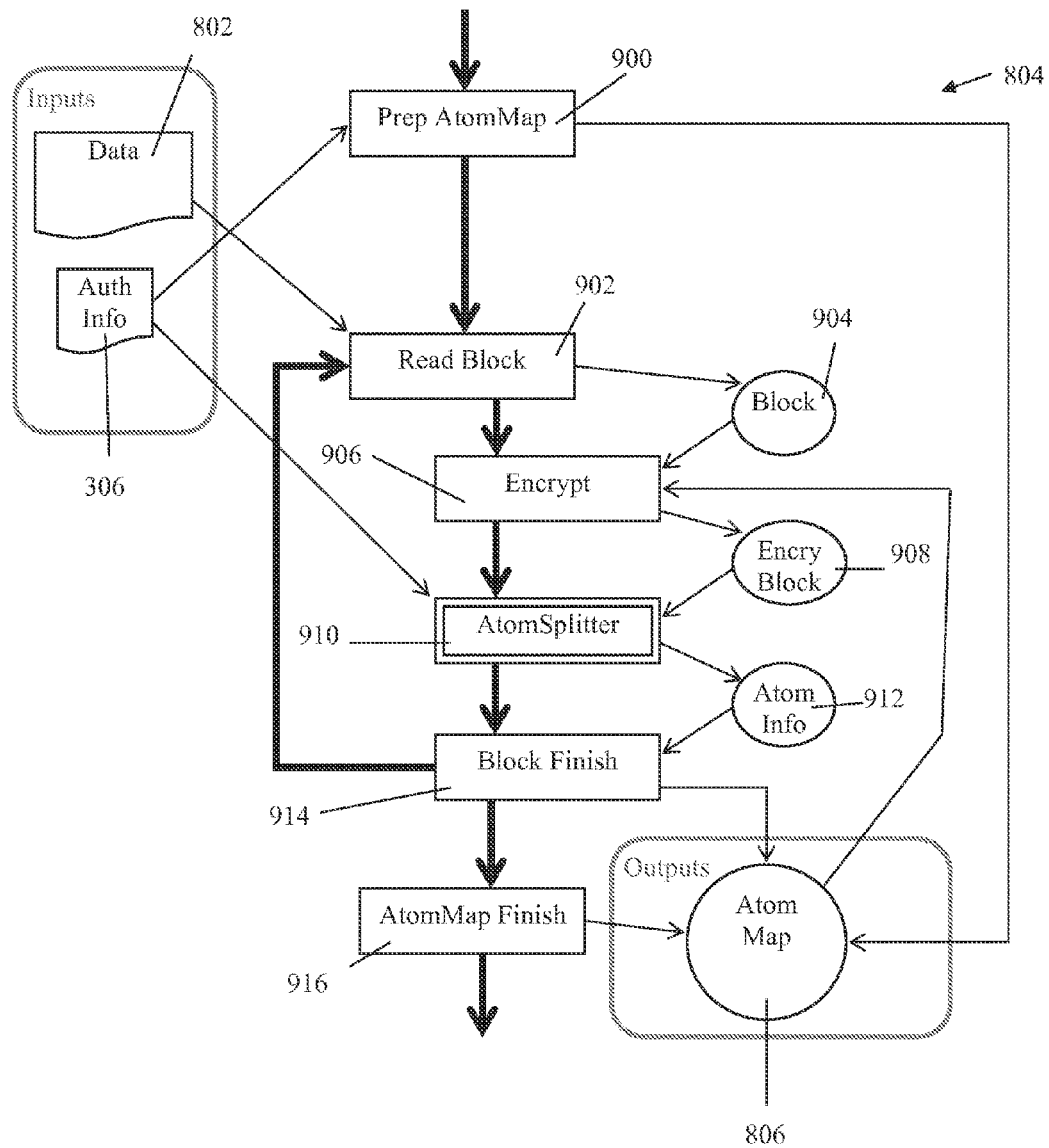
FIG. 9 is a schematic of the AtomizeData function according to one embodiment.

The Atomize function 308 may next include an AtomizeData function 804, which is further described with respect to FIG. 9. This function 804 may take any data, such as data 802, and atomize it to produce an AtomMap 806 of how to reassemble the data 802 later. An AtomMap 806 may contain information created or gathered during the atomizing process 202 that may be used during the de-atomizing process 206 and reconstitute the user data 104. The AtomMap 806 may include information about the AtomMap 806 itself, including the version or defining format of the AtomMap 806, the compression type, the encryption type, the encryption key, the encryption initialization vector, the BlockList (which may include how the files were taken apart, including the size, location, and AtomSplit keys), and the AtomList (which may include the names of all Atoms 1102, including chaff Atoms, and the index into the StoragePool list).

In one embodiment, the Atomize function 308 may next include a Small Enough function 808, which may evaluate an AtomMap 806 produced by the AtomizeData function 804 to determine if it 806 should be further reduced by the AtomizeData function 804 or if it is an appropriately-sized Atom MapMap 310 and can become an AtomKey 304. If desired, the AtomMap 806 is recursively fed back into the AtomizeData function 804 to atomize the AtomMap 806 and reduce its size. In such an embodiment, each additional pass that atomizes an AtomMap 806 may really produce an Atom MapMap 310 as the output; however, the recursive processing in the AtomizeData function 804 may operate the same without distinction as to which iteration is processed. This iterative process may eventually produce an AtomKey 304 that may be represented in less than 100 bytes.

FIG. 9 shows a schematic of the AtomizeData function 804 according to one embodiment. This function 804 may include a Prep AtomMap function 900, which may create and set up information in an AtomMap 806, including version and data size. This function 804 may also create a long random encryption key for all data and an initialization vector (IV) for starting randomization, and may note and validate the encryption type. The function 900 may set up the AtomMap 806 based on authorization information 306.

The AtomizeData function 804 may next include a Read Block function 902, which may take the intermediate data 802 and read a chunk or Block 904 of the data 802 at a time for ease of processing. The size of a Block 904 (the set amount of bytes from the data 802) may be a parameter that can be varied. In one embodiment, this chunk-based processing does not affect how the atomization and separation occurs but is only useful to manage the size of data processed at a time.

The AtomizeData function 804 may next include an Encrypt function 906, which may encrypt each Block 904 with the encryption type, key, and IV defined in the AtomMap 806 to produce an Encrypted Block 908, which is a block of encrypted bytes from the data 802. The type and strength of encryption used may be a parameter that can be set per atomization based on what is being atomized or based on who the user is. In any case, the system 100 may maximize the encryption protection because the key for any encryption type may be long and random. Another benefit of encryption may be ensuring the data 802 was not altered or corrupted in transmission, similar to a checksum or hashID function.

Figure 10:
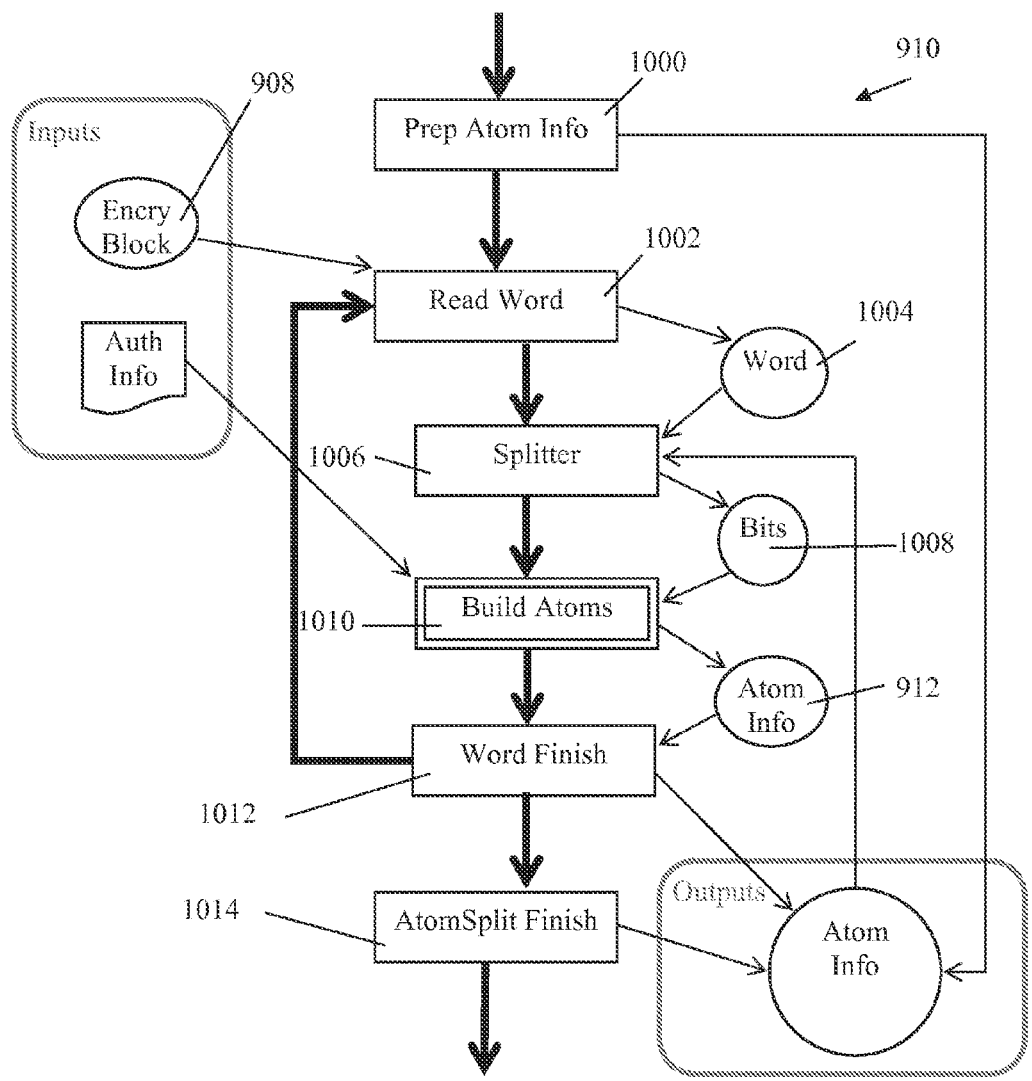
FIG. 10 is a schematic of the AtomSplitter function according to one embodiment.

The AtomizeData function 804 may next include an AtomSplitter function 910, which is further described with respect to FIG. 10. This function 910 may split the data (in each Encrypted Block 908) at the bit level into disassociated pools called Atoms 1102 and provide Atom information 912 defining a block 908 (by size and address) and the Atoms that have the bits of the block 908, and how to retrieve the bits. This Atom information 912 may be stored in the AtomMap 806 in the BlockList and the AtomList.

The AtomizeData function 804 may next include a Block Finish function 914, which may update the AtomMap 806 with the new BlockList and AtomList information. If there are more than one Block 904 to process, the function 914 may return the AtomizeData function 804 back to the Read Block function 902 to process the next Block 904. If all of the Blocks 904 have been processed, the function 914 may finalize the AtomMap 806.

The AtomizeData function 804 may next include an AtomMap Finish function 916, which may ensure that the AtomMap 806 is finished and has all of the BlockList and AtomList data.

FIG. 10 shows a schematic of the AtomSplitter function 910 according to one embodiment. This function 910 may include a Prep Atom Info function 1000, which may set up the Atom information 912 for the current Encrypted Block 908 being processed, which may ensure that there is an AtomSplitKey and Atoms 1102 ready to receive the split bit pools 1008 from the Splitter function 1006. This function 1000 may also create an AtomID for this Atom 1102.

The AtomSplitter function 910 may next include a Read Word function 1002, which may take the Encrypted Block 908 and read a Word 1004 (or a set of bits) from it 908. The Word size (number of bits) may be a parameter that is defined by the AtomSplitKey.

The AtomSplitter function 910 may next include a Splitter function 1006, which may split a Word 1004 into separate pools 1008 of bits. A large random key—AtomSplitKey—may define how the bits of the Word 1004 are split apart. The AtomSplitKey may be composed of n positions or slots (where n is a parameter that could be changed), where each position covers a Word 1004. The positions may be rotated so that each is used per Word 1004 until the $n^{th}$ position, at which point the first position may be used again in a wrapping manner to cover all of the Words 1004. Each position may include two or more bitmasks. Each bitmask may define the bits that will go to a particular bit pool 1008 associated with that bitmask. The number of bitmasks per position may determine how many concurrent Atoms 1002 are used to split one Word 1004. If a bitmask contains a "1" in the location of a bit of a Word 1004, then that bit may be assigned to the bit pool 1008 associated with that bitmask. If a bitmask contains a "0" in the location of a bit of a Word 1004, then that bit will not be assigned to the bit pool 1008 associated with that bitmask. Each bitmask may include not more than half of the bits of a Word 1004. The bitmasks may be matched to the Word size to capture all of the bits of the Word 1004. Each bit pool 1008 may be appended to any existing bits of the Atom 1102 associated with that bit pool 1008. The resulting Atoms 1102 would then contain partial and random parts of the Word 1004 and may be stored in random locations with long random identifications.

An simplified example may be illustrative. Assume a 10-"bit" word, W—ABCDEFGHIJ. These are really not bits because they are not either a "1" or a "0"; however, they will more easily illustrate the example. Assume three bitmasks from the AtomSplitKey for the position for this Word: M1=0100010010, M2=1011001000, and M3=0000100101. M1 is associated with bit pool 1, M2 is associated with bit pool 2, and M3 is associated with bit pool 3. Thus, applying these bitmasks to the word produces the following three bit pools: pool 1=BFI, pool 2=ACDG, and pool 3=EHJ. Pool 1 may be appended to the existing bits of Atom 1, pool 2 may be appended to the existing bits of Atom 2, and pool 3 may be appended to the existing bits of Atom 3.

Figure 11:
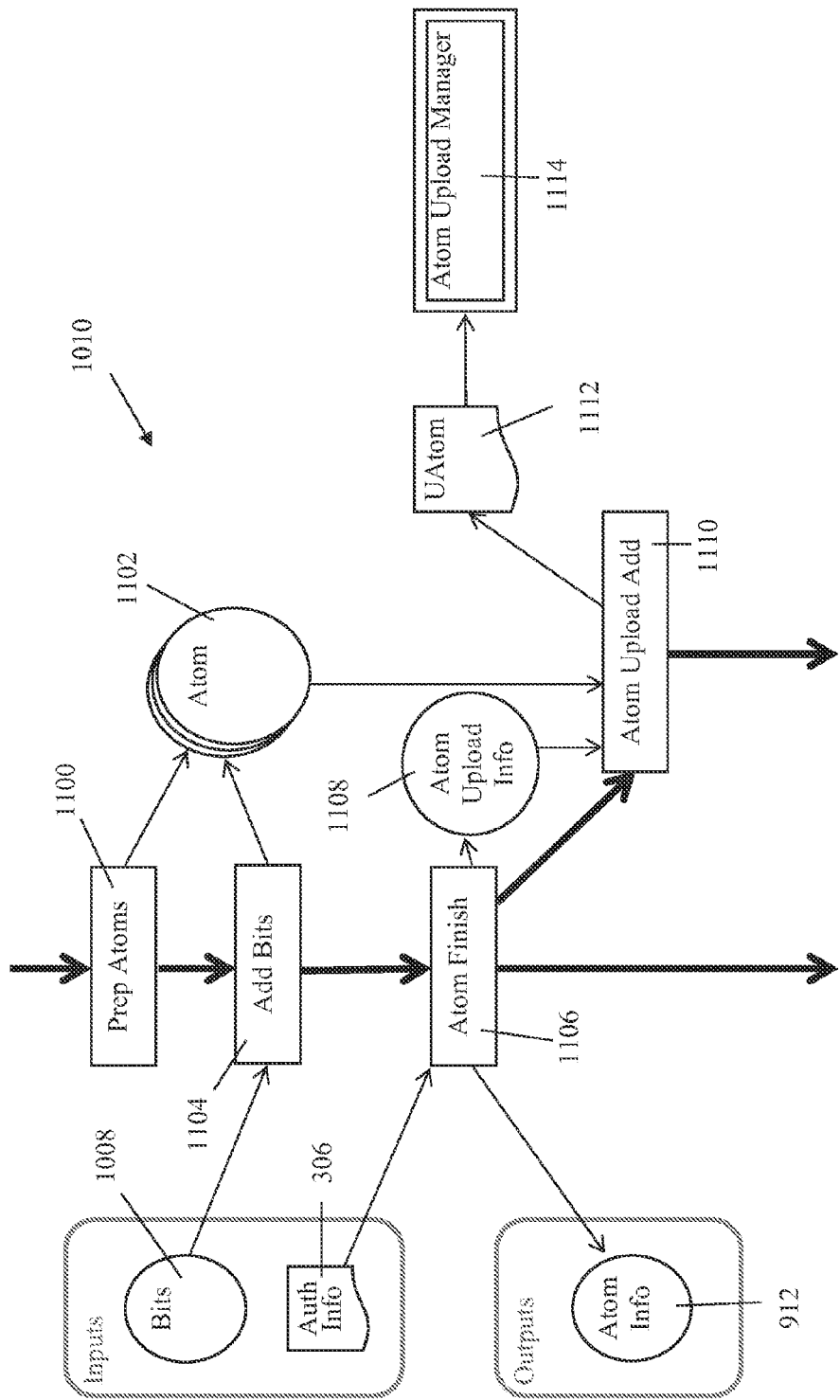
FIG. 11 is a schematic of the Build Atoms function according to one embodiment.

The AtomSplitter function 910 may next include a Build Atoms function 1010, which is further described with respect to FIG. 11. This function 1010 may append bit pools 1008 to separate Atoms 1102. When an Atom 1102 is full, the function 1010 may prepare it 1102 for transmission and send it 1102. This function 1010 may prepare the Atom information 912 described previously.

The AtomSplitter function 910 may next include a Word Finish function 1012, which may add to the Atom information 912 any new information created during the Build Atoms function 1010. The Word Finish function 1012 may repeat the function 910 from the Read Word function 1002 if there are more Words 1004 to be read.

The AtomSplitter function 910 may next include an Atom-Split Finish function 1014, which may finalize the Atom information 912 from the AtomSplitter function 910.

FIG. 11 shows a schematic of the Build Atoms function 1010 according to one embodiment. This function 1010 may include a Prep Atoms function 1100, which may prepare Atoms 1102 and an AtomSplitKey to receive the split bit pools 1008. This function 1010 may make new Atoms and AtomSplitKeys as necessary. The AtomSplitKeys may be added to the Atom information 912 for inclusion in the AtomMap 806.

The Build Atoms function 1010 may next include an Add Bits function 1104, which may append each bit pool 1008 to its respective Atom 1102 data. An Atom 1102 may be a small set of disassociated bits split from the encrypted user data 104. The Atom 1102 may have no structure or meta-data about its content, where the content came from, or where the content belongs. The Atom 1102 may be identified with a random long unique identification (for example, 20 bytes) that has no associative information about where the Atom 1102 came from or is a part of An Atom 1102 may include not more than 50% of the bits from any Word 1004, and the included bits may be randomly determined by the AtomSplitKey.

The Build Atoms function 1010 may next include an Atom Finish function 1106, which may finalize an Atom 1102 and its Atom information 912 if the Atom 1102 is full. This function 1106 may also randomly select the storage destination for each Atom 1102 based on the authorization information 306, and may determine how much chaff Atoms will be sent with real Atoms 1102; such information may be stored in the Atom Upload Information 1108.

The Build Atoms function 1010 may next include an Atom Upload Add function 1110, which may use Atoms 1102 and Atom Upload Information 1108 to make a UAtom 1112 to be sent to the Atom Upload Manager function 1114 to upload. A UAtom 1112 may include the Atom 1102 data as well as meta-data about the Atom 1102, including its identification (AtomID), identification of chaff Atoms (ChaffIDs, which may be AtomIDs of chaff Atoms), and the storage destinations for all. A UAtom 1112 may be destroyed once the Atom Upload Manager function 1114 has sent the Atoms 1102 defined by the UAtom 1112.

The Build Atoms function 1010 may next include an Atom Upload Manager function 1114, which may manage the process (which may be a synchronous) of sending Atoms 1102 over a network to various specified storage services and devices 110.

Figure 12:
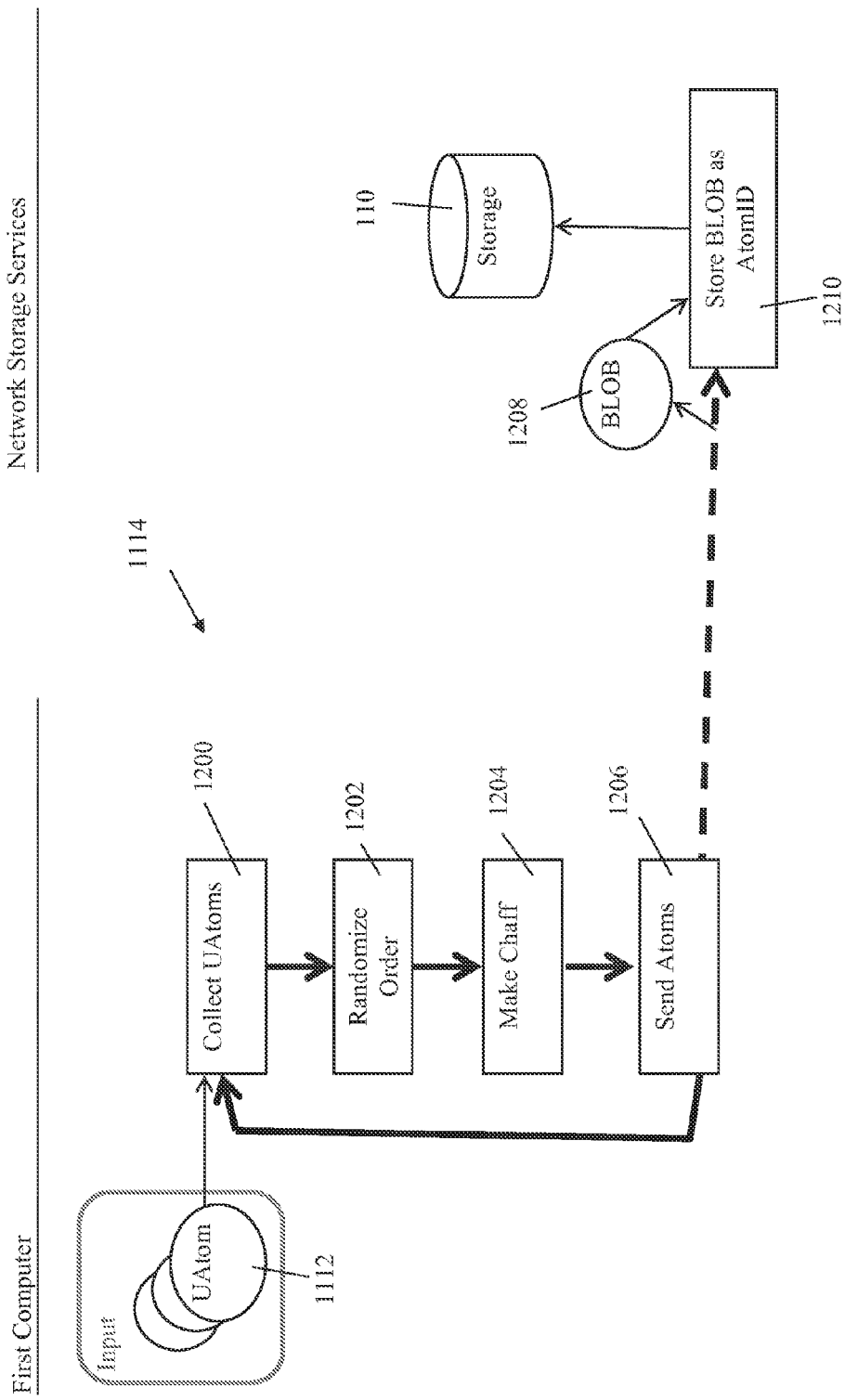
FIG. 12 is a schematic of the Atom Upload Manager function according to one embodiment.

FIG. 12 shows a schematic of the Atom Upload Manager function 1114 according to one embodiment. This function 1114 may include a Collect UAtoms function 1200, which collects UAtoms 1112 that are ready to be stored remotely or uploaded to the cloud 108.

The Atom Upload Manager function 1114 may next include a Randomize Order function 1202, which may select in random order the UAtoms 1112 that have been collected to be transmitted to storage 110. The random order of sending Atoms 1102 may make it impossible to gain an understanding of the relationship between the original user data 104 and the sent Atoms 1102. In one embodiment, the Randomize Order function 1202 may proceed only if there is a sufficient number of UAtoms 1112 to select from. The number of UAtoms 1112 collected before randomizing may be a parameter that may be changed. This number may reflect balancing security, memory usage, and latency; a smaller number may process faster, take less memory, but be less secure; a larger number may process slower, take more memory, but be more secure. In one embodiment, this function 1202 may proceed to randomize only if all of the UAtoms 1112 are collected.

The Atom Upload Manager function 1114 may next include a Make Chaff function 1204, which may use the list of ChaffIDs from the UAtoms 1112 to create chaff Atoms 1102, which are false Atoms 1102 filled with random data, that are indistinguishable from real Atoms 1102, as discussed previously. Chaff Atoms 1102 may greatly increase the effort required to de-atomize the user data 104 without the AtomMap 806.

The Atom Upload Manager function 1114 may next include a Send Atoms function 1206, which may randomly send either a real Atom 1102 or a chaff Atom 1102 to a defined Network Storage Service. The transmission may be a typical network transfer of data (e.g., HTTP post or TCP stream), and this function 1206 may perform the proper network handshakes and transfer. The Atom 1102 is sent as a Binary Large Object (or BLOB 1208), which is a group of bits with no internal structure or identifying meta-data. External to the first computer 102, the BLOB would have no meaning and no association with other Atoms 1102 or the AtomMap 806. This Send Atoms function 1206 may output progress events and success events to keep the user informed of the progress. If a transfer fails, this function 1206 may try to send the Atom 1102 again a determined number of times.

The Atom Upload Manager function 1114 may next include a Store BLOB as AtomID function 1210, which may store the Atom 1102 within the BLOB 1208 to a defined Network Storage Service based on the respective AtomID. A Network Storage Service may be any remote storage system. It may include at least one storage device 110 that is stored in the cloud 108. Multiple Network Storage Services may be used to store different Atoms 1102, which may be accessible from any location with access to the Network Storage Services. Examples of such Network Storage Services include private or public cloud storage (such as Amazon S3, DropBox, Box, Rackspace, Google Drive), private SAN or NAS (corporate or individual), WebDAV (which is a web server standard to store data), and FTP. A Network Storage Service may be the same as or different from the service providing atomizing and de-atomizing, as discussed above with respect to the Req Atomize function 702. A plurality of Network Storage Services with storage devices 110 may be used to enhance security by preventing a single point of hacking or compulsion. Locating these Network Storage Services in different jurisdictions or nations may enhance security.

FIG. 13 shows a schematic of the Make AtomKey function 312 according to one embodiment. This function 312 may include a Prep AtomKey function 1300, which may reduce and simplify the Atom MapMap 310 into a small concise set of bytes called the Pre AtomKey 1302. In one embodiment, the Pre AtomKey 1302 may be byte-compressed and minimized. The Pre AtomKey 1302 may be encrypted and encoded into easily stored and transmitted forms that may be used to de-atomize and reassemble user data 104 retrieved from storage devices 110. In one embodiment, the AtomKey 304 may only need to identify two Atoms 1102 (which is the smallest set needed for the final Atom MapMap 310), and no BlockList is required as only one block is used.

The Make AtomKey function 312 may next include an Encrypt function 1304, which may use a Key Lock 314 to encrypt the Pre AtomKey 1302 into a set of encrypted bytes 1306. This function 1304 may operate similar to the Encrypt function 906. A Key Lock 314 may be any technique to lock the AtomKey 304 so that a "key" is required to reassemble the user data 104. The Key Lock 314 may vary depending on the use and transport or storage mechanisms. Examples of the Key Lock 314 include private key encryption (symmetric key), public key encryption (asymmetric key), and biometric encryption.

The Make AtomKey function 312 may next include an AtomKey Finish function 1308, which may finish making an AtomKey 304, a small and locked data set ready for encoding and use, from the encrypted bytes 1306. In one embodiment, the AtomKey 304 includes one byte to indicate the type of encryption and format of the AtomKey.

FIG. 14 shows a schematic of the Export AtomKey function 318 according to one embodiment. This function 318 may include an Encode function 1400, which may convert the bytes of an AtomKey 304 into a more usable form for transmission, storage, or transport. Examples include visual QR Code or base64 characters. This function 1400 may also add public (non-secret) Key Information 316 to enhance the utility of the AtomKey 304. For example, human-readable information or a logo may be added to a QR Code.

The Export AtomKey function 318 may next include a Render function 1402, which may produce the enhanced, encoded AtomKey Rendered 1404 that may be transmitted, stored, or transported. The AtomKey Rendered 1404 may be a QR Code displayed on a screen of the first computer 102 to be captured by a camera or scanned by an application of a first mobile phone 114 or other device. The AtomKey Rendered 1404 may be printed onto a physical piece of paper. The AtomKey Rendered 1404 may be rendered into base64 characters for typing or copying to the clipboard and pasting. In one embodiment, the Render function 1402 may also add any additional public Key Information 316 as previously discussed.

FIG. 15 shows a schematic of the Import AtomKey function 400 according to one embodiment. This function 400 may include a Collect function 1500, which may capture the AtomKey Rendered 1404 as electronic data that may be decoded. For example, this function 1500 may include using a second mobile phone 114 or other device to scan and capture the QR Code of the AtomKey Rendered 1404. In another embodiment, this function 1500 may include typing the base64 characters of the AtomKey Rendered 1404 into the second mobile phone 114 or other device.

The Import AtomKey function 400 may next include a Decode function 1502, which may convert the encoded AtomKey Rendered 1404 that was collected into the simple AtomKey 304 bytes.

FIG. 16 shows a schematic of the Revert AtomMapMap function 500 according to one embodiment. This function 500 may include a Decrypt function 1600, which may use the Key Lock 314 to decrypt the AtomKey 304 into decrypted bytes 1602. This function 1600 may use the encryption type and version in the decryption process.

The Revert AtomMapMap function 500 may next include an AtomMapMap Finish function 1604, which may revert the decrypted bytes 1602 containing the decrypted AtomKey 304 into an Atom MapMap 310, which may include the AtomList, the BlockList, and the encryption information.

FIG. 17 shows a schematic of the Authorize Reassemble function 502 according to one embodiment. This function 502 may include a Req Reassemble function 1700, which may use the Atom MapMap 310 to send request information 1714 from the second computer 116 to the service, which may be hosted on the cloud 108, to authorize the specified reassembly of user data 104. This function 1700 may properly format and transmit the request information 1714 as an HTTPS restful service request. The transmission may be protected by TLS (HTTPS). The function 1700 may need to send only the AtomKeyID to request authorization of reassembly. The request information 1714 may be properly formatted data with user authentication information. The atomizing process 202 and the de-atomizing process 206 may occur without passing the AtomKey 304 or the AtomMap 806 on the network.

The Authorize Reassemble function 502 may next include an Authenticate Authorize function 1702, which may be similar to the Authenticate Authorize function 706 used during the atomizing process 202. This function 1702 may be a back-end function on the web services to verify from the request information 1714 that the AtomKeyID exists (authentication) and permits reassembly (authorization).

The Authorize Reassemble function 502 may next include a Reassemble Logic function 1704, which may update the AtomKeyID DataStore 712 to reflect the request to reassemble. The system 100 may include modes that trigger the clean-up of Atoms 1102 based on the number of reassemble requests; such instructions may be added to the authorization information 306 and returned to the requester.

The Authorize Reassemble function 502 may next include a Collect AtomizeID function 1706, which may collect and return the associated AtomizeID in the authorization information 306 from the AtomKeyID DataStore 712.

The Authorize Reassemble function 502 may next include a Collect StoragePool function 1708, which may collect and return the associated StoragePool list in the authorization information 306 from the AtomKeyID DataStore 712. The storage destination index from the StoragePool list may be used by the Reassemble function 504 to know where each Atom 1102 was stored.

The Authorize Reassemble function 502 may next include a Reply function 1710, which may finish building the authorization information 306 and return it to the second computer 116. If reassembly is allowed, the authorization information 306 may be returned; if not, a failure code or a message may be returned indicating, for example, that the request information 1714 or Atom 1102 may have expired, may have been removed, or may be invalid. The reply may be transmitted over the established connection (TLS/HTTPS). This Reply function 1710 may be similar to the Reply function 718 used during the atomizing process 202.

The Authorize Reassemble function 502 may next include a Reply Reassemble function 1712, which may receive the authorization information 306 in the second computer 116 from the network service.

FIG. 18 shows a schematic of the Reassemble function 504 according to one embodiment. This function 504 may include a Prepare Map function 1800, which may check the Atom MapMap 310 to ensure it 310 conforms with the full Atom-Map format and definition.

The Reassemble function 504 may next include a Reassemble Data function 1802, which may collect and reassemble original data that produced the AtomMap 806 during the atomizing process 202. This function 1802 may use the AtomMap 806 to reassemble the atomized data that the AtomMap 806 represents. The data to be reassembled may be user data 104 or another AtomMap 806. This function 1802 is more fully described in FIG. 19.

The Reassemble function 504 may next include an Is AtomMap function 1804, which may determine the type of the reassembled data 802. If the data 802 is an AtomMap 806, this function 1804 may return the data 802 for another pass of the ReassembleData function 1802, which may iterate until the underlying user data 104 is reassembled.

The Reassemble function 504 may next include a Decompress function 1806, which may decompress the data 802 if the original user data 104 was compressed. The type of compression used may be defined in the AtomMap 806. The result of this function 1806 may be the original user data 104.

Figure 19:
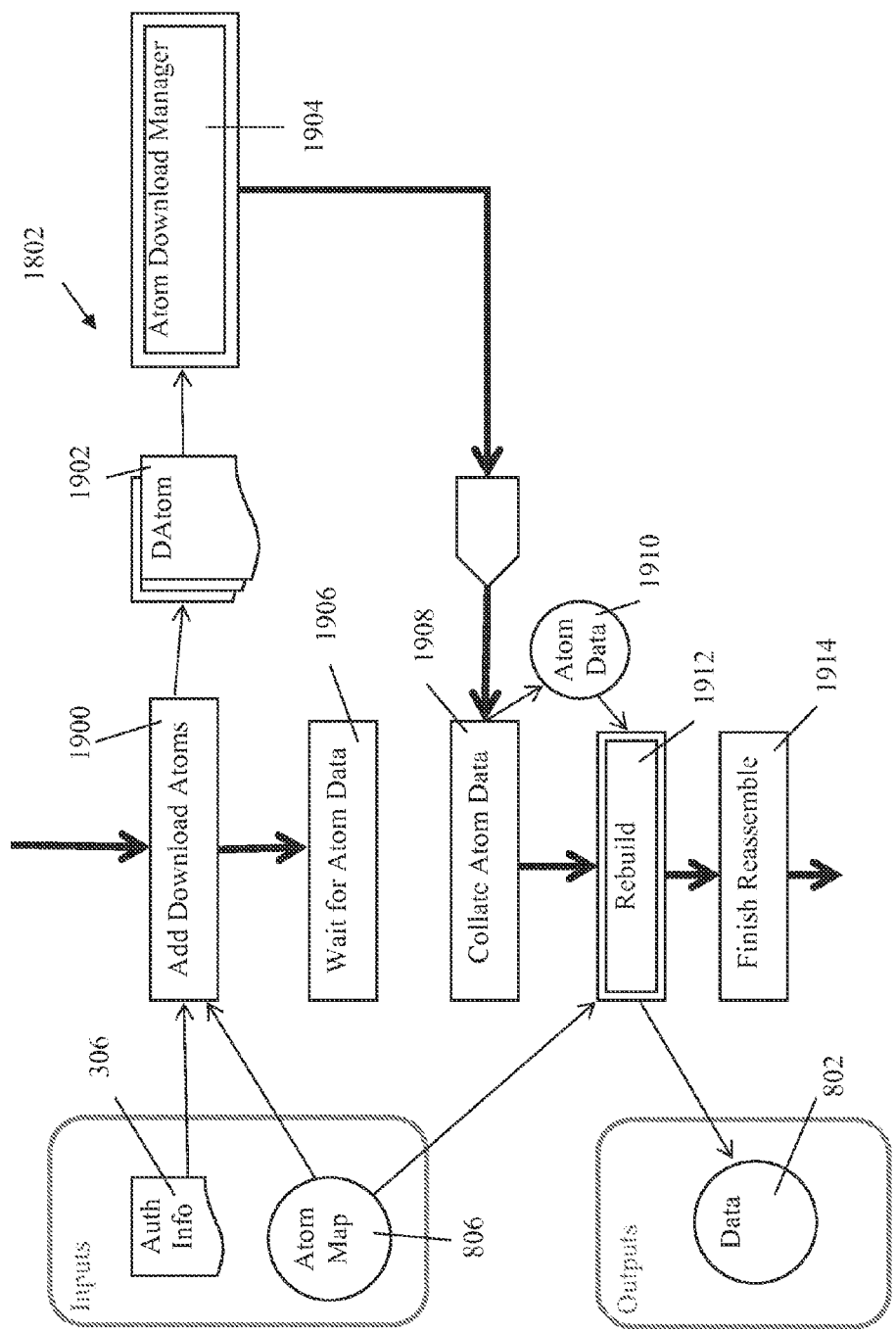
FIG. 19 is a schematic of the ReassembleData function according to one embodiment.

FIG. 19 shows a schematic of the ReassembleData function 1802 according to one embodiment. This function 1802 may include an Add Download Atoms function 1900, which may create a definition—called a DAtom 1902 (Download Atom)—for each Atom 1102 in the AtomList of an AtomMap 806 using the authorization information 306 and StoragePool list. The DAtom 1902 may contain information about the Atoms 1102 to download, which may include the AtomID, the storage destination information, and ChaffIDs to include, so the Atoms 1102 related to a Block 904 may be located and retrieved. Once the Atom Download Manager function 1904 retrieves all of the defined Atoms 1102, the DAtom 1902 may be destroyed.

The ReassembleData function 1802 may next include a Wait for Atom Data function 1906, which may allow the application 106 to do other work (such as providing status information, for example) while Atoms 1102 are downloaded by the Atom Download Manager function 1904. The downloading may be an asynchronous I/O process that may allow the application 106 to do such other work.

The ReassembleData function 1802 may next include an Atom Download Manager function 1904, which may manage the process (which may be asynchronous) of retrieving Atoms 1102 over a network from various specified storage services and/or devices 110.

The ReassembleData function 1802 may next include a Collate Atom Data function 1908, which may collect Atoms 1102 and re-associate the Atoms 1102 that are part of a Block 904 of data into associated Atoms 1910. This function 1908 may perform the reverse of the Splitter function 1006, which may separate the bits of a Block 904 into separate Atoms 1102. As the Atoms 1102 themselves may contain no information about their data, the AtomMap 806 may associate the bits in the Atoms 1102 and the Blocks 904, which may be used to rebuild the user data 104. Associated Atoms 1910 may include the actual bytes of bits that were split and appended from Blocks 904 from the encrypted user data 104.

The ReassembleData function 1802 may next include a Rebuild function 1912, which may take some associated Atoms 1910, de-split the associated Atoms 1910 into a Partial Block 2006, rebuild the full Block 904, decrypt the Block 904, and put the Block 904 into its proper location in the intermediate building data 802.

The ReassembleData function 1802 may next include a Finish Reassemble function 1914, which may ensure that all of the data 802 is reassembled and checked. This function 1914 may perform any other function to finish the reassembly.

Figure 20:
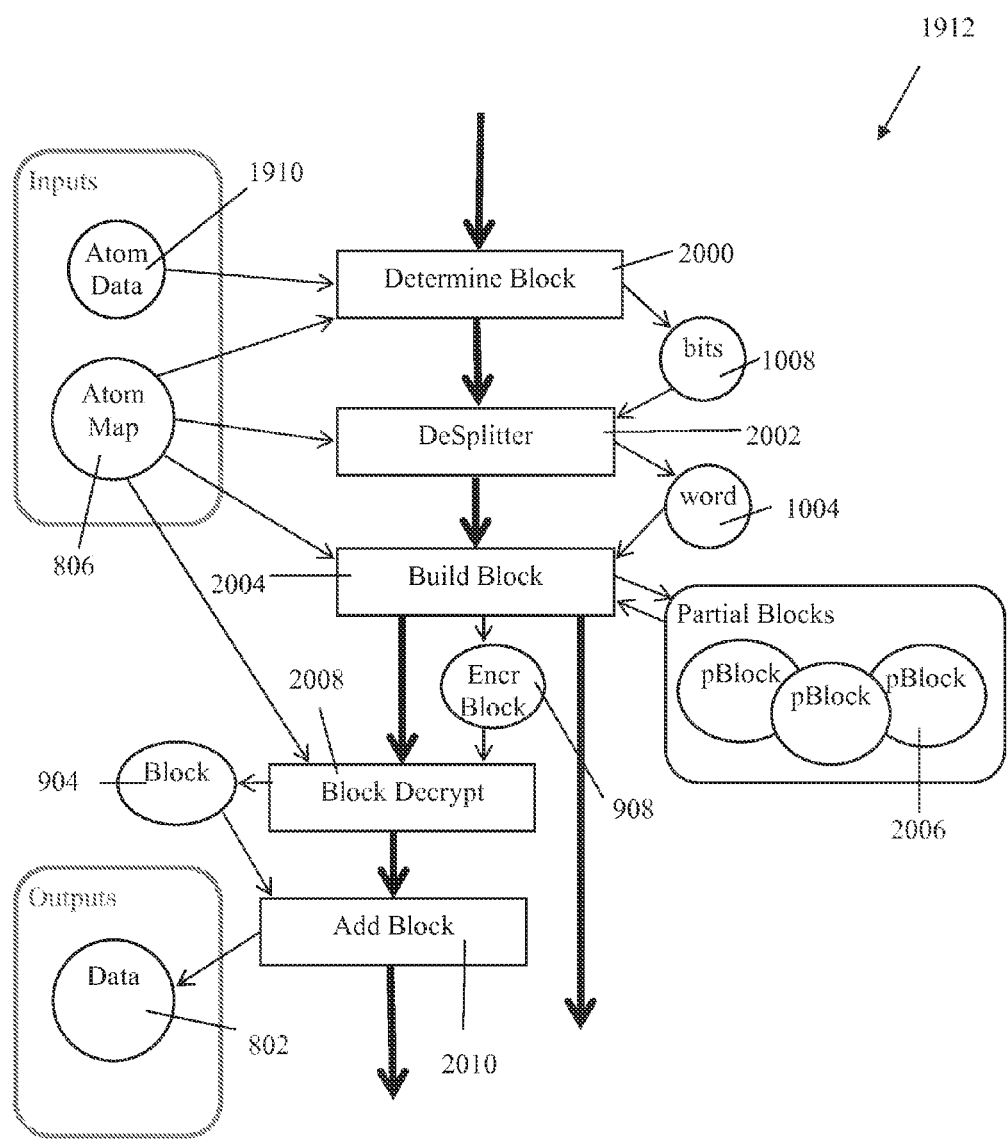
FIG. 20 is a schematic of the Rebuild function according to one embodiment.

FIG. 20 shows a schematic of the Rebuild function 1912 according to one embodiment. This function 1912 may include a Determine Block function 2000, which may determine using an AtomMap 806 whether, how, and where the provided associated Atoms 1910 belong to a defined Partial Block 2006. This function 1912 may extract the bit pools 1008 of data from the associated Atoms 1910. A Partial Block 2006 may be an Encrypted Block 908 that is being reconstructed as associated Atoms 1910 are being retrieved and organized by the Atom Download Manager function 1904. Because the Atoms 1102 may be downloaded in any order, the Encrypted Blocks 908 may be rebuilt in various orders and at various rates. Thus, multiple Partial Blocks 2006 may be defined and rebuilt concurrently The Rebuild function 1912 may next include a DeSplitter function 2002, which may take the bit pools 1008 that correspond to the defined Partial Block 2006 and recombine them 1008 back into a Word 1004 using the AtomSplitKey from the AtomMap 806 for the specified Block 904. This Word 1004 may contain de-split data that is ready to be added to a Partial Block 2006. This function 2002 may be the reverse of the Splitter function 1006.

The Rebuild function 1912 may next include a Build Block function 2004, which may take a Word 1004 and add it to the proper Partial Block 2006. When a Partial Block 2006 has been fully rebuilt into an Encrypted Block 908, the Encrypted Block 908 may be decrypted and added to the building data 802.

The Rebuild function 1912 may next include a Block Decrypt function 2008, which may decrypt the Encrypted Block 908 into a Block 904 using the cryptography information in the AtomMap 806 (which may include the type of encryption, the key, and the IV). The Block 904 may now be a decrypted portion of data that was originally taken from the particular AtomMap 806 (which itself may represent either user data 104 of another AtomMap 806 if it is an Atom MapMap 310).

The Rebuild function 1912 may next include an Add Block function 2010, which may add the Block 904 into the proper location in the building data 802, which may be compressed user data 104 or an AtomMap 806).

Figure 21:
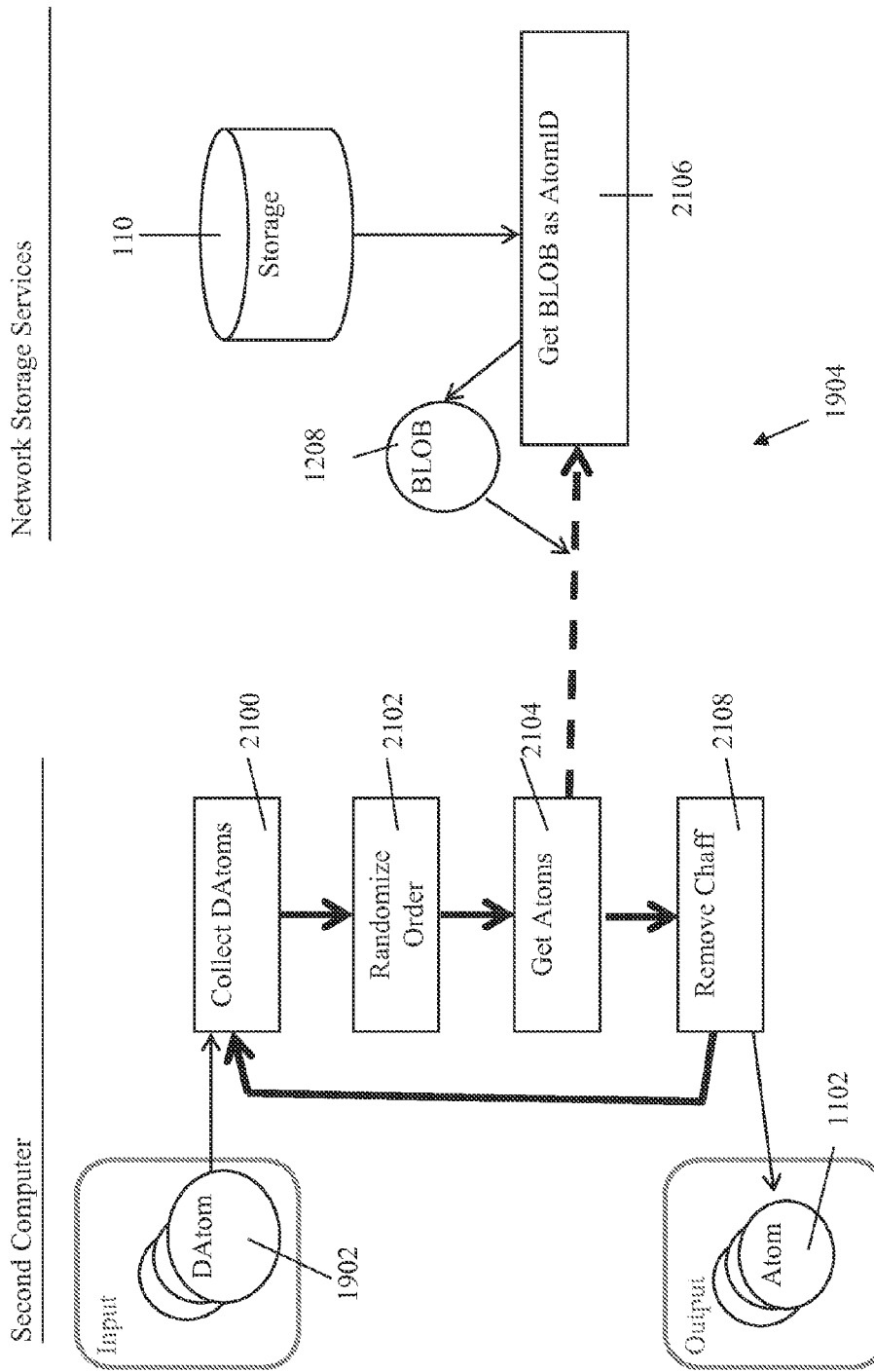
FIG. 21 is a schematic of the Atom Download Manager function according to one embodiment.

FIG. 21 shows a schematic of the Atom Download Manager function 1904 according to one embodiment. This function 1904 may use DAtoms 1902 to handle and control downloading Atoms 1102 for reassembly. This function 1904 may include a Collect DAtoms function 2100, which may collect DAtoms that are ready to be downloaded from the remote network storage device 110.

The Atom Download Manager function 1904 may next include a Randomize Order function 2102, which may select the DAtoms 1902 to be retrieved (apart from those 1902 that have already been collected). This function 2012 may randomize the order of retrieval/collection. In one embodiment, this function 2102 may proceed to retrieve only if there is a sufficiently large pool of DAtoms 1902 to randomly choose from. Random retrieval of Atoms 1102 may improve the security of the system 100 by making it impossible to gain an understanding of the relationship of the Atoms 1102 to the originating user data 104. The number of DAtoms 1902 collected before randomizing may be a parameter that may be changed. This number may reflect balancing security, memory usage, and latency; a smaller number may process faster, take less memory, but be less secure; a larger number may process slower, take more memory, but be more secure.

In one embodiment, this function 2102 may proceed to randomize only if all of the DAtoms 1902 are collected.

The Atom Download Manager function 1904 may next include a Get Atoms function 2104, which may randomly retrieve an Atom 1102 (either a real Atom 1102 or a chaff Atom 1102) from the defined Network Storage Service. The communication between the second computer 116 and the Network Storage Service may be similar to that between the first computer 102 and the Network Storage Service in the Send Atoms function 1206. The Get Atoms function 2104 may output progress events and success events to keep the user informed of the progress. If a transfer fails, this function 2104 may try to retrieve the Atom 1102 again a determined number of times before indicating failure.

The Atom Download Manager function 1904 may next include a Get BLOB as AtomID function 2106, which may retrieve the BLOB 1208 that is the Atom 1102 by the AtomID from the storage device 110 where the BLOB 1208 was saved. The DAtom may be used to retrieve the Atoms 1102 per the AtomIDs from an AtomMap 806.

The Atom Download Manager function 1904 may next include a Remove Chaff function 2108, which may use the list of ChaffIDs from the DAtom 1902 to ignore and dispose of chaff Atoms 1102 so that only actual Atoms 1102 are kept as the output.

FIG. 22a shows a schematic of the AtomKey Transport function 2208 according to one embodiment. This function 2208 may include an Emit function 2200, which may convert and send the encrypted and encoded bytes of the AtomKey 304 from a first mobile phone 112 or other device over a medium to a second mobile phone 114 or other device using a protocol, as previously discussed. Other devices may also be used in this function 2208 for security or ease-of-use.

The AtomKey Transport function 2208 may next include a Receive function 2202, which may receive from a first mobile phone 112 or other device data per a protocol over a medium and convert the data into bytes of an AtomKey 304 in a second mobile phone 114 or other device.

FIG. 22b shows a schematic of the AtomKey Storage function 2210 according to one embodiment. This function 2210 may include a Store/retrieve function 2204, which may store an AtomKey 304 in a storage medium 2206 and retrieve it 304 from the medium 2206. The storage/retrieval may include file systems, databases, or other indexed or named storage/retrieval systems. The storage medium 2206 may include any medium known to a skilled artisan and includes but is not limited to, a smart phone, a USB drive, a network drive, a hard drive, and a memory card. The storage medium 2206 may be local (on the first computer 102) or remote whether controlled by the user (e.g., on the first mobile phone 112 or other device, or printed on a physical piece of paper) or not (e.g., on the cloud 108 or on another device).

Figure 23:
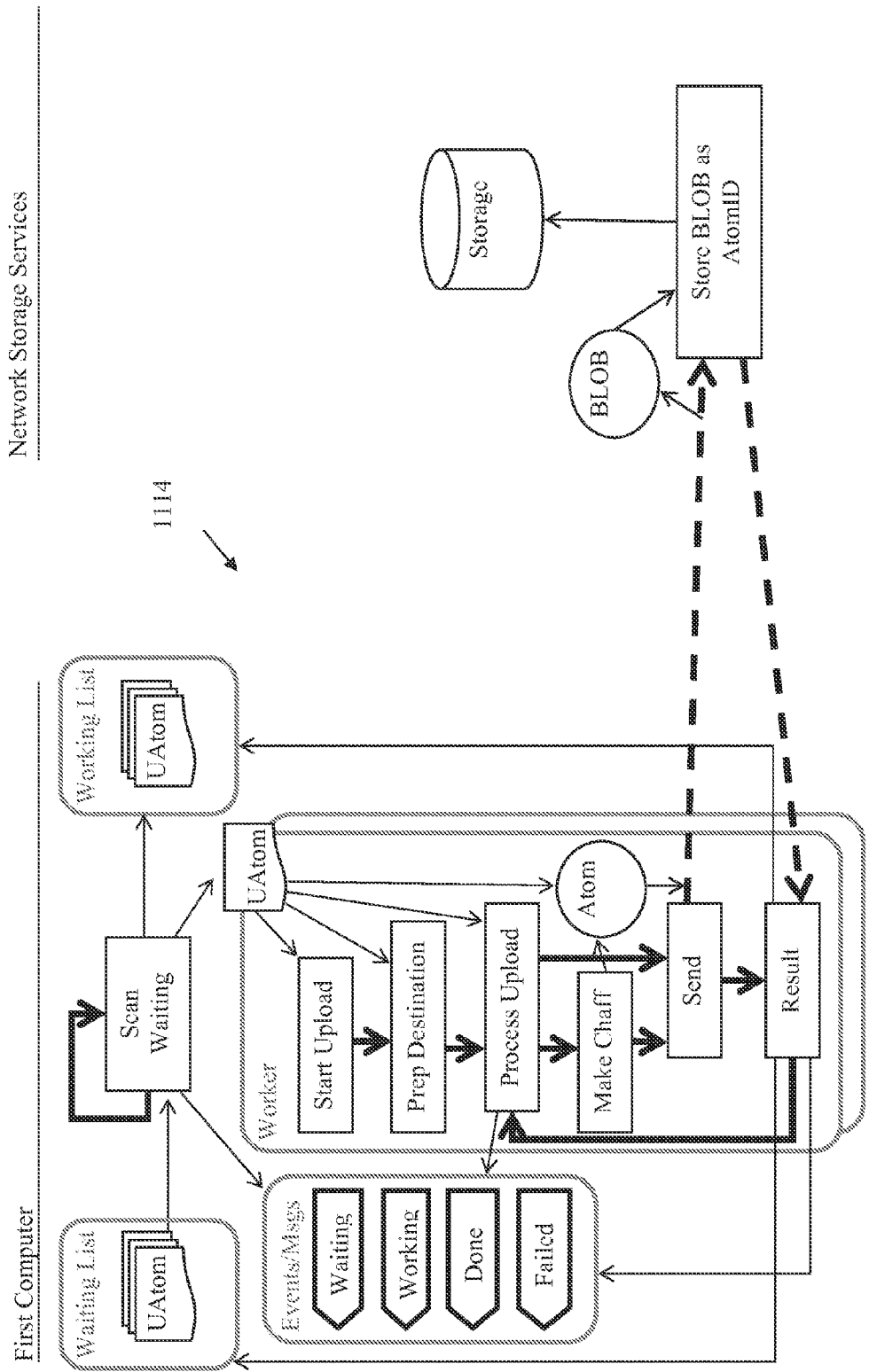
FIG. 23 is a schematic of the Atom Upload Manager function according to another embodiment.

FIG. 23 shows another embodiment of the Atom Upload Manager function 1114. This function 1114 may send UAtoms 1112 into a Waiting List and wait until a sufficient number of UAtoms 1112 are collected in the Waiting List to be processed and randomized. After a sufficient number of UAtoms 1112 are gathered, the function 1114 may send the UAtoms 1112 to a Worker and move them 1112 to a Working List. The Worker may take a UAtom 1112, make appropriate chaff Atoms 1102, and send all Atoms 1102 to the Network Storage Services. A Worker may be a concurrent mechanism to handle multiple simultaneous uploads and downloads (e.g., thread or eventlet). Each Worker may be responsible for one UAtom 1112. If a UAtom 1112 fails to be processed, it 1112 may be added back to the Waiting List and removed from the Working List. If a UAtom 1112 fails a specified number of times, it 1112 may be added to a Failed list, which may cause the atomizing process 202 to stop and generate an error message. If a UAtom 1112 is processed successfully (and the Atom 1102 is successfully sent), the UAtom 1112 may be removed from the Working List, and an event may be generated notifying of the completion of that UAtom 1112. This Atom Upload Manager function 1114 may monitor the several lists of UAtoms 1112 to ensure that all Atoms 1102 are successfully sent. This function 1114 may relate the status (Waiting, Working, Done, and Failed) of Atoms 1102 being sent via events to functions that may handle errors and status. A plurality of Workers may be used and managed by the function 1114 to simultaneously properly format and send multiple Atoms 1102 to specified Network Storage Services.

Figure 24:
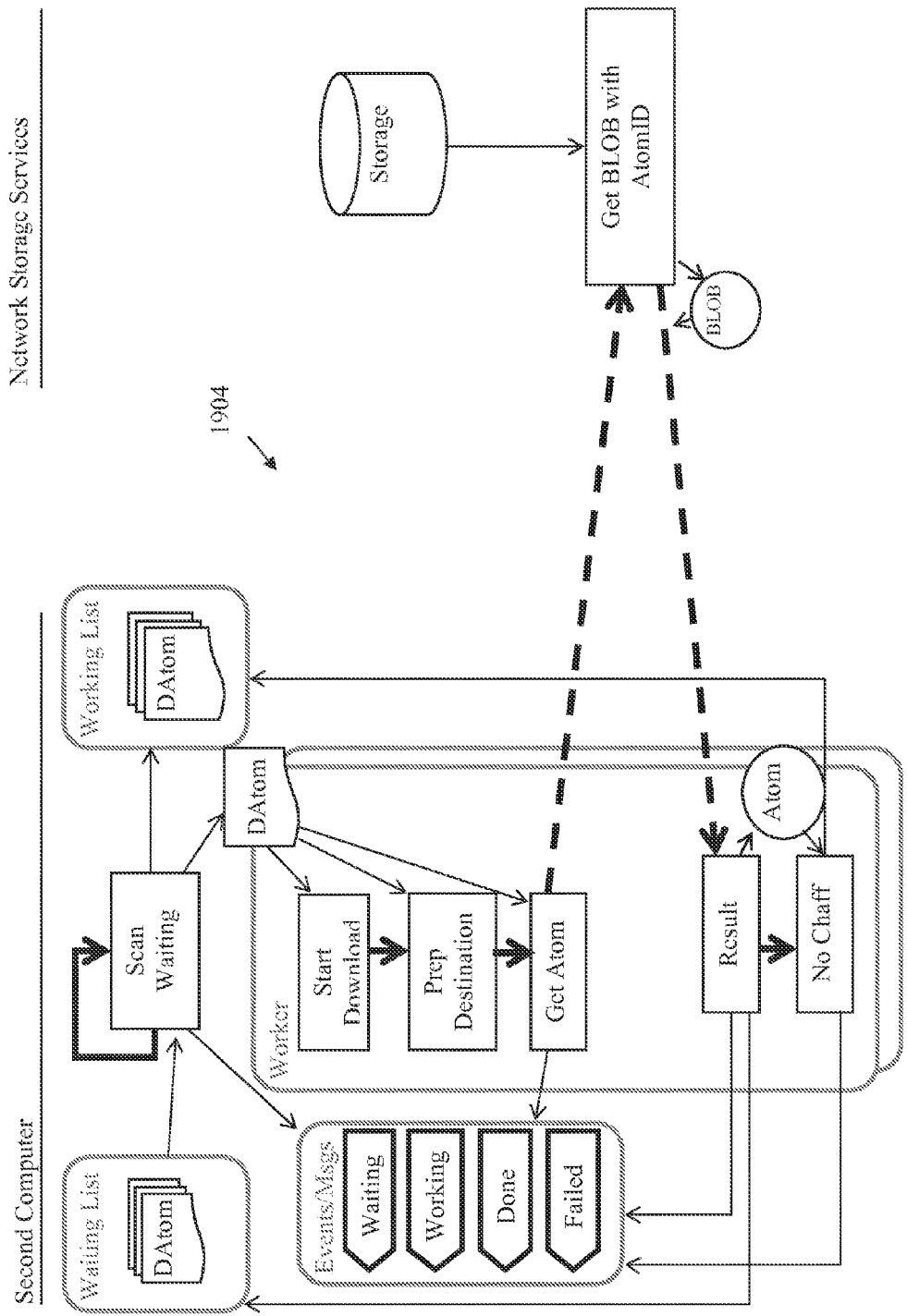
FIG. 24 is a schematic of the Atom Download Manager function according to another embodiment.

FIG. 24 shows another embodiment of the Atom Download Manager function 1904, which may be similar but in reverse to the Atom Download Manager function 1114 described above with respect to FIG. 23. This function 1904 may send DAtoms 1902 into a Waiting List and wait until a sufficient number of DAtoms 1902 are collected in the Waiting List to be processed and randomized. After a sufficient number of DAtoms 1902 are gathered, the function 1904 may send the DAtoms 1902 to a Worker and move them 1902 to a Working List. The Worker may take a DAtom 1902, retrieve all the associated Atoms 1102 (including any chaff Atoms 1102) from the Network Storage Services, and discard any chaff Atoms 1102. A Worker may be a concurrent mechanism to handle multiple simultaneous uploads and downloads (e.g., thread or eventlet). Each Worker may be responsible for one DAtom 1902. If a DAtom 1902 fails to be processed, it 1902 may be added back to the Waiting List and removed from the Working List. If a DAtom 1902 fails a specified number of times, it 1902 may be added to a Failed list, which may cause the de-atomizing process 206 to stop and generate an error message. If a DAtom 1902 is processed successfully (and the Atom 1102 is successfully retrieved), the DAtom 1902 may be removed from the Working List, and an event may be generated notifying of the completion of that DAtom 1902. This Atom Download Manager function 1904 may monitor the several lists of DAtoms 1902 to ensure that all Atoms 1102 are successfully retrieved. This function 1904 may relate the status (Waiting, Working, Done, and Failed) of Atoms 1102 being retrieved via events to functions that may handle errors and status. A plurality of Workers may be used and managed by the function 1904 to simultaneously properly format and retrieve multiple Atoms 1102 from specified Network Storage Services.

Figure 25:
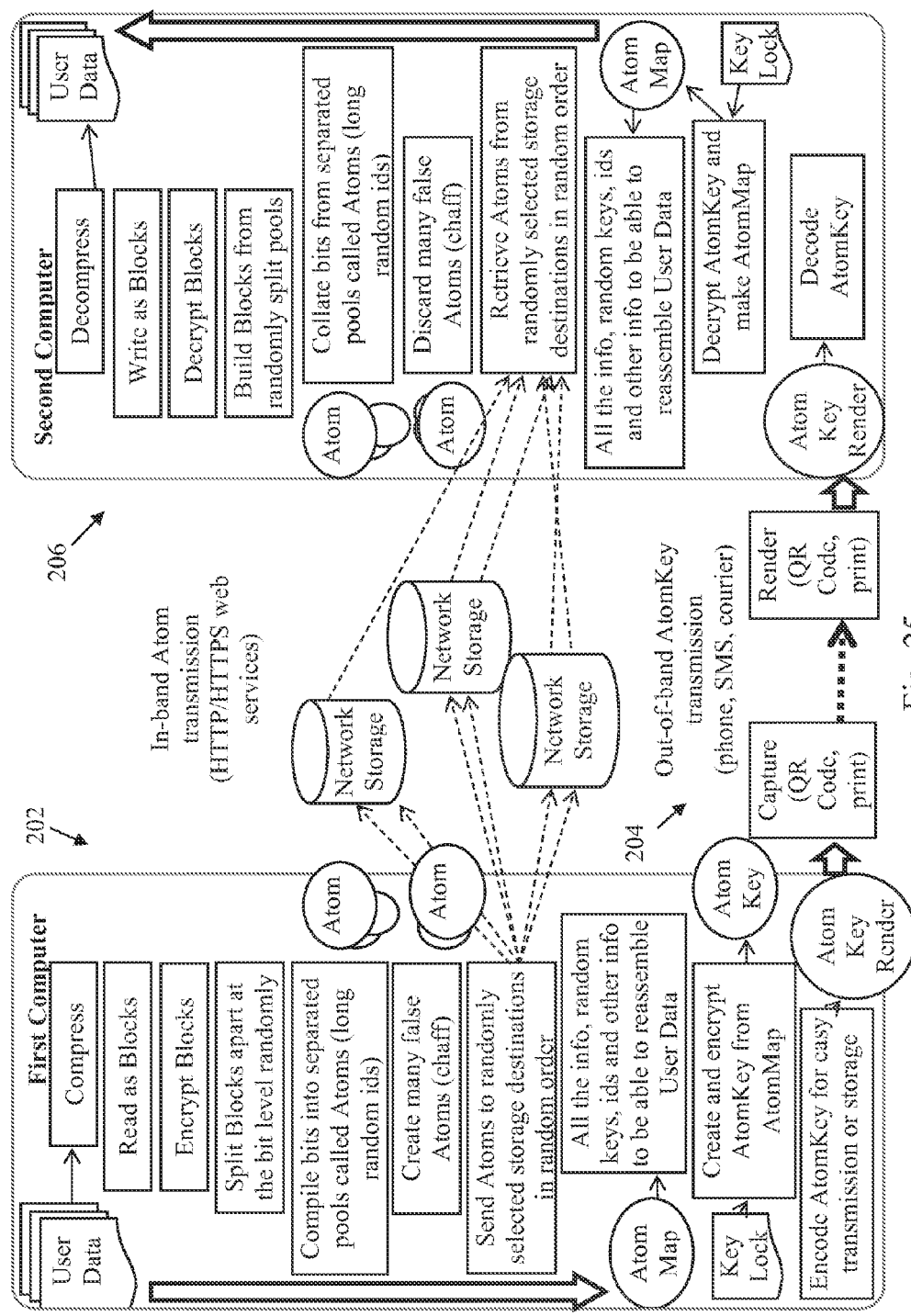
FIG. 25 is an overview schematic of a process according to another embodiment.

FIG. 25 shows another overview schematic of an atomizing process 202, de-atomizing process 206, and AtomKey handling process 204. Individual steps of these processes were previously described.

Figure 26:
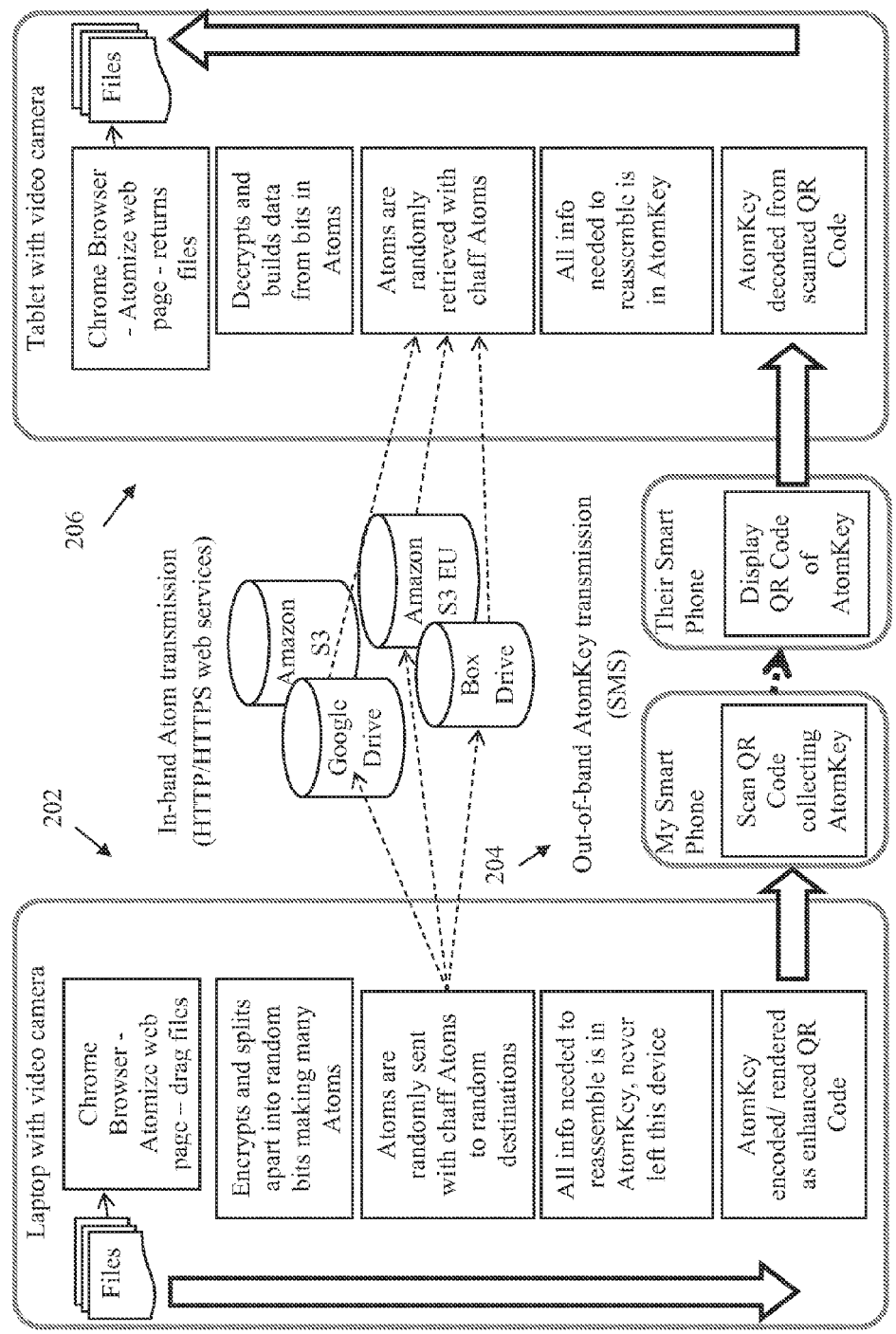
FIG. 26 is an overview schematic of a process according to yet another embodiment.

FIG. 26 shows another overview schematic of an embodiment of an atomizing process 202, de-atomizing process 206, and AtomKey handling process 204. Individual steps of these processes were previously described.

FIG. 27 shows a main overview schematic of a process 2700 according to another embodiment. This process 2700 may be similar to the process 200 disclosed in FIG. 2. This process 2700 may include an atomizing process 2702, a transport/storage process 2704, and a de-atomizing process 2706, each of which is further discussed below.

Figure 28:
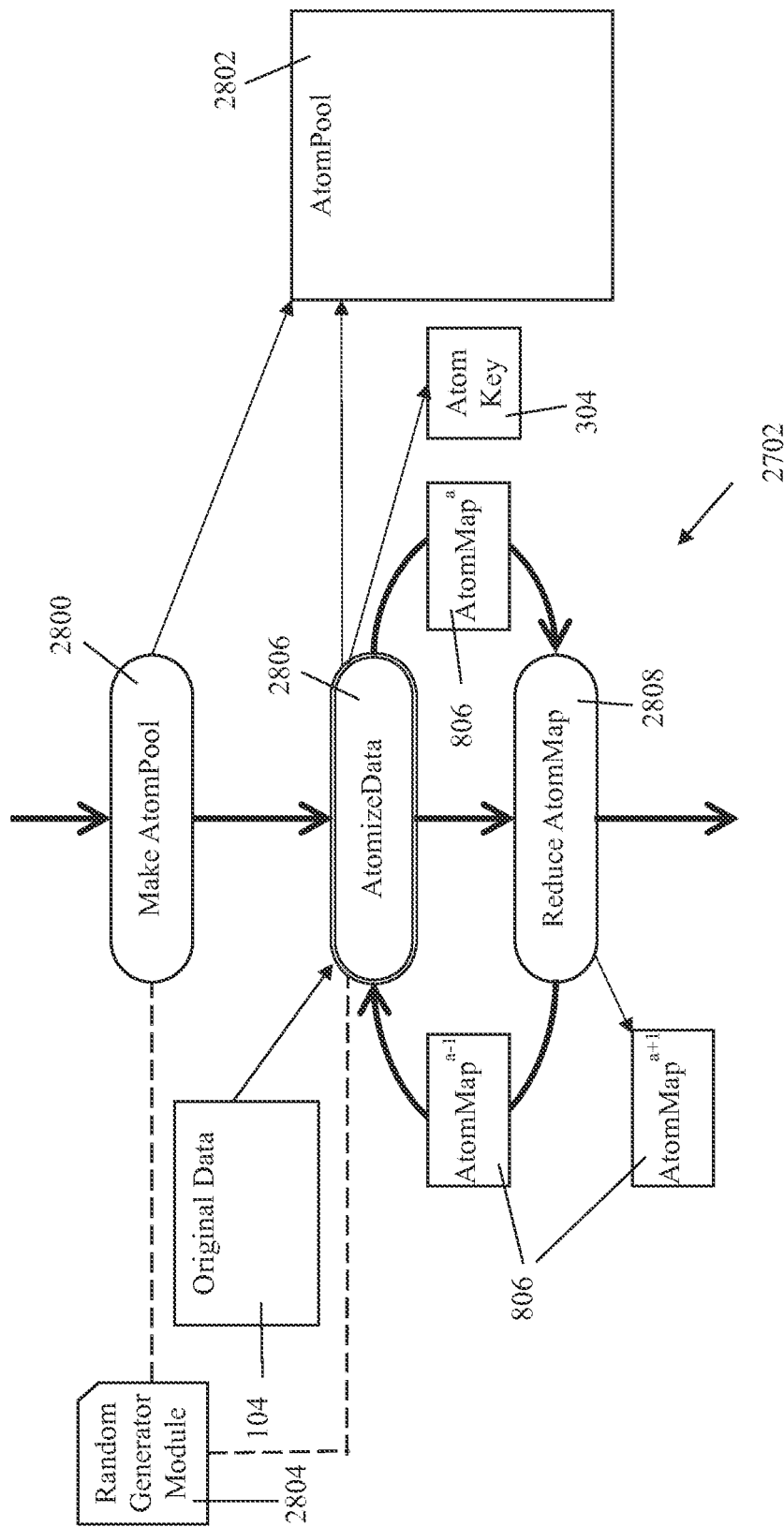
FIG. 28 is an overview schematic of the atomizing process according to another embodiment.

FIG. 28 shows an overview of the atomizing process 2702 according to one embodiment. This process 2702 may take the user data 104 or original data that is desired to be stored or transported confidentially and may atomize it 104. Atomizing data may fragment, scramble, and/or encrypt it. The process 2702 may include a Make AtomPool function 2800, which may create an AtomPool 2802 using a random generator module 2804. The Make AtomPool function 2800 may be similar to the Create StoragePool function 716. The AtomPool 2802 may be a pool, block, or amount of storage or memory. The AtomPool 2802 may be a pool of random data that is larger by some amount than the user data 104. This prepopulated block of random data (the AtomPool 2802) may receive randomly selected and randomly distributed bits from the user data 104. The AtomPool 2802 may also receive randomly selected and randomly distributed bits from the AtomMap 806, as will be discussed below, including from multiple recursions or iterations of the AtomMaps 806. The initial random data created by this function 2800 may act as chaff for the fragments of data that will be added to the AtomPool 2802 by the AtomizeData function 2806 described below. The amount of inflation of the AtomPool 2802 over the user data 104 (i.e., the difference in the sizes between the two) may be increased for greater protection or decreased for more efficient processing, transportation, and storage. The inflation amount may be user-selectable or may be varied automatically depending on the size of the user data 104 or even randomly. In one embodiment, the AtomKey 304 may also be created and initially populated with random data by the Make AtomPool function 2800. The random generator module 2804 may be any means, device, or process that may be used to create random data. Once this process 2702 is finished, the AtomPool 2802 may be a random, disordered pool of bits, with bits from the user data 104, AtomMaps 806, and the initial chaff or random data. The atomizing process 2702 may randomize the user data 104 and hide it among other random data.

The atomizing process 2702 may include an AtomizeData function 2806, which may be similar to the AtomizeData function 804. The function 2806 may atomize the input data that it 2806 receives during its current iteration and send the atomized data to either the AtomPool 2802 or to the AtomKey 304. In one embodiment, the AtomKey 304 may be similar to the AtomPool 2802, as will be further described below. In one embodiment, the AtomPool 2802 and AtomKey 304 may be on the device that is running the atomizing process 2702, which may be the first computer 102 that is running the application 106 and that contains or has access to the user data 104. The AtomizeData function 2806 may use the random generator module 2802 to randomly select bits of input data (which may be the user data 104 or an AtomMap 806), combine them into Atoms 1102, and randomly distribute or translate them 1102 into the AtomPool 2802 or the AtomKey 304. The function 2806 may record all information required to reassemble and unencrypt the atomized data in the AtomMap 806. The AtomMap 806 may include all instructions of where the various Atoms 1102 have been stored and of which original bits are the Atoms 1102 made. The AtomizeData function 2806 is further discussed below with respect to FIG. 29.

In one embodiment, the first pass of the AtomizeData function 2806 atomizes the user data 104 and distributes it among the AtomPool 2802 and the AtomKey 304, storing the decryption instructions in the AtomMap 806. In one embodiment, these decryption instructions—the AtomMap 806—are smaller than the user data 104. In one embodiment, the AtomizeData function 2806 may run through additional recursive iterations with the prior iteration's AtomMap 806 as its input data, which may result in another, smaller AtomMap 806. For example, during the initial pass, the original data 104 may be the input data to the function 2806, and the AtomMap$^0$ may be the instruction output (in addition to the data sent to the AtomPool 2802 and/or the AtomKey 304). During the second pass, AtomMap$^0$ may be the input data to the function 2806, and AtomMap$^1$ may be the instruction output (in addition to the data from AtomMap$^0$ that is sent to the AtomPool 2802 and/or the AtomKey 304), where AtomMap$^1$ may be of smaller size than AtomMap$^0$. During the third pass, AtomMap$^1$ may be the input data to the function 2806, and AtomMap may be the instruction output (in addition to the data from AtomMap$^1$ that is sent to the AtomPool 2802 and/or the AtomKey 304), where AtomMap$^2$ may be of smaller size than AtomMap$^1$. These iterations may continue until the AtomMap 806 is the desired size. The Reduce AtomMap function 2808 may be included to perform this function of checking if the AtomMap size is small enough and calling iterations of the AtomizeData function 2806 until the AtomMap size is small enough. When the AtomMap 806 is sufficiently small, the Reduce AtomMap function 2808 may return an end of the atomizing process 2702. In one embodiment, a desired size for the final AtomMap 806 is 5 KB or less. In another embodiment, a desired size for the final AtomMap 806 is approximately the same size as the AtomKey 304.

The AtomMap 806 may hold all of the random numbers that are used to select and distribute the Atoms 1102 into the AtomPool 2802 and the AtomKey 304. Fragmenting user data 104 into small blocks or groups of bits (Atoms 1102), and providing instructions where each such Atom 1102 is stored within the AtomPool 2802 or AtomKey 304 may produce a relatively large instruction set (AtomMap 806) with information on how to decrypt and reassemble the atomized data. Because the atomization process uses random data to fragment and disperse the user data 104 within the AtomPool 2802 and AtomKey 304, the AtomMap 806 may contain a large amount of the random data for reassembly purposes. For example, an initial AtomMap 806 for a 1 MB file may be 100 KB, depending on the parameters used during the atomization process 2702. Such large decryption instructions (AtomMap 806) may be too large and unwieldy to use as a regular key as in conventional cryptography schemes. For example, 128-bit and 256-bit encryptions use keys that are 128 or 256 bits long, respectively, while a 2048-bit SSL certificate or key is 2048 bits long. Recursively atomizing the AtomMap 806 and mixing it into the AtomPool 2802 and the AtomKey 304 may reduce the size of the AtomMap 806 until it 806 is a useful size without compromising security. The AtomKey 304 may be specified to be any size. In one embodiment, the AtomKey 304 may be 1 kilobyte in size. In another embodiment, the AtomKey 304 may be 8 kilobytes in size, which equals 65536 bits (assuming the convention that 1 KB=1024 bytes; 1 KB may also be equal to 1000 bytes). In another embodiment, the AtomKey 304 may be 16 kilobytes in size. The AtomKey 304 may thus be a much higher bit-length key than conventional encryption keys and provide significantly increased security against compromise. In another embodiment, the AtomKey 304 may be larger than 1 kilobyte but small enough to be useful, which may depend on the application and industry. In another embodiment, the AtomKey 304 may be larger than 8 kilobytes. In one embodiment, the AtomKey 304 size may be different for each user data 104 that is atomized.

Figure 29:
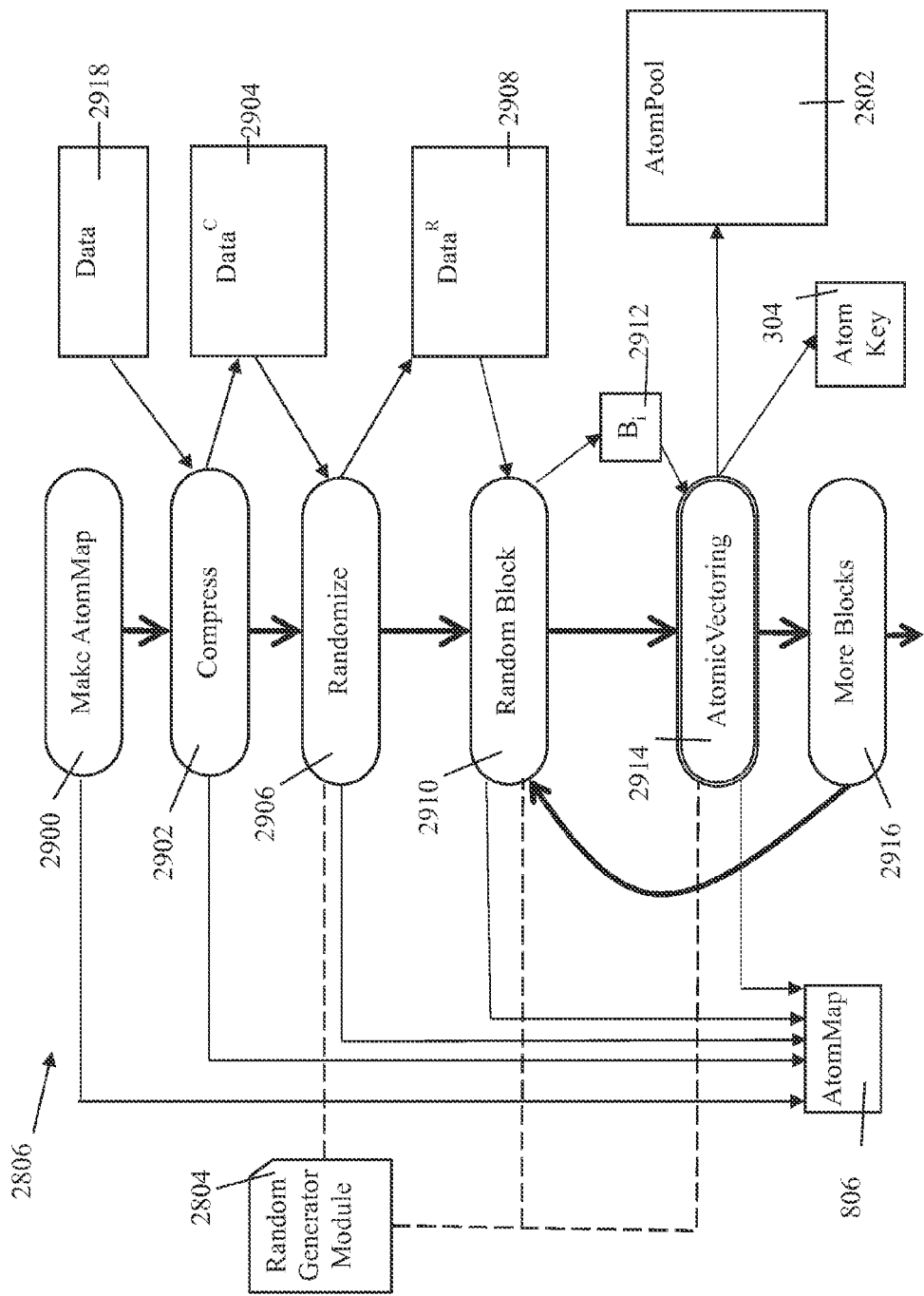
FIG. 29 is a schematic of the AtomizeData function according to one embodiment.

FIG. 29 shows a schematic of the AtomizeData function 2806 according to one embodiment. This function 2806 may include a Make AtomMap function 2900, which may create and initialize the starting AtomMap 806 for the user data 104 that is to be atomized.

The AtomizeData function 2806 may also include a Compress function 2902, which may be similar to the Compress function 800 discussed with respect to FIG. 8. The Compress function 2902 may compress the input data 2918 with any type of data compression mechanism or scheme and output compressed data 2904. The compression may reduce the size of the input data 2918, which may improve performance when atomizing it 2918. The type of compression may be recorded in the AtomMap 806. As discussed above, the input data 2918 may be the user data 104 or the AtomMap 806 that resulted from the prior iteration of the AtomizeData function 2806.

The AtomizeData function 2806 may also include a Randomize function 2906, which may use the random generator module 2804 to pre-randomize the compressed data 2904 to assist disordering it 2904 before atomizing. In alternative embodiments, different pseudo-randomization methods or schemes may be used, including, but not limited to, AES encryption. The multiple layers of disordering of this process 2700 may improve the randomization of the AtomPool 2802 and AtomKey 304, which may improve the security of the system 100. The output of this function 2906 may be randomized data 2908. How the compressed data 2904 is randomized (e.g., the encryption scheme, the initialization vector and key) may be recorded in the AtomMap 806. The AtomPool 2802 inflation described above may, in one embodiment, be with respect to the randomized data 2908 instead of the user data 104.

The AtomizeData function 2806 may also include a Random Block function 2910, which may use the random generator module 2804 to select a random data block 2912 or portion from the randomized data 2908 for atomizing. The size of the data blocks 2912 may be fixed or may be variable in alternative embodiments. In one embodiment, the size of the data blocks 2912 may be user-settable. In another embodiment, the size of the data blocks 2912 may be automatically variable based on the size of the user data 104. In another embodiment, the size of the data blocks 2912 may vary between each block iteration. In one embodiment, the size of each data block 2912 is one byte. Smaller-sized data blocks 2912 may increase the randomness and security of the atomized data and may also increase the resulting size of the atomized data. The block selection may be recorded in the AtomMap 806.

The AtomizeData function 2806 may also include an AtomicVectoring function 2914, which may use the random generator module 2804 to create random Atoms 1102 from each data block 2912 and to distribute these Atoms 1102 randomly into the AtomPool 2802 and AtomKey 304. The instructions on the creation of Atoms 1102 and their distribution may be recorded in the AtomMap 806. This function 2914 is further discussed below with respect to FIG. 30.

The AtomizeData function 2806 may also include a More Blocks function 2916, which may check if all of the randomized data 2908 has been atomized. If not, this function 2916 may call another iteration of the Random Block function 2910 to select another data block 2912 for processing by the AtomicVectoring function 2914. If all of the randomized data 2908 has been atomized, this function 2916 signals or returns an end of the AtomizeData function 2806.

Figure 30:
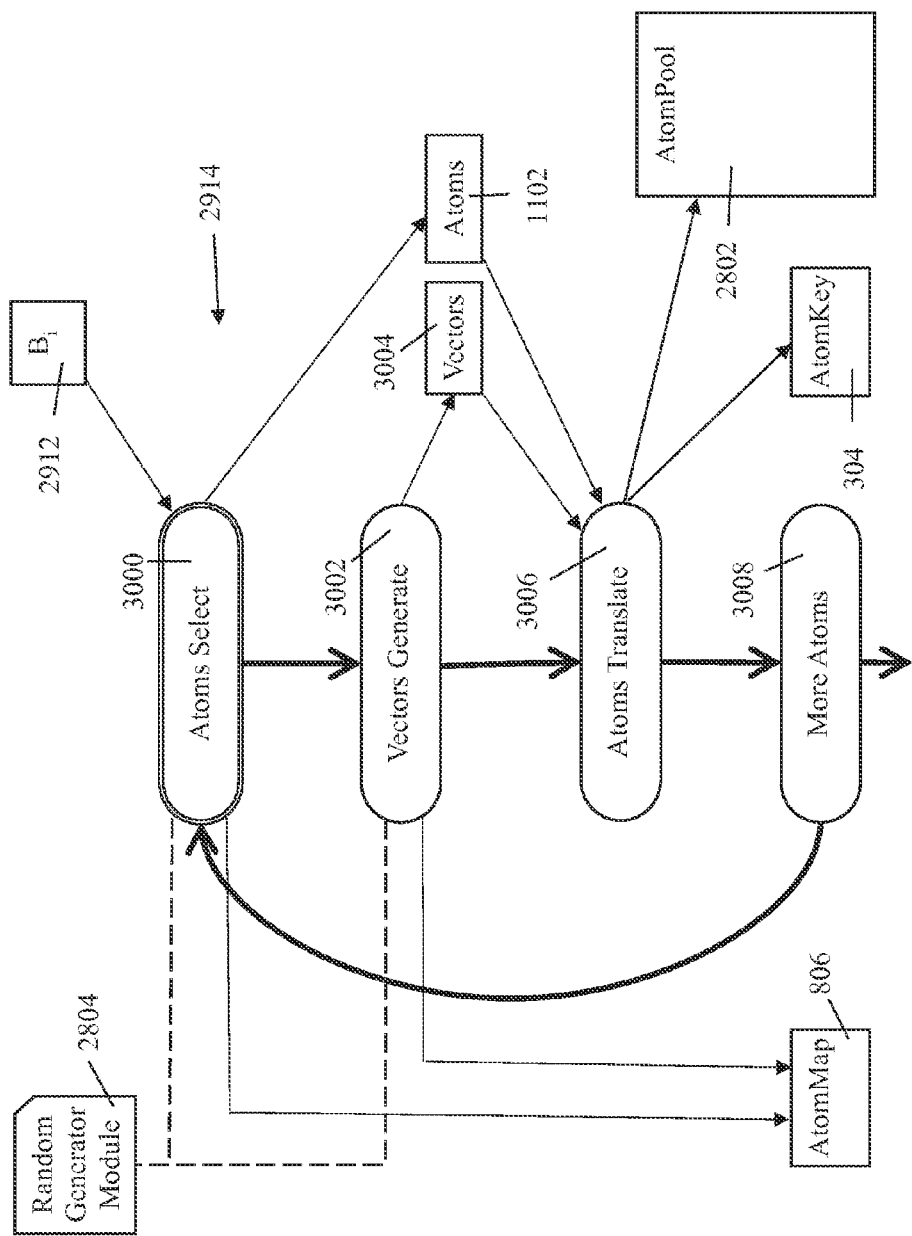
FIG. 30 is a schematic of the AtomicVectoring function according to one embodiment

FIG. 30 shows a schematic of the AtomicVectoring function 2914 according to one embodiment. This function 2914 may include an Atoms Select function 3000, which may create Atoms 1102 from the input data block 2912 using the random generator module 2804. This function 2914 may save the instructions for how the Atoms 1102 were created in the AtomMap 806. This function 3000 is further discussed below with respect to FIGS. 31-32.

The AtomicVectoring function 2914 may also include a Vectors Generate function 3002, which may generate a Vector 3004 for each Atom 1102 generated by the Atom Select function 3000. The Vector 3004 may determine where in the AtomPool 2802 or AtomKey 304 the corresponding Atom 1102 is stored.

In alternative embodiments, during the Make AtomPool function 2800 or during the AtomizeData function 2806, the AtomPool 2802 may be configured by dividing it 2802 into a number of zones, from 0 to Z–1. The number of zones may be larger for greater randomization and security. The number of zones may be constant or may be variable based on user-selection or automatically based on the size of the user data 104 or even randomly, in different embodiments. The AtomKey 304 may be considered zone Z. Thus, the Atoms 1102 may be distributed into Z zones of the combination of AtomPool 2802 and AtomKey 304. Each zone may be identified by a unique zone number, from 0 to Z. In one embodiment, each AtomPool zone may be the same size. In alternative embodiments, the size of the AtomKey 304 may be less than, equal to, or greater than the size of each zone in the AtomPool 2802. In another embodiment, the AtomPool zones may be of unequal or varying sizes. The zone information may be recorded in the AtomMap 806.

The atomizing process 2702 may also determine the maximum offset (which may be in bits) by which individual Atoms 1102 may be stored next to each other within the same zone. This offset determination may also be made during the Make AtomPool function 2800 or during the AtomizeData function 2806, in alternative embodiments. The maximum offset may be constant or may be variable based on user-selection or automatically based on the size of the user data 104 or even randomly, in different embodiments. A greater maximum offset may make the resulting AtomPool 2802 and/or AtomKey 304 larger.

The atomizing process 2702 may also determine the length, t, of each Vector 3004. Each Vector 3004 may be a concatenation of the zone number into which that Vector's respective Atom 1102 is to be translated, z, and the offset (which may be in bits) by which that Vector's Atom 1102 is to be shifted from the prior Atom that was translated into that zone, o. In other words, each Vector 3004 may be t bits long, including a z portion and an o portion. The size of z may be set by determining how many bits are needed to represent the number of zones, or Z. The size of o may be set by determining how many bits are needed to represent the maximum offset. Determination of t may be done during the Make AtomPool function 2800 or during the AtomizeData function 2806, in alternative embodiments.

The Vectors Generate function 3002 may use the random generator module 2804 to generate a VectorGenerator, which may be a long, random bit string. In one embodiment, the VectorGenerator may be larger than 64 bits. In another embodiment, the VectorGenerator may be 640 bits. In another embodiment, the VectorGenerator may be 1000 bits, or even larger. The Vectors Generate function 3002 may create Vectors 3004 using the VectorGenerator. The Vectors Generate function 3002 may take t bits from the VectorGenerator starting point and make those t bits be the Vector 3004. After this vector is made, the VectorGenerator index may be moved by t bits so that the next or succeeding Vector 3004 is generated from a different or succeeding portion of the VectorGenerator. In one embodiment, the starting point or index within the VectorGenerator may start at the beginning of the VectorGenerator. In another embodiment, the starting point or index may be randomly picked within the VectorGenerator. In one embodiment, if more Vectors 3004 are required after the VectorGenerator has reached its end, the VectorGenerator may wrap to create the additional Vectors 3004. In alternative embodiments, the Vectors 3004 may be offset from each other by a certain number of bits (which may be constant or variable, and may be user-selected or automatically selected) such that they are not contiguous along the VectorGenerator. The VectorGenerator may be saved in the AtomMap 806. The size of z, o, and t may be saved in the AtomMap 806. The Vectors 3004 themselves may be not saved in the AtomMap 806.

In one embodiment z=(log Z)/(log 2). In one embodiment, Z is a power of 2. In another embodiment, Z is not a power of 2. One embodiment may have z such that all Z zones cannot be selected. Another embodiment may have z such that selections greater than Z are possible by the Vectors Generate function 3002, in which case alternative embodiments may wrap the zone selection from 0, may modulo divide the selection and use the remainder, or may call the Vector Generate function 3002 to generate a new Vector 3004 where z selects one of the configured Z zones. Similar options are available for the offset.

The AtomicVectoring function 2914 may also include an Atoms Translate function 3006, which may distribute each Atom 1102 as directed by that Atom's Vector 3004. This function 3006 may read z (the zone identification number) from the Vector 3004 to determine into what zone to translate that Vector's 3004 Atom 1102. This function 3006 may also read o (the offset) from Vector 3004 to determine how many bits to offset or shift the current Atom 1102 from the last Atom 1102 that was saved to that zone.

Each zone may have a ZoneIndex, which indicates the starting bit in that zone (whether in the AtomPool 2802 or in the AtomKey 304) into which an Atom 1102 may be translated. The ZoneIndex may start at the beginning of the zone or randomly within the zone, in alternative embodiments. Before translating a new Atom 1102 into a selected zone, that zone's ZoneIndex may be shifted by the number of bits indicated in the offset, o, of the Vector 3004 corresponding to that new Atom 1102. When the Atom 1102 is translated into the zone, the ZoneIndex for that zone may be shifted by the number of bits in that Atom 1102. If the ZoneIndex does not start at the beginning of a zone, the ZoneIndex may wrap to the beginning of that zone when the ZoneIndex reaches the end of that zone. The Atoms Translate function 3006 may ascertain if an entire zone has been travelled through such that no bits in that zone remain that were not overwritten by Atoms 1102 or offset. If a zone is full, the Atoms Translate function 3006 may return to the Vectors Generate function 3002 to generate another random Vector 3004 for that Atom 1102. If the ZoneIndex does not start at the beginning of a zone but wraps back to the beginning, the Atoms Translate function 3006 may remember the starting point of each ZoneIndex of each zone such that when the ZoneIndex wraps around and reaches that starting point, the zone may be designated as full. Such indication prevents Atom bits in the AtomPool 2802 from being overwritten by subsequent Atoms 1102.

The AtomicVectoring function 2914 may also include a More Atoms function 3008, which may determine if any data is left in the data block 2912 that has not yet been atomized, and, if so, may call the Atoms Select function 3000 for another iteration of the AtomicVectoring function 2914.

A simple example may demonstrate the AtomicVectoring function 2914. In this example, the Atoms Select function 3000 created three Atoms 1102 from a data block 2912: 010 (Atom 1), 111 (Atom 2) and 10 (Atom 3). As will be discussed further below, Atoms 1102 do not need to be the same size.

Continuing the example, the atomizing process 2702 configured 2048 possible storage zones, where zones 0-2046 are in the AtomPool 2802, and the AtomKey 304 is zone 2047. With Z=2048, z requires 11 bits to be able to select any of the Z zones ($2^{11}$=2048). The atomizing process 2702 also configured a maximum offset of 7 bits (in other words, the offset may be one of 8 values, from 0 to 7), which requires o to be 3 bits ($2^3$=8). In this example, t, the length of each Vector 3004, is 14 bits long (or z concatenated with o).

Continuing the example, the Vectors Generate function 3002 generates a VectorGenerator that in this example is 80 bytes long. A portion of this VectorGenerator is shown:

1110 . . . 1_0001100011110000000100100001_1101011 001100_1_00110001010110101 . . .

The VectorGenerator index for new Vectors 3004 is, for this example, on the bit after the first ellipsis, or at the first bolded, underlined, and italicized bit. The Vectors Generate function 3002 may create the Vector 3004 for Atom 1 by taking the first 14 (or t) bits starting with the then-current VectorGenerator index: 10001100011 110. This Vector 3004 is written here with a space between z and o. This Vector 3004 indicates that its corresponding Atom 1 will be translated to zone 1123 (binary 10001100011 converted to decimal) with an offset of 6 (binary 110 converted to decimal). The VectorGenerator index is then moved by 14 bits (in this example, there is no offset between the VectorGenerator bits used to create the Vectors 3004) to the second bolded, underlined, and italicized bit. The Vectors Generate function 3002 may create the Vector 3004 for Atom 2 by taking the next 14 bits starting with the then-current VectorGenerator index: 00000010010 000. This Vector 3004 is written here with a space between z and o. This Vector 3004 indicates that its corresponding Atom 2 will be translated to zone 18 (binary 00000010010 converted to decimal) with no offset (binary 000 converted to decimal). The VectorGenerator index is then moved by 14 bits to the third bolded, underlined, and italicized bit. The Vectors Generate function 3002 may create the Vector 3004 for Atom 3 by taking the next 14 bits starting with the then-current VectorGenerator index: 11101011001 100. This Vector 3004 is written here with a space between z and o. This Vector 3004 indicates that its corresponding Atom 3 will be translated to zone 1881 (binary 11101011001 converted to decimal) with an offset of 4 (binary 100 converted to decimal). The VectorGenerator index is then moved by 14 bits to the fourth bolded, underlined, and italicized bit.

Continuing the example, the Atoms Translate function 3006 then takes these three Atoms 1102 with their Vectors 3004 and translates the Atoms 1102 based on the instructions in the Vectors 3004. Atom 1 is to be translated into zone 1123. For this example, assume that a portion of zone 1123 is shown below, prefilled with random bits during the Make AtomPool function 2800:

011010010000 . . . 1011101111100000010000_11100 10010100101000000 . . . 01110000

The then-current ZoneIndex of zone 1123 is at the first bolded, underlined, and italicized bit. This function 3006 shifts the ZoneIndex by 6 bits (the offset, o) to the second bolded, underlined, and italicized bit. This function 3006 then overwrites the existing bits by Atom 1. The number of overwritten bits may be equal to the number of bits in that Atom 1102. In other words, bits 000 (starting from the second bolded, underlined, and italicized bit) may be overwritten to 010 (which are the bits of Atom 1). The ZoneIndex may then be moved to the next bit after the last one that was overwritten by Atom 1, or to the third bolded, underlined, and italicized bit. After Atom 1 is translated into the AtomPool 2802, this portion of zone 1123 looks like:

011010010000 . . . 10111011111000000101_0011100 10010100101000000 . . . 01110000 where the bolded, italicized, and underlined bit was changed by Atom 1. Atoms 2 and 3 may be translated similarly by the Atoms Translate function 3006.

Figure 31:
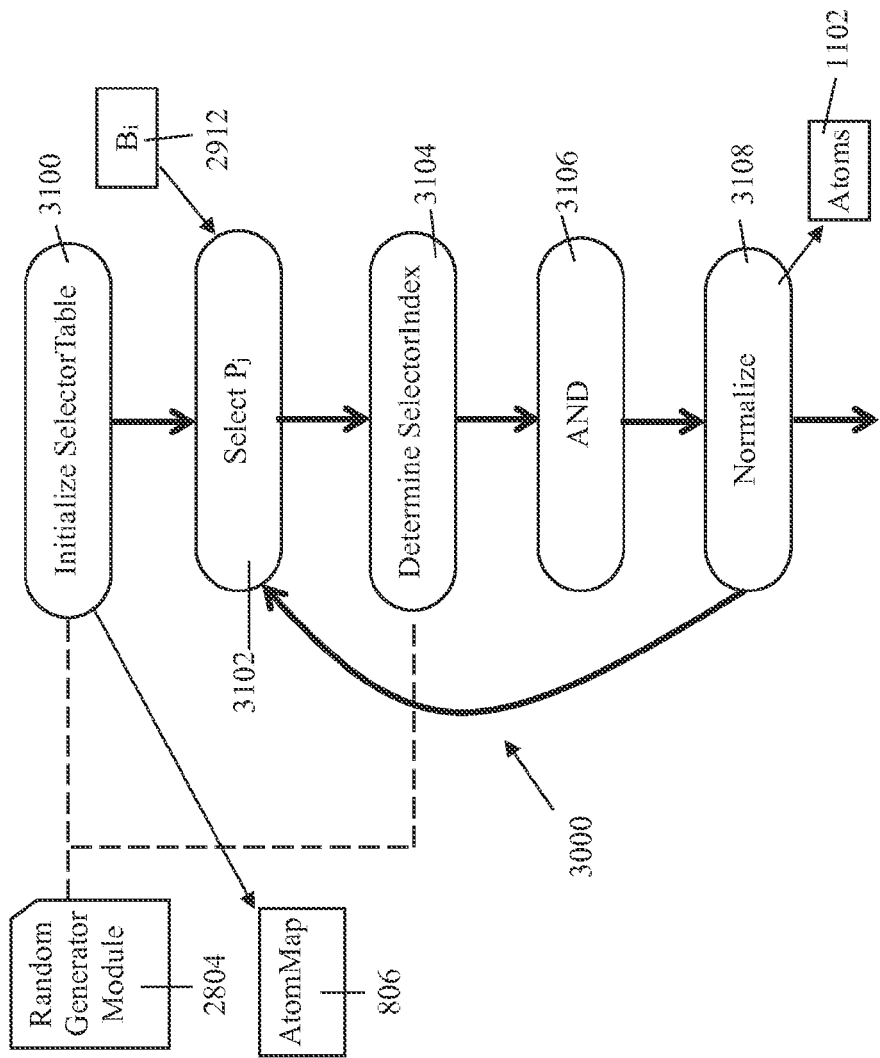
FIG. 31 is a schematic of the Atoms Select function according to one embodiment
Figure 32:
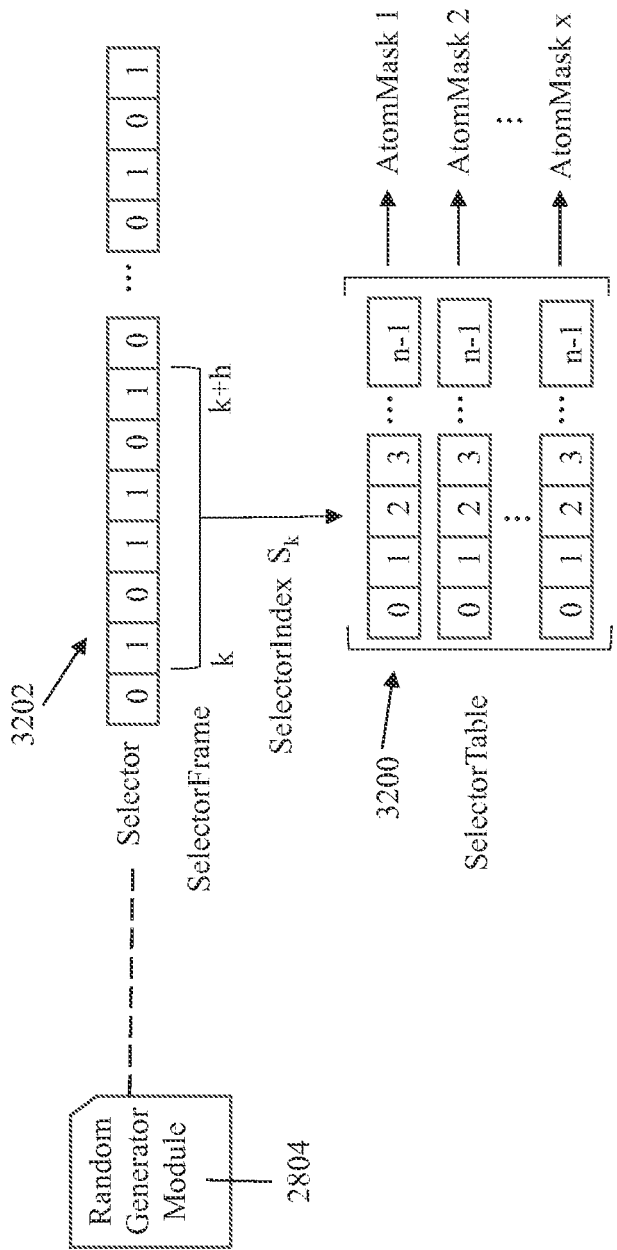
FIG. 32 is a diagram showing a Selector and a SelectorTable according to one embodiment.

FIG. 31 shows a schematic of the Atoms Select function 3000 according to one embodiment. This function 3000 may take a segment, P, from the data block 2912 being atomized and may create Atoms 1102 from this segment P. In the drawings, i is the index of the data block 2912, and j is the index of the segment P. After that segment has been atomized, the Atoms Select Function 3000 may take the next segment and create Atoms 1102 from it, continuing through iterations until the entire data block 2912 has been atomized. Each segment may be m bits in length. The index j may refer to the position of the starting bit of a segment P within the data block 2912. For example, one segment may be identified as $P_j$, and the next segment may be identified as $P_{j+m}$.

This function 3000 may include an Initialize SelectorTable function 3100. The Initialize SelectorTable function 3100 may determine the segment bit length m that will be used during that iteration of the Atoms Select function 3000. The Initialize SelectorTable function 3100 may initialize a SelectorTable 3200, shown in FIG. 32, that may be used to atomize the segment. The SelectorTable 3200 may be a table having n columns (from 0 to n−1) and x rows (from 1 to x). Each cell in the SelectorTable 3200 may contain an AtomMask. An AtomMask may be a binary string of m length. Selecting a column from the SelectorTable 3200 may select a set of AtomMasks (from 1 to x). The AtomMasks within a column of the SelectorTable 3200 may be configured such that each bit position of the m bits has a binary 1 in only one AtomMask (or row of the SelectorTable 3200). For example, for x AtomMasks all being m bits long, if AtomMask 1 (or row 1 of the SelectorTable 3200) within column 3 has a '1' for bit position 5 (assuming m is at least equal to 5), all of the other AtomMasks 2-x within column 3 have a '0' for bit position 5. Each AtomMask may have zero, one, or more than one '1's in its bits. For example, a 2-bit AtomMask may be: 00, 01, 10, or 11. In this example, if the AtomMask is 11, all of the other AtomMasks within that row may be 00. If an AtomMask contains all '0's, that AtomMask may generate no Atoms 1102 from the segment. In one embodiment, each AtomMask contains '1's in not more than half of its m bits. In another embodiment, each AtomMask contains '1's in not more than 25% of its m bits. In one embodiment, each AtomMask contains at least one '1.' The size of the SelectorTable 3200 (in bits) may be n multiplied by x multiplied by m.

The columns of the SelectorTable 3200 may be configured such that their AtomMasks are different patterns from those of other columns. For example, if column 0 of a g-row SelectorTable 3200 contains AtomMask 1 of '01' and AtomMask 2 of '10,' then column 1 of that SelectorTable 3200 may contain AtomMask 1 of '10' and AtomMask 2 of '01.' The SelectorTable 3200 may be stored in the AtomMap 806.

In one embodiment, x may be equal to m. In another embodiment, x may be less than m. In another embodiment, x may be greater than m, which may result in AtomMasks containing all '0's, which may generate more data to be stored in the AtomMap 806 but a maximum of m Atoms 1102 because the minimum size of an Atom 1102 may be one bit. In one embodiment, the number of columns in the SelectorTable 3200 may be equal to the number of different combinations of AtomMasks distributed among the rows of the SelectorTable 3200. In alternative embodiments, the number of columns in the SelectorTable 3200 may be less than or greater than the number of different combinations of AtomMasks distributed among the rows of the SelectorTable 3200. If greater, then columns of the SelectorTable 3200 may repeat. The AtomMask patterns within a column of a SelectorTable 3200 may be determined based on m and x.

Once the SelectorTable 3200 is configured, the Initialize SelectorTable function 3100 may determine the number of bits needed to identify the number of columns in the SelectorTable 3200. The Initialize SelectorTable function 3100 may generate a random bit string, Selector 3202, using the random generator module 2804. The Selector 3202 may be at least as long as the number of bits needed to identify the number of columns in the SelectorTable 3200 and may be 100 times longer than that number in one embodiment. The Selector 3202 may be stored in the AtomMap 806.

The Atoms Select function 3000 may also include a Select Segment function 3102, which may select a segment P from the data block 2912 to be atomized, as discussed above. The function 3102 may select the m bits of the data block 2912 starting from the index bit j. In one embodiment, the starting index j may be 0. In another embodiment, the starting index j may start from a random position and wrap to the beginning of the segment when the end of that segment is reached. After a segment has been atomized, the segment index may increment by m such that the starting index for the next iteration and segment may be j+m. If a segment requires more bits than remain unatomized from the data block 2912, random bits may be used to pad the segment.

The Atoms Select function 3000 may also include a Determine SelectorIndex function 3104, which may determine which column of AtomMasks to apply to the segment. The function 3104 may select from the Selector 3202 a SelectorFrame that is h bits long that identifies a column number from the SelectorTable 3200 to be used in atomizing the current segment P. The number determined by the SelectorFrame may be the SelectorIndex, $S_k$, for that segment, $P_j$. The SelectorIndex may identify the column number from the SelectorTable 3200 to use in atomizing that segment of data. In one embodiment h may be equal to the number of bits required to identify the number of columns in the SelectorTable 3200. In one embodiment, h=(log n)/(log 2). In alternative embodiments, h may be less than or greater than the number of bits required to identify the number of columns in the SelectorTable 3200. In one embodiment, the number of columns may be a power of 2. In another embodiment, the number of columns is not a power of 2. One embodiment may have h such that all columns cannot be selected. Another embodiment may have h such that selections greater than the highest column are possible, in which case alternative embodiments may wrap the column selection from 0, may modulo divide the selection and use the remainder, or may call the Determine SelectorIndex function 3104 to generate a new SelectorFrame that selects one of the columns.

The starting point or index, k, for the SelectorFrame may be bit 0 of the Selector 3202, in one embodiment. In another embodiment, the starting index, k, may be randomly selected. When the SelectorFrame determines a SelectorIndex for a segment, the starting index k may be incremented by h bits such that the starting index for the succeeding SelectorFrame for the next or succeeding segment may be k+h. When the SelectorFrame reaches the end of the Selector 3202, the SelectorFrame may wrap to the beginning of the Selector 3202, in one embodiment.

Once a column has been selected by the Determine SelectorIndex function 3104, the Atoms Select function 3000 may operate digital AND functions 3106 on the segment P and each AtomMask within the selected column.

The Atoms Select function 3000 may include a Normalize function, which may take the results of the segment P ANDed with the AtomMasks and may select the resulting bits from the positions for which each used AtomMask had a '1.' The selected results may be the Atoms 1102—one for each Atom-Mask that has a '1' in at least one position.

In one embodiments, m, n, x, and h may be fixed per application 106. In another embodiment, m, n, x, and h may vary, whether by user-selection or automatically (whether randomly or based on the user data size). In one embodiment, the same SelectorTable 3200 may be used for all data blocks 2912. In another embodiment, the same SelectorTable 3200 and Selector 3202 may be used for processing of an entire data block 2912 by the Atoms Select function 3000. In another embodiment, the SelectorTable 3200 and Selector 3202 may vary between processing data blocks 2912 by the Atoms Select function 3000. In different embodiments, the SelectorTable 3200 is generated for each new user data 104 to be atomized or for each new data block 2912 to be atomized, where the AtomMask patterns within the SelectorTable 3200 may be randomly generated. In one embodiment, h, m, n, and x remain the same during the processing by the Atoms Select function 3000 of an entire data block 2912. In another embodiment, h, m, n, and x may vary between the processing by the Atoms Select function 3000 of different data blocks 2912. In one embodiment, h, m, n, and x remain the same during the processing by the AtomizeData function 2806 of the input data 2918. In another embodiment, h, m, n, and x vary between the processing by the AtomizeData function 2806 of the different input data 2918 (i.e., user data 104 or AtomMap iterations). In one embodiment, h, m, n, and x remain the same during the atomizing process 2702 of the user data 104.

As m decreases, the atomizing process 2702 approaches a bit-level random distribution of the user data 104. Where m=1, no AtomMasks would be needed to randomize the data, but a larger number of Vectors 3004 would be generated (one for each bit), which would more-randomly distribute the user data bits and generate a larger AtomMap 806. Increasing m may increase the chance that nearby bits from the input data 2918 may be stored nearby in the AtomPool 2802 or Atom-Key 304 and decrease the size of the AtomMap 806. The resulting Atoms 1102 may include bits from the input data 2918 that are discontiguous. The resulting Atoms 1102 may also include bits from the input data 2918 that are contiguous.

An example may illustrate the Atoms Select function 3000. In this example, a portion of the data block 2912 is:

001 . . . 00011011001010001110010110111001110000 0001000000001111111100 . . . 0

In this example, the Initialize SelectorTable function 3100 may set the segment length, m, to be 8. The function 3100 may initialize a SelectorTable 3200 to have 3 rows (x=3) and 64 columns (from 0 to 63). Each of the 192 cells (3×64) within the SelectorTable 3200 has an AtomMask 8 bits long and conforming to the patterns discussed above. In this example, no AtomMask in the SelectorTable 3200 will have all '0's, which means that three Atoms 1102 will be generated for each segment because x=3.

Continuing the example, the Initialize SelectorTable function 3100 may set the SelectorFrame length h=6 because 6 bits will be sufficient to identify any of the 64 columns of the SelectorTable 3200 (i.e., $2^6$=64). The function 3100 may generate a 75-byte Selector 3202 that is partially shown below:

011110100 . . . 101000111111100000101010111000 111110000100011111 . . . 1001110

Continuing the example, the Atoms Select function 3000 may next proceed to the Select Segment function 3102, which selects an m-bit segment P from the above-listed data block 2912. In this example, the current index bit is the first bolded, underlined, and italicized bit shown in the data block 2912, because the earlier bits (to the left of the index) were processed by earlier passes of the functions 3102-3108. P for this example is 00110110. These are the bits that will be atomized in this pass of the functions 3102-3108. The segment index may move by 8 bits after this current segment is atomized such that the starting index for the next segment is the second bolded, underlined, and italicized bit shown in the data block 2912.

Continuing the example, the Atoms Select function 3000 may next proceed to the Determine SelectorIndex function 3104. This function 3104 uses the SelectorFrame, starting with the starting index that is the first bolded, underlined, and italicized bit in the Selector 3202 shown above, to determine the SelectorIndex for this segment. The 6-bit long Selector-Frame for this segment contains 011111 (which is 31 in decimal form), which is the SelectorIndex for this segment. This SelectorIndex means that this segment will be atomized using column 31 of the SelectorTable 3200. The starting index or SelectorIndex then is incremented by 6 bits until the second bolded, italicized, and underlined bit.

Continuing the example, the Atoms Select function 3000 may next proceed to the AND function 3106, which may perform three AND operations (because x=3), ANDing the segment P with each of the AtomMasks stored in the three rows of column 31 of the SelectorTable 3200. In this example, the SelectorTable was initialized in the Initialize SelectorTable function 3100 such that column 31 has the following AtomMasks: AtomMask 1 in row 1 is 01001001, AtomMask 2 in row 2 is 10000100, and AtomMask 3 in row 3 is 00110010.

In the first AND operation, segment P is ANDed with Atom-Mask 1:

00110110 AND 01001001=00000000 (Product 1)

In the second AND operation, segment P is ANDed with AtomMask 2:

00110110 AND 10000100=00000100 (Product 2)

In the third AND operation, segment P is ANDed with Atom-Mask 3:

00110110 AND 00110010=00110010 (Product 3)

Continuing the example, the Atoms Select function 3000 may next proceed to the Normalize function 3108, which may normalize the Products of the AND function 3106. Atom-Mask 1 has a '1' in bit positions 2, 5, and 8; AtomMask 2 has a '1' in bit positions 1 and 6; AtomMask 3 has a '1' in bit positions 3, 4, and 7. No bit position has a '1' in more than one AtomMask, and each bit position has a '1' in at least one AtomMask. Therefore, normalizing Product 1 results in taking bits 2, 5, and 8 of Product 1 and concatenating them together as Atom 1. Atom 1 is 000. Normalizing Product 2 results in taking bits 1 and 6 of Product 2 and concatenating them together as Atom 2. Atom 2 is 01. Normalizing Product 3 results in taking bits 3, 4, and 7 of Product 3 and concatenating them together as Atom 3. Atom 3 is 111. The normalized bits in the Products are bolded, underlined, and italicized above. As seen from the results, the Atoms 1102 may be different lengths. Also, the resulting Atoms 1102 may include non-contiguous bits from the original data segment, and they 1102 may also include contiguous bits from the original data segment (e.g., the contiguous '11' in bits 3 and 4 of Product 3). In this example, functions 3102-3108 would repeat to atomize all remaining segments of the data block 2912 before translating those Atoms 1102 to the AtomPool 2802 or Atom-Key 304 as described above.

The various indices may be process indices that may be not saved in the AtomMaps 806. The application 106 may be programmed to perform the atomizing process 2702 starting from a set value for each index (for example, 0 or any other value), in one embodiment, and therefore may perform the de-atomizing process 2706, as further discussed below, by working in reverse order of the atomizing process 2702, knowing the starting value for each index. In another embodiment, where the starting value for an index may vary, as discussed above, that index's starting value may be included in the appropriate AtomMap 806 so that the de-atomizing process 2706 may have the starting value for that index for de-atomization.

Another example is provided of one embodiment. In this example, the user data 104 is 1.5 MB. After the Compress function 2902, the compressed data 2904 is 0.96 MB. After the Randomize function 2906, the randomized data 2908 is 1.0 MB (1,000,000 bytes). The inflation of the AtomPool 2802 is 200,000 bytes, which may allow for the storage of AtomMaps 806 and for offsetting Atoms 1102. The AtomPool size is 1,200,000 bytes. The AtomPool 2802 has 255 zones (0-254), and the AtomKey 304 is zone 255. The size of each zone in the AtomPool 2802 is 4,686 bytes, and the size of the AtomKey 304 is 5,000 bytes. The Vector length, t, is 10 bits, including z of 8 bits and o of 2 bits.

Continuing with the example, the VectorGenerator is 80 bytes (640 bits), and the Selector 3202 is also 80 bytes (640 bits). The SelectorTable 3200 has 64 columns (n=64) and 3 rows (x=3). The SelectorFrame size, h, is 6 bits. The data block size is 1000 bytes, and the segment size, m, is 8 bits (or one byte). The size of each AtomMask is 8 bits, and the size of the SelectorTable 3200 is 192 bytes.

Continuing with the example, the first iteration of the AtomicVectoring function 2914 has 1000 data blocks 2912 because the randomized data 2908 is 1,000,000 bytes and each data block 2912 is 1000 bytes. AtomMap$^0$ 806 has a header of 4 bytes; 64 bytes of data about how the compressed data 2904 and the randomized data 2908 were created; and 1000 blocks, each 164 bytes, containing information about how each data block 2912 was atomized; for a total size of 164,068 bytes. AtomMap$^0$ 806 contains information on the atomizing of the user data 104.

Continuing with the example, the second iteration of the AtomicVectoring function 2914 uses the first iteration's AtomMap$^0$ 806 as the input data 2918. The second iteration of this function 2914 uses the same parameters as in the first iteration. The second iteration of the function 2914 has 164 data blocks 2912 because the data is 164,068 bytes and each data block 2912 is 1000 bytes. AtomMap$^1$ 806 has a header of 4 bytes; 64 bytes of data about how this iteration's compressed data 2904 and this iteration's randomized data 2908 were created; and 164 blocks, each 164 bytes, containing information about how each data block 2912 was atomized; for a total size of 29,964 bytes. AtomMap$^1$ 806 contains information on the atomizing of AtomMap$^0$ 806.

Continuing with the example, the third iteration of the AtomicVectoring function 2914 uses the second iteration's AtomMap$^1$ 806 as the input data 2918. The third iteration of this function 2914 uses the same parameters as in the first iteration. The third iteration of the function 2914 has 27 data blocks 2912 because the data is 29,964 bytes and each data block 2912 is 1000 bytes. AtomMap$^2$ 806 has a header of 4 bytes; 64 bytes of data about how this iteration's compressed data 2904 and this iteration's randomized data 2908 were created; and 27 blocks, each 164 bytes, containing information about how each data block 2912 was atomized; for a total size of 4,496 bytes. AtomMap$^2$ 806 contains information on the atomizing of AtomMap$^1$ 806. The ReduceAtomMap function 2808 stops iterations of the AtomizeData function 2806 because the size of the final AtomMap$^2$ 806 is small enough. The resulting final AtomMap$^2$ 806 is approximately 5 KB, the AtomKey 304 is 5 KB, and the AtomPool 2802 is 1.2 MB.

With reference to FIG. 27, the transport/storage process 2704 may store or transport the AtomPool 2802, the AtomKey 304, and the AtomMap 806 securely once the atomizing process 2702 is finished. FIGS. 33-39 show alternative embodiments of the transport/storage process 2704.

Figure 33:
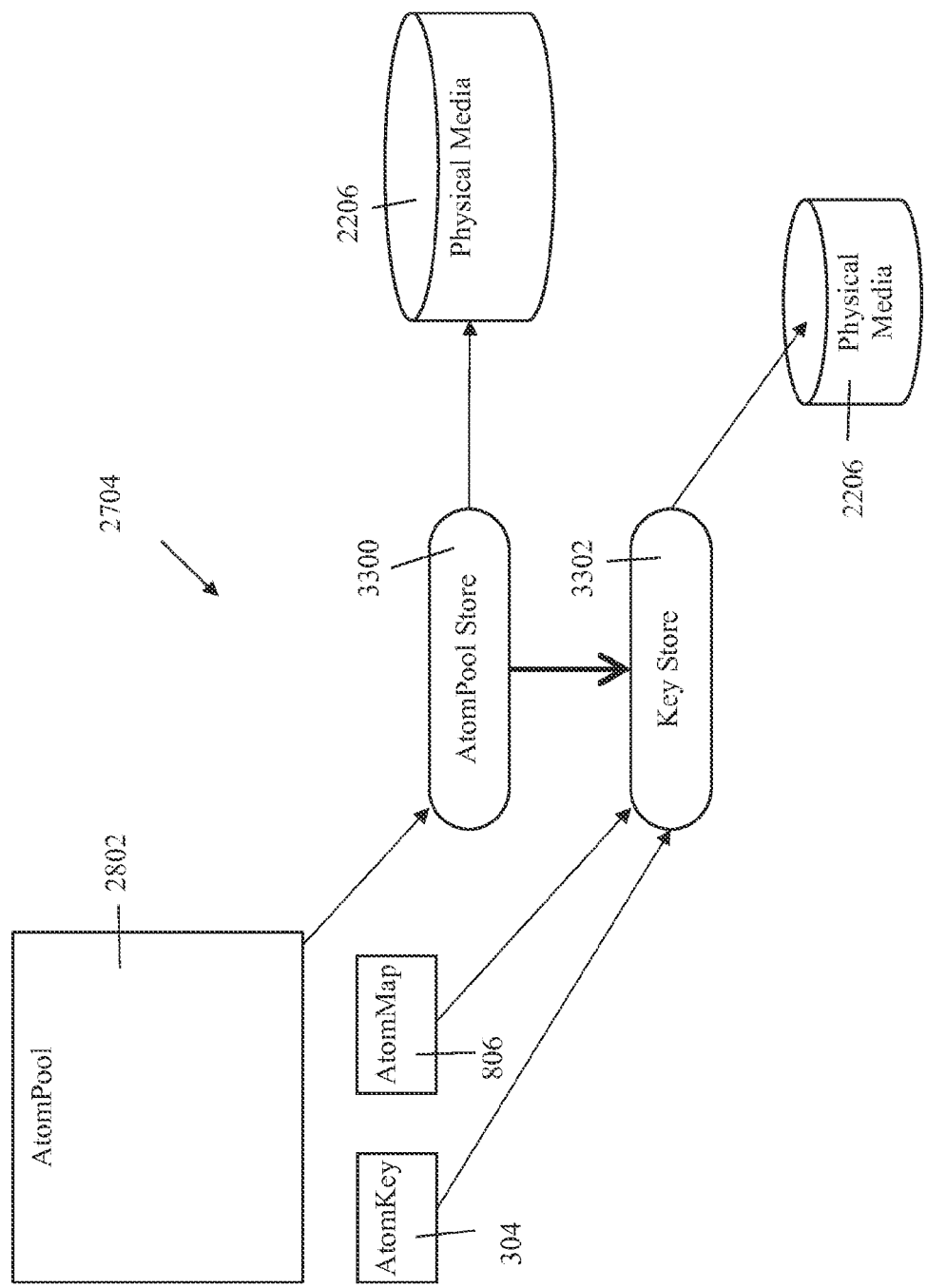
FIG. 33 is a schematic of the transport/storage process according to one embodiment.

FIG. 33 shows one embodiment of the transport/storage process 2704. The process 2704 may include an AtomPool Store function 3300, which may store the AtomPool 2802 onto a storage media 2206. This function 3300 may copy the AtomPool 2802 from the computer that atomized the user data 104 onto the media 2206 that is not in the cloud 108. Alternative embodiments of the storage media 2206 include, but are not limited to, hard drives, magnetic disks, tapes, optical discs, CDs, DVDs, solid state drives or storage devices, and USB flash drives.

The process 2704 may also include a Key Store function 3302, which may store the AtomKey 304 and the AtomMap 806 in a storage media 2206 that is different from the one 2206 on which the AtomPool 2802 is stored, in one embodiment. The media 2206 storing the AtomKey 304 and AtomMap 806 may be a mobile phone, a USB flash drive, or a Near Field Communications (NFC) card, in alternative embodiments. In another embodiment, the AtomKey 304, the AtomMap 806, and the AtomPool 2802 may be stored in the same media 2206.

Figure 34:
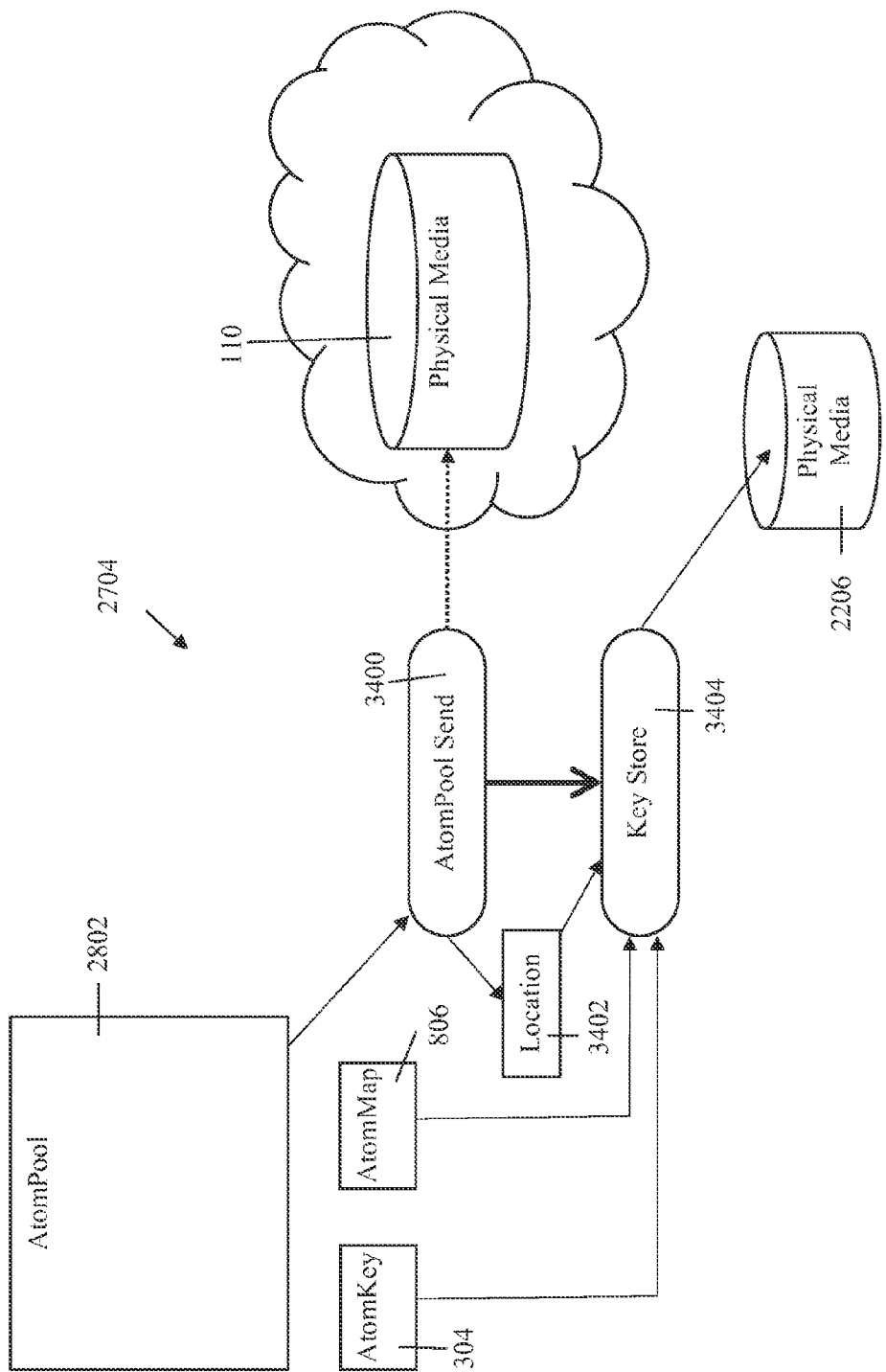
FIG. 34 is a schematic of the transport/storage process according to another embodiment.

FIG. 34 shows another embodiment of the transport/storage process 2704. The process 2704 may include an AtomPool Send function 3400, which may store the AtomPool 2802 in the cloud 108 on a cloud storage media 110, in one embodiment. This function 3400 may use typical communication protocols and services for the transmission. In one embodiment, the AtomPool 2802 may be encrypted using conventional encryption before storing it 2802 in the cloud 108. The function 3400 may record the location 3402 of the AtomPool storage, which may include a uniform resource locator (URL) or a universally unique identifier (UUID). The process 2704 may include a Key Store function 3404, which may be similar to the Key Store function 3302. This function 3404 may store the AtomPool storage location 3402, the AtomKey 304, and the AtomMap 806 onto a storage media 2206.

Figure 35:
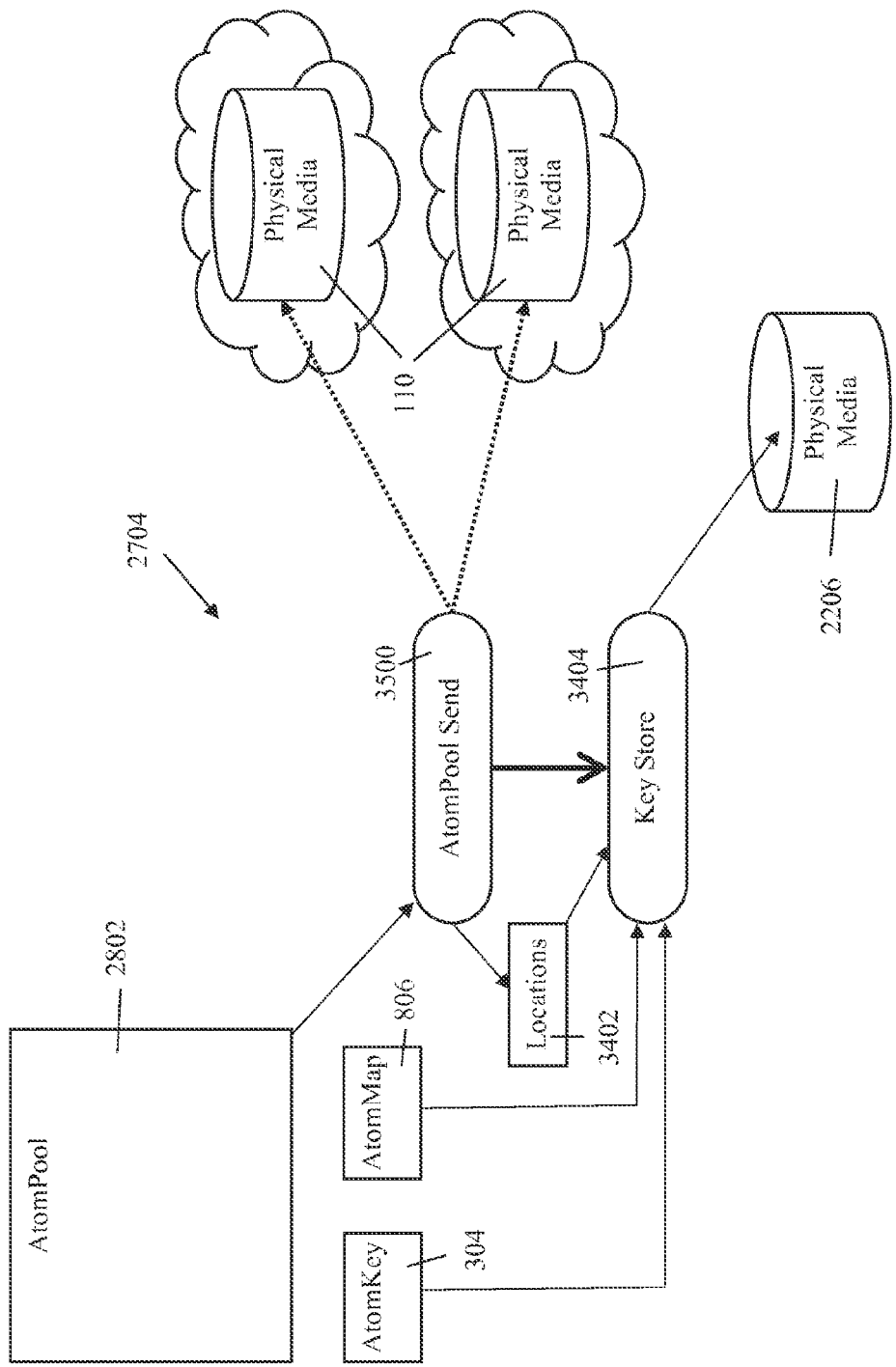
FIG. 35 is a schematic of the transport/storage process according to another embodiment.

FIG. 35 shows another embodiment of the transport/storage process 2704, which may be similar to the process 2704 shown in FIG. 34 except that the AtomPool Send function 3500 may store the AtomPool 2802 to multiple storage media, recording the location 3402 of each. Storage to multiple media may add redundancy and improve performance. In one embodiment, the AtomPool 2802 may be fragmented and dispersed to multiple cloud storage media 110.

Figure 36:
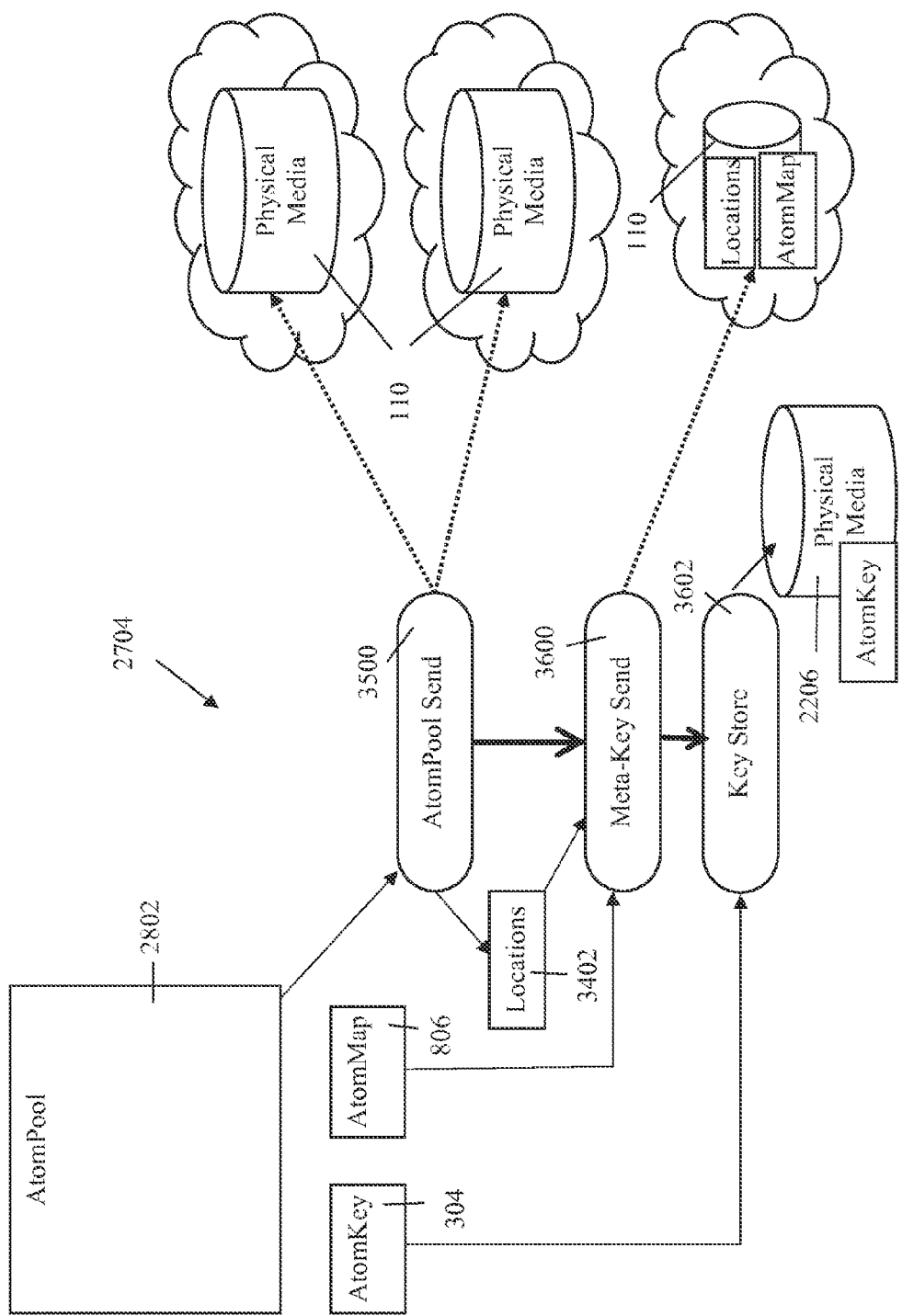
FIG. 36 is a schematic of the transport/storage process according to another embodiment.

FIG. 36 shows another embodiment of the transport/storage process 2704, which may be similar to the process 2704 shown in FIG. 35. After the AtomPool Send function 3500, the process 2704 may include a Meta-Key Send function 3600, which may store the AtomMap 806 and the storage locations 3402 of the AtomPool 2802 in the cloud. This function 3600 may use typical communication protocols and services for the transmission. This function 3600 may use conventional encryption on the AtomMap 806 and/or the locations 3402. The cloud storage of the AtomMap 806 may improve the convenience of this system 100. The AtomMap 806 and the locations 3402 may together be referred to as the Meta-Key. The process 2704 may also include a Key Store function 3602, which may store the AtomKey 304 to a storage media 2206 similar to how the Key Store function 3404 stored the AtomKey 304.

Figure 37:
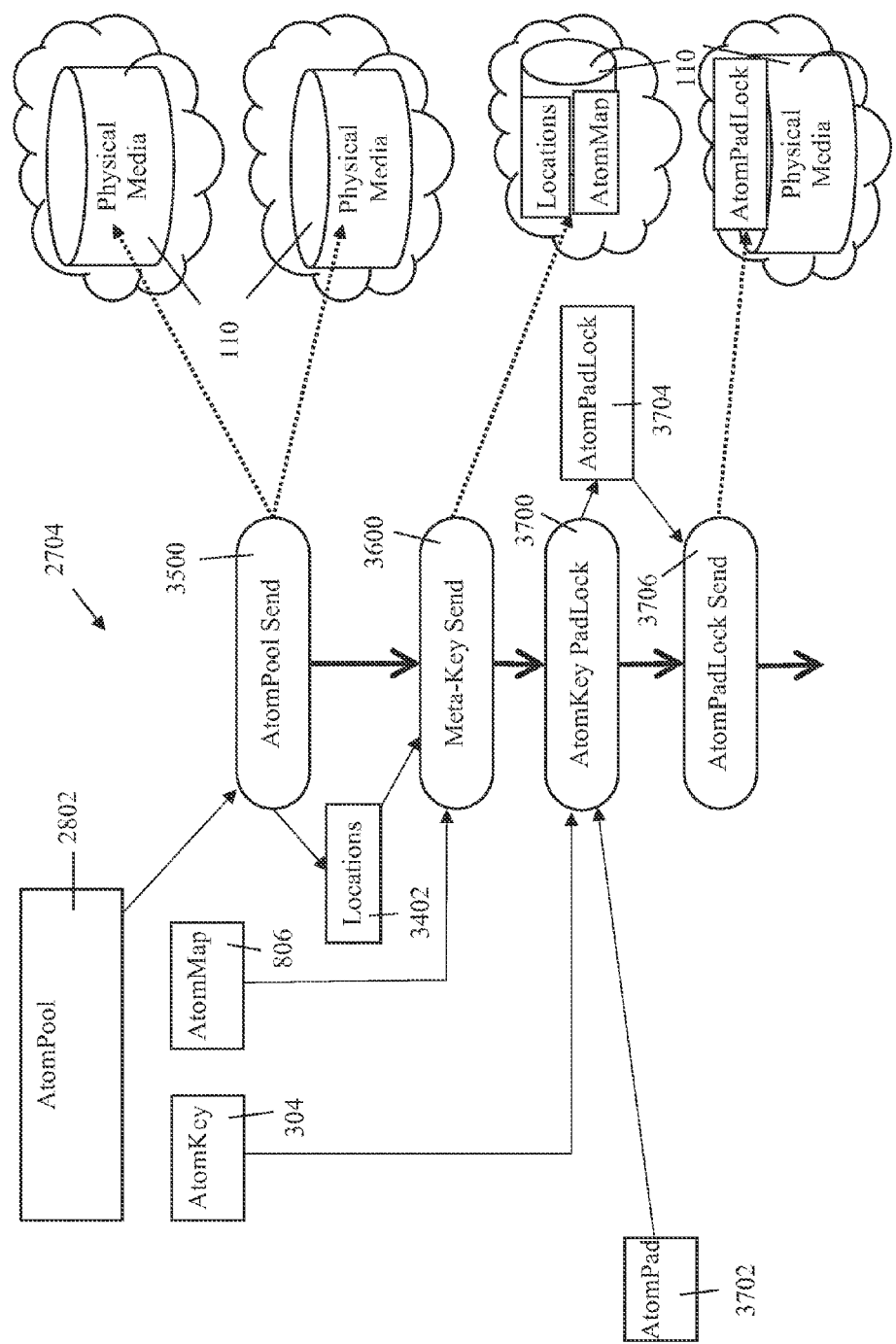
FIG. 37 is a schematic of the transport/storage process according to another embodiment.

FIG. 37 shows another embodiment of the transport/storage process 2704, which may be similar to the process 2704 shown in FIG. 36. After the Meta-Key Send function 3600, the process 2704 may include an AtomKey PadLock function 3700, which may combine or process the AtomKey 304 with an AtomPad 3702 to result in an AtomPadLock 3704. In one embodiment, an AtomPad 3702 may be a random set of data as large as the AtomKey 304. In another embodiment, an AtomPad 3702 may be a random set of data larger than the AtomKey 304. In one embodiment, the AtomPad 3702 may be generated with a random generator module 2804. In one embodiment, the AtomPad 3702 may be a one-time pad (OTP). In another embodiment, the AtomPad 3702 may be a multi-use pad. The AtomPad 3702 may be used to obfuscate the AtomKey 304 so that it 304 may be transmitted and/or stored in the cloud 108. The AtomPad 3702 may be used to securely obfuscate any number of AtomKeys 304 because both the AtomKey 304 and the AtomPad 3702 are random strings. The AtomPad 3702 may be shared between devices or users to allow the AtomKey 304 to be determined and used to access the atomized user data 104. In one embodiment the AtomPadLock 3704 is the result of an AtomKey 304 XORed with the AtomPad 3702.

The process 2704 may also include an AtomPadLock Send function 3706, which may transmit the AtomPadLock 3704 and store it 3704 in the cloud 108 on cloud storage media 110. This transmission may be via typical communication protocols and services. In one embodiment, the AtomPadLock 3704 may be encrypted using conventional encryption prior to transmission. If the AtomPadLock 3704 is compromised, the hacker will still not be able to use the AtomPadLock 3704 alone to easily decrypt the atomized user data 104 because the AtomPadLock 3704 is a random string; the hacker will have to guess all possible permutations of the string having the length of the AtomPadLock 3704, which length may, in one embodiment discussed above, be 65536 bits for an 8 KB AtomKey 304, rendering a brute-force or guessing approach impractical even with the computing power available today or in the future.

Figure 38:
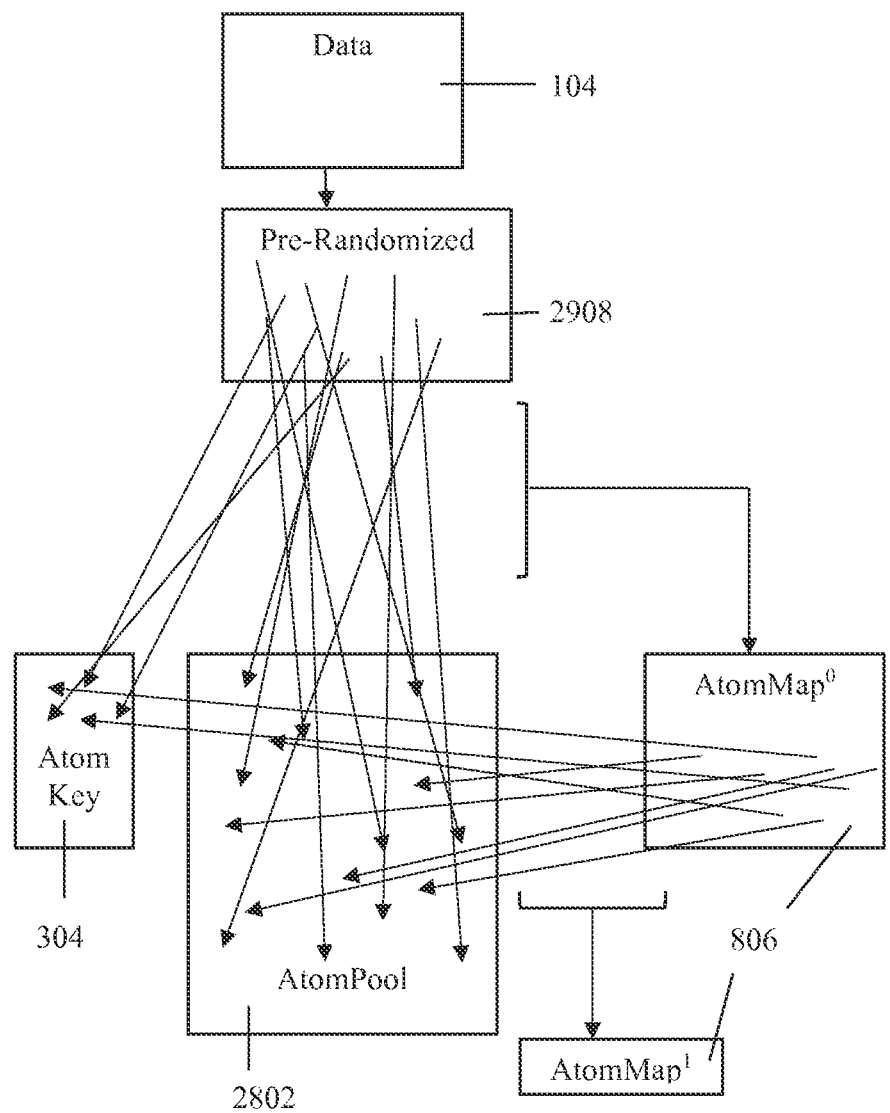
FIG. 38 is a diagram of the atomizing process according to one embodiment.

FIG. 38 shows a simplified conceptual diagram of the atomizing process 2702. The original user data 104 that is to be encrypted may be randomized into the randomized data 2908. This randomized data 2908 may then be randomly atomized and randomly distributed to the AtomKey 304 and/or the AtomPool 2802 with the distribution map saved to AtomMap⁰ 806. The AtomMap⁰ 806 may also be randomly atomized and randomly distributed to the AtomKey 304 and/or the AtomPool 2802 with its distribution map saved to AtomMap¹ 806. While the atomizing process 2702 may continue with additional iterations atomizing AtomMap¹ 806, only one such iteration is shown. The result may be a random AtomKey 304, a random AtomPool 2802, and an AtomMap 806 that may be stored or transported by the transport/storage process 2704.

The de-atomizing process 2706 may work in reverse order of the atomizing process 2702. The process 2706 may collect the AtomPool 2802, the AtomKey 304, and the AtomMap 806 (the last iteration of the AtomMap 806 that was not further atomized itself), use the AtomMap's instructions to retrieve the mapped Atoms 1102 from the AtomPool 2802 and AtomKey 304, repopulate the segments and then the data blocks 2912 from the Atoms 1102, reassemble the data blocks 2912, and de-randomize and decompress the data 2918. If the resulting data 2918 is another AtomMap 806, the de-atomizing process 2706 may repeat another iteration, recursively iterating until the data 2918 is the user data 104 rather than an AtomMap 806. If the AtomPool 2802 is stored in the cloud 108, the de-atomizing process 2702 may retrieve it 2802 using its storage location 3402. If the AtomMap 806, AtomKey 304, and/or locations 3402 are also stored in the cloud 108, the de-atomizing process 2702 may retrieve them (and unencrypt if necessary).

Figure 39:
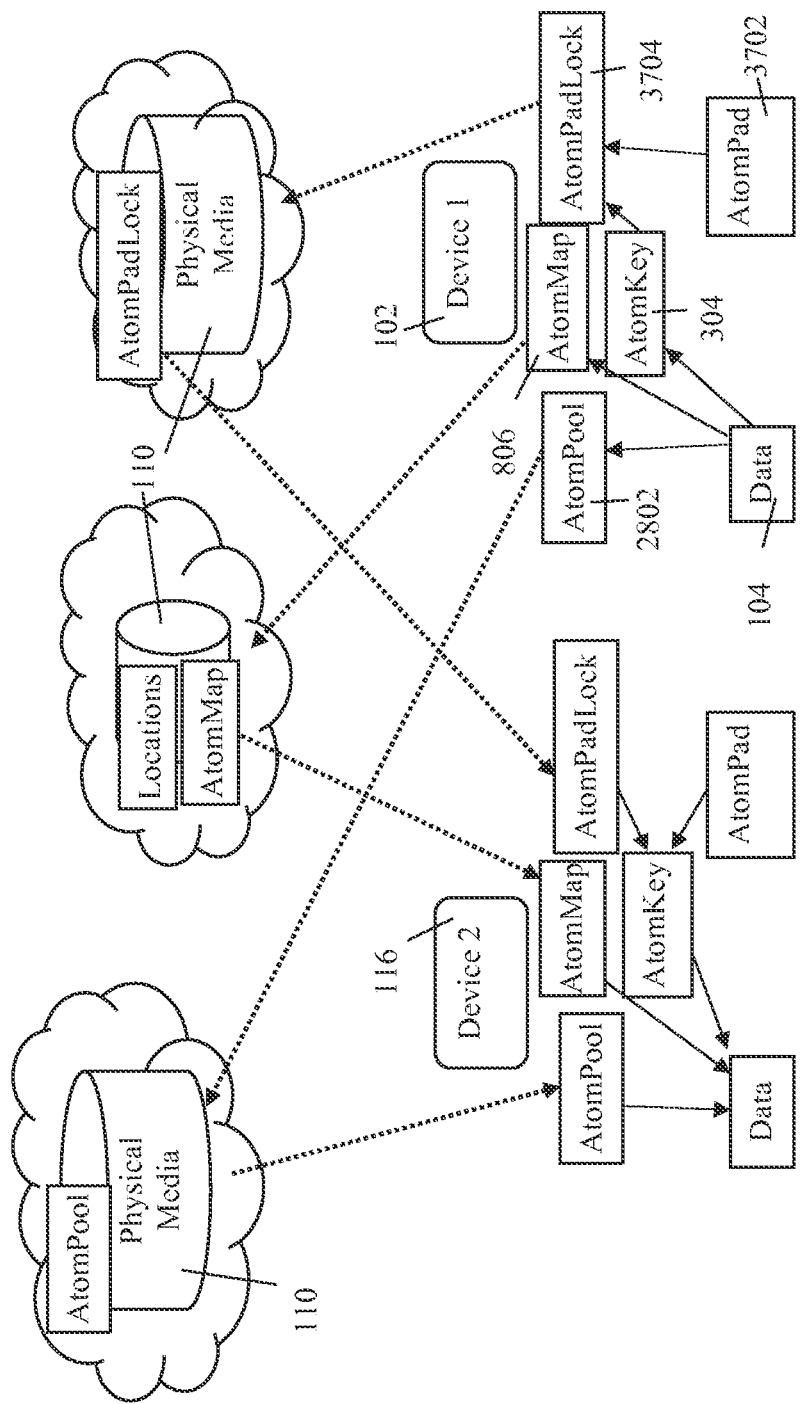
FIG. 39 is a diagram of two devices sharing atomized data according to one embodiment.

FIG. 39 shows a diagram of an embodiment of the system 100 where user data 104 is atomized and shared by a first computer or device 102 with a second computer or device 116. The first device 102 may atomize the user data 104, generating an AtomPool 2802, an AtomKey 304, and an AtomMap 806. The AtomPool 2802 and AtomMap 806 may be saved to cloud storage media 110. The AtomPool's storage locations 3402 may also be stored in the cloud 108. In alternative embodiments, the same or different storage media 110 may be used to save these components. The first device 102 may use the AtomKey 304 and AtomPad 3702 to create the AtomPadLock 3704 and upload it 3704 to cloud storage media 110.

The second device 116 may be notified of the newly uploaded Meta-Key (i.e., locations 3402 and AtomMap 806), for example by the user of the first device 102 or by the cloud service that houses the Meta-Key. The second device 116 may download the Meta-Key. If the Meta-Key is encrypted or requires authentication for access, the user of the first device 102 may provide such information to the user of the second device 116 to give the second device 116 access to the Meta-Key. Using the Meta-Key, the second device 116 may download the AtomPool 2802 and the AtomPadLock 3704. The second device 116 may previously have been securely provided with the AtomPad 3702. The second device 116 may use the AtomPad 3702 and the retrieved AtomPadLock 3704 to obtain the AtomKey 304, which in one embodiment may be done by an XOR function. Having the AtomPool 2802, the AtomKey 304, and the AtomMap 806, the second device 116 may de-atomize the user data 104 as described above.

Figure 40:
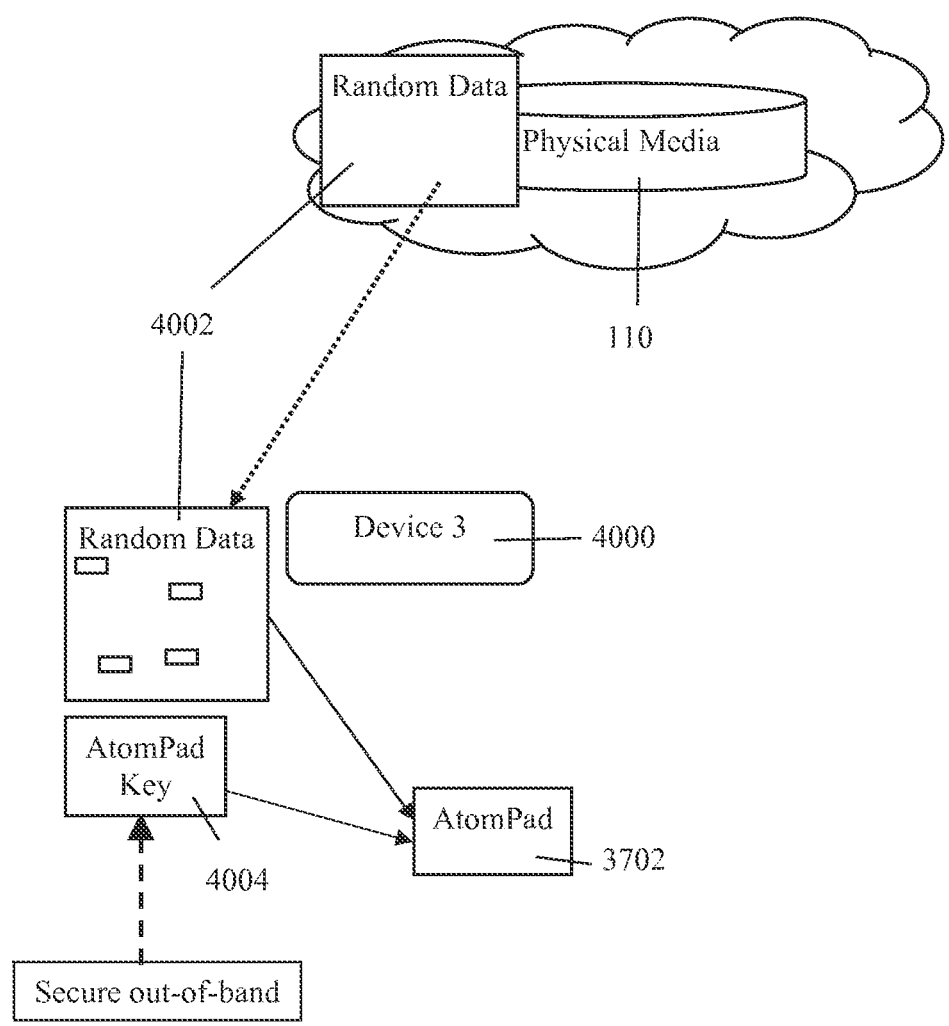
FIG. 40 is a diagram of a device obtaining an AtomPad according to one embodiment.

FIG. 40 shows a diagram of one embodiment of how a device or computer (here, the third device 4000) may obtain an AtomPad 3702 that may be used to obtain the AtomKey 304, as discussed above. A list of random data 4002 may be published and available for download from cloud storage media 110. This list 4002 may be any size, e.g., 1 MB, 10 MB, 100 MB, or greater. The third device 4000 may download this random data 4002. An AtomPad Key 4004 may be securely delivered to the user of the third device 4000, for example, personally, by courier, by postal service, over a telephone (whether verbally or as a data transmission), or through another out-of-band communication method or means. The AtomPad Key 4004 may identify random locations within the random data 4002 that combine to produce the AtomPad 3702. In alternative embodiments, the AtomPad Key 4004 may be encoded (for example, as a QR code or bar code) before delivery. The AtomPad Key 4004 may be sufficiently large for the type of data being protected. Once the AtomPad 3702 is obtained, the third device 4000 may retrieve and de-atomize the user data similar to the second device 116 in the discussion with respect to FIG. 39 above.

In one embodiment, the random data 4002 may be arranged in an array. The AtomPad Key 4004 may be coordinates of elements in the array. For example, the random data 4002 may be a 1000 KB×1000 KB array where each element contains 2 KB of data. If the AtomPad 3702 was 8 KB in size, then four tuples may be used to identify the elements in the random data array 4002 that are combined to make the AtomPad 3702. For example, the AtomPad Key 4004 may be 793-134, 379-983, 037-328, 714-382.

In an alternative embodiment, the AtomPad 3702 may be encoded in a hardware dongle or device that is required to be connected to a de-atomizing computer to de-atomize the data. In another embodiment, the AtomPad 3702 may be delivered out-of-band by courier or by the postal service. In another embodiment, the AtomPad 3702 may be provided over the telephone, whether verbally or as a data transmission. In alternative embodiments, the AtomKey 304 may be personally delivered (or by courier or postal service) to the user of the second device 116 out-of-band, whether the AtomKey 304 is saved to storage media 2206, directly printed on paper or some other tangible object, or encoded onto paper or some other tangible object (for example, as a QR code or bar code). In another embodiment, the person atomizing the user data 104 may call the user intended to de-atomize the data 104 and may verbally provide the AtomKey 304 over the telephone. In another embodiment, the AtomKey 304 may be communicated by a data transmission over a telephone.

FIGS. 33-37 and 39-40 disclosed transferring information to and from storage media 2206 and cloud storage media 110. In alternative embodiments, any such media (whether disclosed in the figures as storage media 2206 or cloud storage media 110) may be local to or remote from the computer performing the atomizing, may be networked storage media, may be enterprise storage media, may be distributed storage media, or may be cloud storage media. Various embodiments may include protection for data stored on any physical storage media (including USB drive, hard disk, NFC card, smart phone, or mobile device) as well as cloud or distributed storage.

The embodiments disclosed may be varied by altering the order of the functions or operations disclosed or by omitting or duplicating functions or operations. Various features of the embodiments may be combined with features of other embodiments. The disclosed embodiments and examples are non-limiting.

Numerous non-limiting embodiments have been described hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:
1. A method for securing user data, comprising the steps of:
a) setting the user data as input data;
b) randomly fragmenting the input data into a plurality of Atoms and randomly distributing the Atoms into an AtomPool and an AtomKey; and
c) recording information about the fragmentation and the distribution of step b) into an AtomMap;
wherein:
the AtomPool and the AtomKey pre-exist the distribution of step b);
the AtomPool of step b) is divided into a number of zones, the number being Z−1, with the AtomKey being zone Z; and
the distribution of step b) comprises the steps of:
d) randomly selecting the zone into which an Atom is distributed, wherein the zone selection occurs separately for each Atom;
e) copying each Atom to the zone selected for that Atom in step d), starting at a zone index for that zone, overwriting any data that exists in the location where each Atom is copied; and
f) moving the zone index of each zone into which any Atom was copied in step e) to a location immediately after the location where the Atom is copied.

2. The method of claim 1, wherein step d) further comprises the steps of:
g) determining if the selected zone is full from Atoms previously distributed into that zone; and
h) randomly selecting another zone if the determination of step g) is affirmative.

3. The method of claim 2, further comprising the steps of:
i) randomly selecting an offset for each Atom; and
j) moving the zone index of the zone selected in step d) for each Atom by the offset selected in step i) for that Atom;
wherein steps i)-j) are performed before step e).

4. The method of claim 3, wherein:
the distribution of step b) further comprises the steps of:
k) generating a random binary string called a VectorGenerator;
l) for each Atom, selecting t contiguous bits from the VectorGenerator, wherein:
t includes enough bits to select the zone in step d) and to select the offset in step h);
the t bits are called a Vector;
z is a portion of the Vector that selects the zone in step d);
o is a portion of the Vector that selects the offset in step i); and
succeeding groups of t bits of the VectorGenerator are used to generate Vectors for succeeding Atoms;
m) using z of each Vector in step d) to select the zone for the Atom corresponding to that Vector; and
n) using o of each Vector in step i) to select the offset for the Atom corresponding to that Vector; and
step c) further comprises the step of:
o) recording the VectorGenerator into the AtomMap.

5. The method of claim 3, further comprising the steps of:
p) setting the AtomMap of step c) as the input data; and
q) repeating at least one iteration of steps b)-c), wherein the AtomMap of a final iteration of step c) is a final AtomMap.

6. The method of claim 5, wherein the size of the AtomMap after any iteration of steps b)-c) is less than the size of the input data fragmented and distributed during that iteration.

7. The method of claim 6, further comprising the steps of:
r) compressing the input data;
s) pre-randomizing the compressed input data of step r); and
t) recording information about the compression of step r) and information about the pre-randomization of step s) into the AtomMap;
wherein:
steps r)-s) are performed before step b); and
the fragmentation and the distribution of the input data in step b) is of the pre-randomized input data of step s).

8. The method of claim 7, wherein the AtomPool of step b) is larger than the pre-randomized input data of step s).

9. The method of claim 8, further comprising the step of:
u) filling the AtomPool and the AtomKey with random data;
wherein:
step u) is performed before the distribution of step b).

10. The method of claim 9, wherein the fragmentation of step b) comprises the steps of:

v) randomly selecting a data block of the input data;
w) fragmenting the selected data block into a plurality of Atoms; and
x) repeating steps v)-w) until each data block of the input data has been fragmented.

11. The method of claim 10, wherein step w) comprises the steps of:
y) selecting an m-bit contiguous segment of the data block;
z) fragmenting the selected segment into a plurality of Atoms; and
aa) repeating steps y)-z) for a next segment until the entire data block has been fragmented.

12. The method of claim 11, wherein step z) comprises the steps of:
bb) creating a plurality x of AtomMasks, each having m bits, wherein each of the m bit positions has a '1' in only one of the AtomMasks;
cc) performing AND operations between the selected segment of step y) and each of the AtomMasks of step bb); and
dd) normalizing each result of the AND operations of step cc), each normalized result being one Atom.

13. The method of claim 12, wherein x is less than or equal to m.

14. The method of claim 13, wherein:
step z) further comprises the steps of:
ee) creating an array, called a SelectorTable, having x rows and n columns;
ff) populating each cell of the SelectorTable with an AtomMask such that each column of the SelectorTable contains a plurality of AtomMasks of step bb), wherein the plurality of AtomMasks of one column differ in pattern from the plurality of AtomMasks of the neighboring columns;
gg) generating a random binary string called a Selector;
hh) for each selected segment of step y), selecting h contiguous bits from the Selector, wherein:
h includes enough bits to select n; and
succeeding groups of h bits of the Selector are used for succeeding segments; and
ii) using the selected bits of step hh) to select a column of the SelectorTable, wherein the AtomMasks used in step cc) are those contained in the selected column; and
step c) further comprises the step of:
jj) recording the Selector into the AtomMap.

15. The method of claim 5, further comprising the steps of:
kk) setting the final AtomMap of step q) as an input AtomMap;
ll) using the input AtomMap of step kk) to collect and reassemble the plurality of Atoms from the AtomPool and the AtomKey into output data; and
mm) if the output data from an iteration of step 11) is an AtomMap, setting that output data as the input AtomMap and repeating iterations of step 11) until the output data is not an AtomMap;
wherein steps kk)-mm) are performed after step q).

16. The method of claim 5, further comprising the steps of:
nn) storing the AtomPool of step b) on a first storage media; and
oo) storing the AtomKey of step b) and the final AtomMap of step q) on a second storage media;
wherein steps nn)-oo) are performed after step q).

17. The method of claim 16, wherein the first storage media of step nn) is at least one cloud storage media, the method further comprising the step of:

pp) recording location information of the storage of step nn) to the second storage media;
wherein step pp) is performed after step nn).

18. The method of claim 5, further comprising the steps of:
qq) storing the AtomPool of step b) on at least one storage media;
rr) recording location information of the storage of step qq) to a second storage media;
ss) storing the final AtomMap of step q) on the second storage media; and
tt) storing the AtomKey of step b) on a third storage media;
wherein steps qq)-tt) are performed after step q).

19. The method of claim 5, further comprising the steps of:
uu) storing the AtomPool of step b) on at least one storage media;
vv) recording location information of the storage of step uu) to a second storage media;
ww) storing the final AtomMap of step q) on the second storage media;
xx) combining the AtomKey with a random string called an AtomPad to produce an AtomPadLock; and
yy) storing the AtomPadLock of step xx) on a third storage media;
wherein steps uu)-yy) are performed after step q).

20. The method of claim 19, further comprising the steps of:
zz) retrieving the AtomPool stored in step uu) from the at least one storage media;
aaa) retrieving the location information recorded in step vv) and the final AtomMap stored in step ww) from the second storage media;
bbb) retrieving the AtomPadLock stored in step yy) from the third storage media;
ccc) applying the AtomPad to the AtomPadLock retrieved in step bbb) to produce the AtomKey;
ddd) setting the final AtomMap retrieved in step aaa) as an input AtomMap;
eee) using the input AtomMap of step ddd) to collect and reassemble the plurality of Atoms from the AtomPool retrieved in step zz) and the AtomKey produced in step ccc) into output data; and
fff) if the output data from an iteration of step eee) is an AtomMap, setting that output data as the input AtomMap and repeating iterations of step eee) until the output data is not an AtomMap;
wherein steps zz)-fff) are performed after step yy).

21. The method of claim 20, further comprising the steps of:
ggg) obtaining a list of random data; and
hhh) obtaining the AtomPad using the list of random data of step ggg);
wherein:
steps ggg)-hhh) are performed before step ccc); and
the AtomPad obtained in step hhh) is applied in step ccc).

22. A non-transitory computer readable medium comprising instructions for causing a computer to perform the method of claim 5.

23. A non-transitory computer readable medium comprising instructions for causing a computer to perform the method of claim 15.

24. A system for securing user data, comprising:
a first computer; and
a second computer in communication with the first computer;

wherein the first computer is programmed to:
  execute steps a)-j) and p)-q) of the method of claim 16; and
  communicate the AtomPool, the AtomKey, and the final AtomMap to the second computer; and
wherein the second computer is programmed to execute steps kk)-mm) of the method of claim 15.

25. A method for securing user data, comprising the steps of:
  a) filling an AtomPool and an AtomKey with random data;
  b) setting the user data as input data;
  c) randomly fragmenting the input data at bit level into a plurality of Atoms and randomly distributing the Atoms into the AtomPool and the AtomKey; and
  d) recording information about the fragmentation and the distribution of step c) into an AtomMap;
wherein:
  each Atom of step c) consists of non-contiguous bits from the input data fragmented in step c);
  the AtomPool is larger than the input data;
  the AtomPool is divided into a number of zones, the number being Z−1, with the AtomKey being zone Z; and
  the distribution of step c) comprises the steps of:
    e) randomly selecting the zone into which an Atom is distributed, wherein the zone selection occurs separately for each Atom;
    f) copying each Atom to the zone selected for that Atom in step e), starting at a zone index for that zone, overwriting any data that exists in the location where each Atom is copied; and
    g) moving the zone index of each zone into which any Atom was copied in step f) to a location immediately after the location where the Atom is copied.

* * * * *